US012776553B2

(12) United States Patent
Hantschel et al.

(10) Patent No.: US 12,776,553 B2
(45) Date of Patent: Oct. 27, 2026

(54) BATTERY MODULE, BATTERY DEVICES AND METHODS FOR PRODUCING A BATTERY MODULE

(71) Applicant: ELRINGKLINGER AG, Dettingen (DE)

(72) Inventors: Jochen Hantschel, Dettingen a.d.Erms (DE); Michael Grotz, Eningen (DE); Stephanie Rosenkranz, Reutlingen (DE); Alexander Leichtfuss, Reutlingen (DE); Maximilian Heim, Reutlingen (DE)

(73) Assignee: ElringKlinger AG, Dettingen (DE)

( * ) Notice: Subject to any disclaimer, the term of this patent is extended or adjusted under 35 U.S.C. 154(b) by 731 days.

(21) Appl. No.: 17/934,709

(22) Filed: Sep. 23, 2022

(65) Prior Publication Data

US 2023/0014035 A1 Jan. 19, 2023

Related U.S. Application Data

(63) Continuation of application No. PCT/EP2021/057483, filed on Mar. 23, 2021.

(30) Foreign Application Priority Data

Mar. 25, 2020 (DE) ..................... 10 2020 203 873.2

(51) Int. Cl.

| | |
|---|---|
| ***H01M 50/512*** | (2021.01) |
| ***H01M 50/209*** | (2021.01) |
| ***H01M 50/211*** | (2021.01) |
| ***H01M 50/262*** | (2021.01) |
| ***H01M 50/517*** | (2021.01) |

(52) U.S. Cl.
CPC ....... *H01M 50/512* (2021.01); *H01M 50/209* (2021.01); *H01M 50/211* (2021.01); *H01M 50/262* (2021.01); *H01M 50/517* (2021.01)

(58) Field of Classification Search
CPC .................................................. H01M 50/512
See application file for complete search history.

(56) References Cited

U.S. PATENT DOCUMENTS

| | | | |
|---|---|---|---|
| 6,586,132 | B1 | 7/2003 | Fukuda et al. |
| 10,483,507 | B2 | 11/2019 | Gerundt et al. |
| 10,665,912 | B2 | 5/2020 | Jennrich et al. |
| 11,018,398 | B2 | 5/2021 | Schroder et al. |
| 11,258,127 | B2 | 2/2022 | Kesper |
| 11,437,676 | B2 | 9/2022 | Yoneyama |

(Continued)

FOREIGN PATENT DOCUMENTS

| | | |
|---|---|---|
| CN | 209641711 | 11/2019 |
| DE | 4319653 | 12/1993 |

(Continued)

OTHER PUBLICATIONS

International Search Report (with English translation) and Written Opinion for International (PCT) Patent Application No. PCT/EP2021/057487, dated Jun. 10, 2021. 10 pages.

(Continued)

*Primary Examiner* — Brian R Ohara
(74) *Attorney, Agent, or Firm* — Sheridan Ross P.C.

(57) ABSTRACT

The invention relates to battery modules, battery devices and to methods for producing a battery module.

20 Claims, 43 Drawing Sheets

(56) References Cited

U.S. PATENT DOCUMENTS

| | | | | |
|---|---|---|---|---|
| 2007/0218353 | A1 | 9/2007 | Straubel et al. | |
| 2009/0186266 | A1 | 7/2009 | Nishino et al. | |
| 2010/0136413 | A1 | 6/2010 | Hermann et al. | |
| 2012/0288741 | A1 | 11/2012 | Gutsch et al. | |
| 2013/0130078 | A1 | 5/2013 | Schaefer et al. | |
| 2013/0337307 | A1 | 12/2013 | Butterfield | |
| 2014/0193685 | A1 | 7/2014 | Lim et al. | |
| 2015/0093613 | A1 | 4/2015 | Obasih et al. | |
| 2015/0221921 | A1 | 8/2015 | Choi et al. | |
| 2016/0218328 | A1 | 7/2016 | Schmidt et al. | |
| 2016/0322649 | A1 | 11/2016 | Swiegers et al. | |
| 2017/0302098 | A1 | 10/2017 | Miller et al. | |
| 2018/0219198 | A1 | 8/2018 | Pflueger et al. | |
| 2018/0301771 | A1 | 10/2018 | Jennrich et al. | |
| 2020/0411816 | A1* | 12/2020 | Yoneyama .......... | H01M 10/613 |

FOREIGN PATENT DOCUMENTS

| | | |
|---|---|---|
| DE | 102009053506 | 5/2011 |
| DE | 102012014775 | 1/2014 |
| DE | 102012222689 | 6/2014 |
| DE | 102013021651 | 7/2014 |
| DE | 102013016101 | 4/2015 |
| DE | 102015206182 | 11/2015 |
| DE | 102014211032 | 12/2015 |
| DE | 102015219280 | 4/2017 |
| DE | 102016212273 | 1/2018 |
| DE | 102017130556 | 6/2019 |
| DE | 102019000744 | 8/2019 |
| DE | 102018105037 | 9/2019 |
| EP | 3396733 | 10/2018 |
| EP | 3560005 | 10/2019 |
| GB | 2267992 | 12/1993 |
| WO | WO 2013/188680 | 12/2013 |
| WO | WO 2018/114067 | 7/2018 |
| WO | WO 2019/031175 | 2/2019 |

OTHER PUBLICATIONS

International Search Report (with English translation) and Written Opinion for International (PCT) Patent Application No. PCT/EP2021/057483, dated Jun. 10, 2021, 12 pages.

International Search Report (with English translation) and Written Opinion for International (PCT) Patent Application No. PCT/EP2021/057486, dated Jun. 10, 2021, 10 pages.

International Search Report (with English translation) and Written Opinion for International (PCT) Patent Application No. PCT/EP2021/057488, dated Jun. 10, 2021, 13 pages.

Official Action for U.S. Appl. No. 17/934,681, dated Apr. 24, 2025, 6 pages. Restriction Requirement.

Official Action for U.S. Appl. No. 17/934,722, dated Apr. 16, 2025, 6 pages. Restriction Requirement.

Official Action for U.S. Appl. No. 17/934,729, dated Jun. 2, 2025, 9 pages. Restriction Requirement.

Official Action for U.S. Appl. No. 17/934,681, dated Jul. 21, 2025, 9 pages.

Official Action for U.S. Appl. No. 17/934,681, dated Nov. 6, 2025, 8 pages.

Official Action for U.S. Appl. No. 17/934,722. dated Aug. 11, 2025, 18 pages.

Official Action for U.S. Appl. No. 17/934,729, dated Sep. 23, 2025, 25 pages.

Official Action for U.S. Appl. No. 17/934,729, dated Feb. 6, 2026, 22 pages.

Official Action for U.S. Appl. No. 17/934,722, dated Mar. 10, 2026, 16 pages.

Official Action for U.S. Appl. No. 17/934,681, dated Mar. 27, 2026, 9 pages.

Notice of Allowance for U.S. Appl. No. 17/934,729, dated May 6, 2026, 14 pages.

* cited by examiner

BATTERY MODULE, BATTERY DEVICES AND METHODS FOR PRODUCING A BATTERY MODULE

RELATED APPLICATION

This application is a continuation of international application No. PCT/EP2021/057483 filed on Mar. 23, 2021 and claims the benefit of German application No. 10 2020 203 873.2 filed on Mar. 25, 2020, which are incorporated herein by reference in their entirety and for all purposes.

FIELD OF DISCLOSURE

The present invention relates to battery modules comprising galvanic cells.

BACKGROUND

Battery modules typically comprise one or more galvanic cells. Such galvanic cells are often subject to a swelling behavior that is based, among other things, on the one hand on aging effects and on the other hand on the intercalation and deintercalation of ions into the electrodes of the galvanic cells.

Growth of galvanic cells based on the aging thereof is based, for example, on gas formation due to chemical decomposition of the electrolyte of the galvanic cells and/or on the growth of an interface layer on the electrodes of the galvanic cells, which is referred to as the "solid electrolyte interphase" (SEI). In this case, winding layers of a cell winding of a galvanic cell can become detached from one another (which is referred to as "delamination"). A detachment of the winding layers of a cell winding can be caused, for example, by growth of the winding layers in a direction parallel to a stacking direction of a battery module and/or by growth of the winding layers in a direction perpendicular to a stacking direction of a battery module.

SUMMARY OF THE INVENTION

The object of the present invention is to provide a battery module comprising several galvanic cells, which has an increased service life and which is in particular easy and inexpensive to manufacture.

This object is achieved by the features of the independent device claim.

Advantageous further developments are the subject matter of the dependent claims.

The battery module preferably comprises the following:

- a plurality of galvanic cells, in particular a plurality of prismatic cells or a plurality of pouch cells which are arranged along a stacking direction;
- one or more connecting bodies,
- wherein the one or more connecting bodies connect the galvanic cells to one another in the stacking direction.

The term "in particular" is used in the context of this description and the appended claims to describe any non-compulsory or optional features.

The galvanic cells of the battery module are connected to one another by means of the one or more connecting bodies, in particular in a materially bonded and/or form-fitting manner.

The battery module has in particular 4 to 24 galvanic cells, preferably 8 to 16 galvanic cells, for example 12 galvanic cells.

In one embodiment of the battery module, it is provided that the galvanic cells are prismatic cells, in particular substantially cuboid cells.

In particular, it is conceivable that the galvanic cells are designed according to the PHEV2 format.

It can be favorable if a cell housing of a respective galvanic cell is prismatic, in particular substantially cuboid.

In a battery module, in particular in a cell stack, a primary side of a galvanic cell and/or of a cell housing of the galvanic cell preferably faces a primary side of a further galvanic cell and/or a cell housing of the further galvanic cell.

A respective galvanic cell and/or a cell housing of a respective galvanic cell preferably comprise two primary sides and four secondary sides, in particular two short secondary sides and two long secondary sides. Preferably, the two primary sides and/or two secondary sides are arranged on opposing sides of a respective galvanic cell and/or of a cell housing of a respective galvanic cell.

A primary side of a respective galvanic cell and/or of a cell housing of a respective galvanic cell is understood to mean, in particular, a side that has a larger surface area than the secondary sides of a respective galvanic cell and/or of a cell housing of a respective galvanic cell.

Preferably, the short secondary sides have the same width as the long secondary sides, in particular in a direction running parallel to the stacking direction of the battery module. The long secondary sides preferably have a greater length than the short secondary sides, in particular in a direction running parallel to the stacking direction of the battery module.

In one embodiment of the battery module, it is provided that a respective galvanic cell comprises a cell housing in which the one or more cell windings of a respective galvanic cell are arranged.

A galvanic cell preferably comprises one or more cell windings ("jelly rolls").

In particular, a cell housing of a respective galvanic cell in each case delimits a receiving space in which the one or more cell windings of a respective galvanic cell are received.

Within the scope of this description and the appended claims, the galvanic cells mentioned are in particular secondary cells.

The galvanic cells are thus preferably rechargeable galvanic cells.

For example, it is conceivable that a respective galvanic cell comprises two cell windings in each case.

It can be favorable if the cell windings of a respective galvanic cell are arranged substantially parallel to one another.

Central planes of two cell windings arranged parallel to one another are preferably arranged parallel to one another.

A respective cell winding of the galvanic cell preferably comprises two deflection regions in which winding layers of the respective cell winding are deflected, wherein the winding layers having a common winding line in a respective deflection region.

A winding direction of a respective cell winding preferably runs perpendicular to the common winding lines of the two deflection regions of the respective cell winding.

A winding layer preferably comprises a plurality of layers, for example two electrode layers and two separator layers.

It can be favorable if electrode layers and separator layers are each arranged alternately in a winding layer.

A layer sequence in a winding layer of a cell winding is therefore preferably as follows: separator layer, electrode layer, separator layer, electrode layer.

The electrode layers preferably comprise or are formed from an electrically conductive material, for example aluminum and/or copper.

The separator layers preferably comprise or are formed from an electrically insulating material, for example polyethylene and/or polypropylene.

Within the scope of this description and the appended claims, specifications relating to the arrangement of winding layers of a respective cell winding of galvanic cells relate in particular to a new state of a respective cell winding and/or a respective galvanic cell. In particular, it is conceivable that, over the service life of a galvanic cell or a battery module comprising a plurality of galvanic cells, slight deviations with regard to the arrangement of the winding layers can occur due to aging phenomena.

The winding lines of the two deflection regions of a respective cell winding are preferably arranged substantially parallel to one another.

Cell windings of a galvanic cell are preferably formed axisymmetrically with respect to the common winding line in a deflection region.

In particular, it is conceivable that the winding layers of the respective cell winding are arranged substantially in a semicircle in a respective deflection region in a cross-section taken perpendicularly to the common winding line.

It can be favorable if the common winding line of winding layers of the respective cell winding forms a common central point of semicircularly arranged winding layers of the cell winding in a respective deflection region of the cell winding in a cross-section taken perpendicularly to the common winding line.

A respective cell winding of a galvanic cell comprises, in particular, a plurality of winding layers. Winding layers of the cell winding are preferably arranged substantially parallel to one another.

The cell winding preferably comprises a winding layer web that forms the winding layers. The winding layers are preferably formed by winding up the winding layer web.

In particular, it is conceivable that a single winding layer web comprises or forms all winding layers of a respective cell winding.

Winding layers of a respective cell winding are preferably arranged substantially parallel to a central plane of the cell winding in an intermediate region of the cell winding arranged between the two deflection regions of the cell winding.

It can be favorable if a cell winding comprises two deflection regions wherein each deflection region has a common winding line in each case that is arranged in the central plane of the cell winding.

A stacking direction of a battery module preferably runs substantially perpendicular to a central plane of cell windings of the galvanic cells of the battery module.

It can be favorable if winding layers of a respective cell winding are arranged in the intermediate region of the cell winding substantially perpendicularly to a stacking direction of the battery module and/or parallel to a central plane of the cell winding.

In the respective deflection region of the cell winding, winding layers of the cell windings are preferably deflected, in particular by approximately 180°.

Cell windings of a galvanic cell of the battery module are preferably flat windings.

Within the scope of this description and the appended claims, a flat winding is understood to mean, in particular, a cell winding that comprises a plurality of winding layers that are deflected in two deflection regions, wherein an intermediate region of the cell winding is arranged between the two deflection regions of the cell winding, in which winding layers of the cell winding are arranged parallel to a center plane of the cell winding.

In one embodiment of the battery module, it is provided that the one or more connecting bodies each comprise in particular a one-piece connecting material body made of a connecting material and/or in particular a one-piece receiving body.

A connecting material body of the one or more connecting bodies is in particular a body produced by casting.

It can be favorable if a respective receiving body forms a casting mold for the connecting material of the connecting material body when the connecting body is produced.

The connecting material body preferably comprises or is formed from a connecting material.

It can be favorable if the receiving body comprises a plastic material or is formed therefrom.

In particular, it is conceivable that the plastic material of the receiving body is a fiber-reinforced plastic material, for example a glass fiber-reinforced, aramid fiber-reinforced and/or carbon fiber-reinforced plastic material.

It can be favorable if the fiber-reinforced plastic material of the receiving body comprises a matrix material, for example polyamide, polypropylene or polybutylene terephthalate.

For example, it is conceivable that the plastic material of the receiving body is PA666-GF35 or PA66-GF50.

Alternatively, it is conceivable that the plastic material of the receiving body is PBT-GF30 order PBT-GF25.

In particular, the plastic material of the receiving body has a tensile strength of at least approximately 100 N/mm2, in particular of at least approximately 150 N/mm2, preferably of at least approximately 180 N/mm2.

For example, it is conceivable that the plastic material of the receiving body has a tensile strength of approximately 135 N/mm2.

It can be favorable if the plastic material of the receiving body has a creep safety factor (CTI) of at least approximately 400.

The receiving body is preferably an injection-molded body.

The receiving body is in particular an injection-molded component.

Preferably, the receiving body has an average wall thickness in the range of approximately 1 mm to approximately 5 mm, in particular in the range of approximately 1 mm to approximately 3 mm, for example approximately 2 mm.

As an alternative to plastic material, it is conceivable that the receiving body comprises or is formed from a metallic material, for example steel or aluminum.

In one embodiment of the battery module, it is provided that the connecting material body of a respective connecting body is, in particular, completely received in the receiving body of the connecting body.

It can be favorable if the connecting material body is received in the receiving body by placing the connecting material in a receptacle of the receiving body, in particular by pouring in a flowable and/or castable connecting material and by subsequent curing the connecting material received in the receiving body.

A flowable and/or castable connecting material is in particular also viscous or highly viscous.

A flowable and/or castable connecting material is in particular a mixture of a first component, in particular a resin material, and of a second component, in particular a hardening material.

For example, it is conceivable that a flowable and/or castable connecting material has a dynamic viscosity at 22° C. in the range from approximately 300 mPas to approximately 12000 mPas, for example in the range from approximately 300 mPas to approximately 10000 mPas, preferably in the range from approximately 500 mPas to approximately 4500 mPas.

Preferably, the connecting material body is materially bonded to the receiving body.

In one embodiment of the battery module, it is provided that the galvanic cells of the battery module, in particular cell housings of the galvanic cells, the connecting material of the connecting material body and the receiving body together form a composite component.

Preferably, the galvanic cells of the battery module, in particular the cell housings of the galvanic cells, the connecting material of the connecting material body and the receiving body together form a composite component, making it possible to realize a particularly high rigidity of the battery module in a direction parallel to the stacking direction of the battery module.

The connecting material body preferably comprises a connecting material by means of which the galvanic cells of the battery module are connected to one another in a materially bonded manner.

The connecting material in particular forms a connecting material body of the connecting body.

Preferably, all galvanic cells of the battery module are materially bonded to one another by means of the connecting material.

The galvanic cells of the battery module are cast with the connecting material preferably at normal pressure or at a negative pressure, for example at a pressure in the range of approximately 200 mbar to approximately 800 mbar.

The connecting material forms in particular one or more one-piece connecting material bodies, wherein a one-piece connecting material body preferably connects all galvanic cells of the battery module to one another in a materially bonded and/or form-fitting manner.

In one embodiment of the battery module, it is provided that the connecting material is a flowable and/or castable material.

The connecting material is in particular a potting material.

It can be favorable if the connecting material is a plastic material, in particular a thermosetting plastic material.

Preferably, the connecting material comprises or is formed from a resin material.

It can be favorable if the connecting material comprises or is formed by a polyurethane material, in particular a polyurethane resin.

For example, it is conceivable that the connecting material is a two-component casting resin based on polyurethane, polyethers and/or Polyester polyols.

Alternatively or additionally, it is conceivable for the connecting material to comprise or be formed by an epoxy material, in particular an epoxy resin.

Preferably, the connecting material comprises a casting resin, in particular a polyurethane casting resin or an epoxy casting resin, or is formed by the latter.

It can be favorable if the connecting material has a curing time at approximately 22° C. to a final chemical cure and/or complete cross-linking of approximately 7 days or approximately 168 hours.

Within the scope of this description and the appended claims, a final chemical cure is understood to mean in particular that there is no further cross-linking reaction.

Preferably, the connecting material has a temperature application range of approximately minus 60° C. to approximately 170° C.

For example, it is conceivable that the connecting material has a temperature application range of minus 40° C. to 140° C. or a temperature application range of minus 50° C. to approximately 160° C.

In one embodiment of the battery module, it is provided that the connecting material is a two-component material.

It can be favorable if the two-component material comprises a first component, for example a resin material, and a second component, for example a hardening material.

The hardening material is in particular a reaction triggering material which preferably initiates and/or triggers a cross-linking reaction of the resin material.

For example, it is conceivable that a temperature during curing and/or cross-linking of the connecting material is at most approximately 80° C., in particular at most approximately 70° C., preferably at most approximately 60° C.

The connecting material is in particular a material that cures by cross-linking.

The connecting material is preferably a resin material, in particular an artificial resin material.

It can be favorable if the connecting material is formed by a polyaddition reaction from a first component and a second component.

In particular, the connecting material has a pot life in the range of approximately 1 minute to approximately 60 minutes, preferably in the range of approximately 20 minutes to approximately 50 minutes, for example of approximately 40 minutes.

It can be favorable if the connecting material has a curing time of approximately 5 minutes to approximately 35 hours, in particular a curing time of approximately 1 hour to approximately 30 hours.

For example, it is conceivable that the connecting material will have a curing time of approximately 8 to 12 hours at 22° C.

Furthermore, it is conceivable that the connecting material has a curing time at 22° C. of approximately 16 to 30 hours.

It can further be favorable if the connecting material has a curing time of approximately 5 minutes to approximately 10 minutes.

Within the scope of this description and the appended claims, a curing time of the connecting material is understood to mean in particular a period of time within which the connecting material reaches at least approximately 80% of its maximum hardness and/or tensile strength, preferably at least approximately 90%.

In one embodiment of the battery module, it is provided that the connecting material has a density in the range of approximately 1.1 g/cm3 to approximately 2 g/cm3.

A density of the connecting material is in particular a density measured at 22° C.

In one embodiment of the battery module, it is provided that the connecting material has a thermal conductivity in the range of approximately 0.8 W/m*K to approximately 2 W/m*K.

It can be favorable, for example, if the connecting material has a thermal conductivity of approximately 1 W/m*K or a thermal conductivity of 1.5 W/m*K.

A thermal conductivity of the connecting material is in particular a thermal conductivity determined according to DIN EN ISO 22007-2:2008.

In one embodiment of the battery module, it is provided that the connecting material has a dielectric strength in the range of approximately 15 kV/mm to approximately 40 kV/mm, in particular in the range of approximately 20 kV/mm to approximately 36 kV/mm.

For example, it is conceivable that the connecting material has a dielectric strength of approximately 24 kV/mm or that the connecting material has a dielectric strength of approximately 28 kV/mm.

A dielectric strength of the connecting material is in particular a dielectric strength determined according to DIN EN 60243-1:2013.

In one embodiment of the battery module, it is provided that the connecting material has a volume resistivity in the range of approximately 10^14 Ω/cm to approximately 10^15 Ω/cm.

A specific volume resistance of the connecting material is in particular a specific volume resistance determined at 23° C. and 50% relative humidity according to DIN EN 60243-1:2013.

In one embodiment of the battery module, it is provided that the connecting material has a coefficient of thermal expansion in the range of approximately 50 ppm/K to approximately 210 ppm/K below a glass transition temperature of the connecting material and/or that the connecting material has a coefficient of thermal expansion in the range of approximately 50 ppm/K to approximately 250 ppm/K above a glass transition temperature of the connecting material.

A glass transition temperature of the connecting material is, for example, in the range of approximately 5° C. to approximately 90° C.

A glass transition temperature of the connecting material is, for example, approximately 10° C.

It can be favorable, for example, if the connecting material has a glass transition temperature of approximately 10° C. and if the connecting material has a coefficient of thermal expansion of approximately 7.5 ppm/K below the glass transition temperature and/or if the connecting material has a coefficient of thermal expansion of approximately 141.7 ppm/K above the glass transition temperature.

Thermal expansion coefficient of the connecting material below the glass transition temperature of the connecting material is in particular a thermal expansion coefficient determined according to ISO 11359-2:1999-10 at a temperature below the glass transition temperature of the connecting material.

A thermal expansion coefficient of the connecting material above the glass transition temperature of the connecting material is in particular a thermal expansion coefficient determined according to ISO 11359-2:1999-10 at a temperature above the glass transition temperature of the connecting material.

In one embodiment of the battery module, it is provided that the connecting material has a curing shrinkage in the range of approximately 0.5% to approximately 2%, for example approximately 1%.

Within the scope of this description and the appended claims, curing shrinkage is understood to mean, in particular, a volume shrinkage of the connecting material during complete curing and/or complete cross-linking of the connecting material.

The connecting material thus preferably takes up less volume after complete curing and/or complete cross-linking than before complete curing and/or before complete cross-linking.

In one embodiment of the battery module, it is provided that the connecting material of the connecting material body has a tensile strength in the range of approximately 5 N/mm2 to approximately 80 N/mm2, in particular in the range of approximately 30 N/mm2 to approximately 60 N/mm2.

Within the scope of this description and the appended claims, values relating to a tensile strength of the connecting material are in particular values of the fully cured and/or fully cross-linked connecting material.

In one embodiment of the battery module, it is provided that the connecting material has a modulus of elasticity in the range of approximately 2000 N/mm2 to approximately 14000 N/mm2, in particular in the range of approximately 8000 N/mm2 to approximately 12000 N/mm2.

Within the scope of this description and the appended claims, values relating to a modulus of elasticity of the connecting material are in particular values of the fully cured and/or fully cross-linked connecting material.

In one embodiment of the battery module, it is provided that a respective connecting body, in particular a respective receiving body of a connecting body, comprises a temperature control channel structure through which a temperature control medium can be conducted.

A temperature control medium is, for example, a temperature control liquid, in particular water.

The temperature control channel structure is preferably used to control the temperature of the galvanic cells of the battery module, in particular to cool or heat them.

A temperature control channel structure of a receiving body is, for example, a temperature control channel structure produced by roll bonding, in particular if the receiving body comprises or is formed from a metallic material, in particular aluminum.

Alternatively, it is conceivable that a temperature control channel structure of a receiving body is a temperature control channel structure produced by welding, in particular by friction welding, of a plurality of part bodies of the receiving body.

In one embodiment of the battery module, it is provided that the galvanic cells are arranged spaced apart from one another in the stacking direction, wherein the galvanic cells are arranged in particular substantially parallel to one another.

In particular, the galvanic cells are spaced apart from each other in the stacking direction of approximately 1 mm to approximately 5 mm, in particular of approximately 2 mm to approximately 4 mm, for example of approximately 2 mm.

Preferably, the galvanic cells are arranged at a distance from each other by means of the one or more connecting bodies, in particular by means of the two connecting bodies.

In particular, the primary sides of two adjacent galvanic cells, in particular the primary sides of the cell housings of two adjacent galvanic cells, are arranged substantially parallel to each other.

In one embodiment of the battery module, it is provided that one intermediate space is arranged between adjacent galvanic cells in each case.

The cell housings of two adjacent galvanic cells are preferably not in contact with one another in the intermediate space.

In one embodiment of the battery module, it is provided that one or more additional elements are arranged in the intermediate space, for example one or more propagation protection elements, one or more sensor elements and/or one or more temperature control elements.

For example, it is conceivable that sensor elements arranged in the intermediate space comprise or are formed by temperature sensors, expansion sensors and/or pressure sensors.

For example, a propagation protection element of a battery module comprises the following:

- a phyllosilicate, in particular mica, vermiculite and/or expanded graphite;
- basalt;
- a ceramic material; and/or
- a silicone mat having an endothermic filler.

A propagation protection element preferably has a thermal conductivity of at most approximately 1 W/m*K, in particular at most approximately 0.3 W/m*K, preferably at most approximately 0.1 W/m*K in a direction parallel to a stacking direction of a battery module.

It can be favorable if a propagation protection element has a heat resistance of at least approximately 600° C., for example a heat resistance of at least approximately 800° C.

By means of one or more temperature control elements arranged in the intermediate space, the galvanic cells adjacent to the intermediate space can preferably be temperature-controlled, for example cooled.

Heat can preferably be dissipated from the intermediate space by means of one or more temperature control elements arranged in the intermediate space.

The one or more temperature control elements arranged in the intermediate space are preferably designed for active temperature control of the galvanic cells adjacent to the intermediate space and/or for passive temperature control of the galvanic cells adjacent to the intermediate space.

Within the scope of this description and the appended claims, active temperature control is understood to mean, in particular, temperature control that is substantially based on convection, in particular on forced convection. Active temperature control is preferably implemented by means of a temperature control fluid flowing by way of external mechanical action, in particular by means of a temperature control liquid flowing by way of external mechanical action.

Within the scope of this description and the appended claims, passive temperature control is understood to mean, in particular, temperature control that takes place substantially by means of thermal conduction.

Propagation of a thermal runaway of a galvanic cell can preferably be delayed and/or prevented by means of one or more propagation protection elements arranged in the intermediate space.

In one embodiment of the battery module, it is provided that a receiving body of a respective connecting body has in each case a plurality of spacer elements which have a width parallel to the stacking direction of the battery module of approximately 1 to 5 mm, in particular of approximately 2 mm to approximately 4 mm, for example of approximately 2 mm.

Preferably, the galvanic cells of the battery module are positioned or can be positioned relative to one another and/or relative to a respective receiving body by means of the spacer elements.

It can be favorable if the spacer elements of a respective receiving body are arranged substantially parallel to each other.

The spacer elements of a respective receiving body have, parallel to the stacking direction, for example, a distance from one another which substantially corresponds to a width of a secondary side of a respective galvanic cell in a direction running parallel to the stacking direction of the battery module.

It can be favorable if spacer elements of a respective receiving body are designed as heat-conducting elements, in particular when the receiving body comprises or is formed from a metallic material.

It can also be favorable if spacer elements of a respective receiving body comprise a temperature control channel structure through which a temperature control medium, in particular temperature control liquid, can be conducted.

The spacer elements of the receiving body are, for example, separators.

Alternatively, it is conceivable that a respective spacer element comprises a plurality of separating pins which are in particular each arranged in alignment in a direction running perpendicular to the stacking direction of the battery module. A plurality of axially aligned separating pins preferably form a spacer element.

In one embodiment of the battery module, it is provided that a respective connecting material body of the one or more connecting bodies is connected to the galvanic cells of the battery module in a materially bonded and/or form-fitting manner.

In one embodiment of the battery module, it is provided that the galvanic cells of the battery module connect the one or more connecting bodies of the battery module to one another in a load-bearing manner.

In one embodiment of the battery module, it is provided that the battery module comprises two connecting bodies, wherein a connecting body is respectively arranged on a respective short secondary side of the galvanic cells of the battery module.

In particular, a connecting body is arranged on each of the two short secondary sides of the galvanic cells of the battery module.

The battery module thus preferably comprises two connecting bodies, each comprising a receiving body and a connecting material body.

The battery module comprises in particular a first connecting body by means of which all galvanic cells are connected to a first side thereof.

The battery module preferably further comprises a second connecting body, by means of which all galvanic cells are connected to a second side thereof.

In one embodiment of the battery module, it is provided that a respective connecting body in each case surrounds a short secondary side of the galvanic cells completely and/or in that a respective connecting body partially surrounds both long secondary sides of the galvanic cells.

It can also be favorable if a respective connecting body partially surrounds a primary side of two outer galvanic cells in a stacking direction of the battery module.

In one embodiment of the battery module, it is provided that a respective receiving body of a connecting body has a C-shaped cross-section.

A cross-section of the receiving body is in particular a cross-section taken perpendicular to the stacking direction of the battery module.

A respective receiving body is preferably cup-shaped or tub-shaped.

A cup-shaped receiving body and/or a C-shaped receiving body comprises in particular a floor wall element and four side wall elements, in particular two short side wall elements and two long side wall elements.

The floor wall element and/or the four side wall elements are in particular designed to be substantially rectangular in a respective plan view.

Preferably, a respective receiving body comprises a receptacle in which the connecting material body of the connecting body is received.

It can be favorable if the receptacles of the two receiving bodies are arranged facing each other.

In the receptacle of a first receiving body, all short secondary sides of the galvanic cells of the battery module are preferably arranged on a first side of the galvanic cells.

In the receptacle of a second receiving body, preferably all short secondary sides of the galvanic cells of the battery module are respectively arranged on a second side of the galvanic cells.

In one embodiment of the battery module, it is provided that the battery module comprises one or more connecting elements for the detachable and/or tool-free fixing of a cover element on the battery module.

In one embodiment of the battery module, it is provided that one or more connecting elements for detachable and/or tool-free fixing of the cover element on the battery module are designed as hook-and-loop fastener elements, in particular as hook-and-loop fasteners.

In one embodiment of the battery module, it is provided that one or more connecting elements are designed for the detachable and/or tool-free fixing of the cover element on the battery module as magnetic elements, in particular as magnetic strips.

Furthermore, an adhesive connection can be provided as one or more connecting elements for fixing the cover element to the battery module, at least without tools.

In addition, it is conceivable that one or more rows of individual magnets form one or more connecting elements for the detachable and/or tool-free fixing of the cover element on the battery module.

It can be favorable if one or more connecting elements are fixed to the cover element by means of an adhesive connection for detachable fixing the cover element to the battery module and/or to fix it without tools. At least one sub-element of the one or more connecting elements is preferably fixed to the cover element by means of an adhesive connection.

It can be favorable if the one or more connecting elements for detachable and/or tool-free fixing of the cover element to the battery module each comprise two sub-elements, wherein one of the sub-elements of each connecting element is fixed or fixable, in particular glued or glueable, to the cover element and another is fixed or fixable, in particular glued or glueable, to the battery module.

The sub-elements of the one or more connecting elements are preferably each individually non-detachably fixed to the cover element or to the battery module. A tool-free and/or detachable connection between the cover element and the battery module then preferably results from the fact that the two sub-elements can be fixed to each other in a detachable and/or tool-free manner.

One or more connecting elements, preferably one or two or more than two sub-elements of one or more connecting elements, can in particular comprise a plastic material or be formed from a plastic material.

For example, plastic material may include the following: Poly(p-phenylene terephthalamide) (PPTA) and/or poly(m-phenylene isophthalamide) (PMPI).

Alternatively or additionally, it can be provided that one or more connecting elements for the detachable and/or tool-free fixing of the cover element on the battery module, preferably one or two or more than two sub-elements of one or more connecting elements for detachable and/or tool-free fixing of the cover element on the battery module, comprise a metal material or are formed from a metal material.

For example, plastic hook-and-loop fastener elements and/or metal hook-and-loop fastener elements can be provided.

A hook-and-loop fastener element is to be understood in particular as a connecting element for detachable and/or tool-free fastening of the cover element to the battery module, which comprises, for example, two sub-elements with a plurality of individual connecting elements which can be brought into engagement with one another in order to connect the sub-elements.

In particular, the individual connecting elements are hooks and eyelets or loops and/or mushroom head-like projections, latching elements and receptacles corresponding thereto, etc.

For example, the following combinations can be provided as individual connecting elements of the sub-elements:

hook and loop tape (felt belt); and/or
mushroom tape and velour tape; and/or
mushroom tape and loop tape; and/or
mushroom tape on mushroom tape; and/or
extruded hooks/mushrooms on fabric.

For example, individual connecting elements are flexible barbs and flexible loops.

For example, a hook-and-loop fastener element, in particular one or more sub-elements of the hook-and-loop fastener element, can comprise or be formed from a woven, knitted or fabric hook and loop tape.

In particular, polyamide, polyaramide, polyester and polyolefin fibers can be provided as starting material, especially as starting fibers.

Furthermore, it can be provided that one or more connecting elements, preferably one or two or more than two sub-elements of one or more connecting elements, comprise or are formed from a glass material, in particular glass fibers. In particular, heat-resistant and/or chemical-resistant connecting elements can be produced from this.

It can be advantageous if one or more connecting elements, preferably one or two or more than two sub-elements of one or more connecting elements, are provided with an impregnation, in particular a fire-retardant and/or self-extinguishing impregnation.

It can also be advantageous if one or more connecting elements, preferably one or two or more than two sub-elements of one or more connecting elements, comprise or are formed from a plastic material with one or more flame-retardant and/or self-extinguishing additives (aggregates).

In one embodiment of the battery module, it is provided that the one or more connecting elements for detachable and/or tool-free fixing of a cover element to the battery module is arranged on an upper side of the connecting body, in particular of the receiving body, facing the cell poles of the galvanic cells of the battery module.

In particular, it can be provided that in each case one or more connecting elements are arranged for the detachable and/or tool-free fixing of a cover element on the battery module on an upper side of two connecting bodies, in particular two receiving bodies, of the battery module.

It can be favorable, in particular, if one or more connecting elements for the detachable and/or tool-free fixing of a cover element on the battery module are arranged on a long side wall element of the receiving body of a respective connecting body.

In one embodiment of the battery module, it is provided that a width of a connecting material body in a direction perpendicular to the stacking direction of the battery module and parallel to a long secondary side of the galvanic cells corresponds approximately to a total of a wall thickness of a cell housing wall of a cell housing of a galvanic cell, a distance of a cell winding of the galvanic cell to the cell housing wall of the cell housing, and a width of a deflection region of a cell winding of the galvanic cell.

A width of the connecting material body in a direction running perpendicular to the stack direction and parallel to a long secondary side of the galvanic cells is in particular a width taken in a direction running parallel to a winding direction and/or perpendicular to a common winding line of a deflection region of a cell winding of a galvanic cell.

A width of the connecting material body in particular corresponds to an immersion depth of the galvanic cells in the connecting material of the connecting material body.

It can be favorable if a width of the connecting material body and/or an immersion depth of the galvanic cells is in the range of approximately 1 mm to approximately 8 mm, in particular from approximately 3 mm to approximately 7 mm.

In one embodiment of the battery module, it is provided that two galvanic cells adjacent in the stacking direction and/or two connecting bodies of the battery module in a direction running perpendicular to the stacking direction of the battery module and/or parallel to a short secondary side of the galvanic cells, in particular in a direction running parallel to the direction of the force of gravity, each bound a ventilation duct.

In particular, the two primary sides of the galvanic cells adjacent to each other in the stacking direction are spaced apart.

In particular, at least approximately 50%, preferably at least approximately 75%, of the respective surfaces of the two primary sides are spaced apart.

The primary sides of galvanic cells adjacent in the stacking direction are preferably arranged substantially parallel to one another.

In one embodiment of the battery module, it is provided that the battery module comprises a fan device which is arranged and designed in such a manner that the fan device can be used to generate an air flow that is directed into ventilation ducts of the battery module.

In one embodiment of the battery module, it is provided that a respective connecting body, in particular a respective receiving body, comprises one or more fastening elements, by means of which the battery module can be fixed to a housing of a battery device and which are in particular each designed for a connecting element to pass therethrough.

It can be favorable if the fastening elements are each arranged in end regions of a respective receiving body.

In particular, a respective receiving body comprises two fastening elements. Preferably, a respective battery module comprises four fastening elements.

The fastening elements are, in particular, sleeve elements for the passage of a screw element, for example a screw.

Preferably, a respective battery module can be fixed to a housing of a battery device by means of the fastening elements.

It can also be favorable if a battery module can be fixed to a housing of a battery device by means of a tensioning belt.

A longitudinal axis of the sleeve elements runs, for example, substantially parallel to a common winding line of a cell winding of a galvanic cell and/or parallel to a short secondary side of a galvanic cell.

Preferably, the fastening elements comprise or are formed from a metallic material, in particular steel or aluminum.

The fastening elements are, in particular, metallic sleeves.

Preferably, the fastening elements of a respective connecting body, in particular a respective receiving body, are overmolded with the plastic material of the receiving body.

In particular, the fastening elements are overmolded with the plastic material of the receiving body during the production of a respective receiving body in an injection molding process.

Alternatively, it is conceivable that the fastening elements of a respective receiving body are pressed into the plastic material of the receiving body. In particular, the receiving body is first produced in an injection molding process, wherein the fastening elements are subsequently pressed into openings of the receiving body which are introduced into the receiving body when the receiving body is produced.

In one embodiment of the battery module, it is provided that two connecting bodies of the battery module are connected or can be connected to one another in a force-fitting and/or form-fitting manner.

It can be favorable if the battery module comprises one or more clamping elements by means of which the two connecting bodies of the battery module are connected or can be connected to one another in a force-fitting and/or form-fitting manner.

In particular, a clamping force can be exerted on the two connecting bodies of the battery module by means of one or more clamping elements of the battery module, in particular a clamping force directed in a direction running perpendicular to the stacking direction of the battery module and parallel to a long secondary side of the battery module.

In particular, the two connecting bodies of a battery module can be clamped to one another and/or one on top of the other by means of one or more clamping elements.

One or more clamping elements of the battery module are, in particular, clamp elements.

In one embodiment of the battery module, it is provided that a respective receiving body of a connecting body comprises a fastening device for fastening a cell contacting system of the battery module.

The battery module preferably comprises a cell contacting system, which, in particular, comprises a plurality of cell connection elements.

By means of the fastening device, the cell contacting system, in particular, is fastened or can be fastened to the receiving body.

It can be favorable if the fastening device comprises a carrier device to which a cell contacting system of the battery module is fastened or can be fastened.

By means of a respective cell connection element, cell poles of two galvanic cells in particular are connected or can be connected to each other, in particular cell poles of two galvanic cells adjacent in the stacking direction.

In one embodiment of the battery module, it is provided that the battery module comprises a plurality of cell connection elements, which are formed substantially flat and/or even.

By means of a cell connection element, two galvanic cells are electrically connected or can be connected to each other.

The cell connection elements of the battery module preferably comprise or are formed from a metallic material, in particular a sheet metal material.

A respective cell connection element comprises, in particular, two connection sections, wherein the cell connection element is electrically connected or can be connected to a cell pole of a galvanic cell by means of a connection section.

In particular, the cell connection elements of the battery module do not comprise any equalizing sections by means of which a space between the two connection sections of a respective cell connection element can be changed.

In one embodiment of the battery module, it is provided that the battery module comprises a plurality of cell connection elements by means of which cell poles of two galvanic cells of the battery module are connected or can be connected to one another, wherein a respective cell connection element comprises a heat conduction section by means of which heat can be discharged from the respective cell connection element.

Preferably, the galvanic cells of the battery module can be cooled by dissipating heat from the cell connection elements of the battery module.

In particular, a respective cell connection element is connected or can be connected to a cell pole of one or more battery modules.

In one embodiment of the battery module, it is provided that the heat conduction section of a respective cell connection element is thermally coupled to a connecting material body of a connecting body, in particular is thermally conductively connected.

It can be favorable, in particular, if the heat conduction section of a respective cell connection element is at least partially, preferably substantially fully, enclosed by the connecting material of the connecting material body.

In particular, it can be provided that the heat conduction section of a respective cell connection element is cast into the connecting material of the connecting material body.

In one embodiment of the battery module, it is provided that a respective connecting body of the battery module comprises one or more connecting sections by means of which the connecting body can be connected to a connecting body of an adjacent battery module.

It can be favorable if a respective connecting section of the connecting body comprises one or more undercut sections or is formed by the latter.

Preferably, two adjacent battery modules can be connected to one another by means of one or more undercut elements, in particular by inserting an undercut element into a connecting section of a first battery module and into a connecting section of a second battery module, preferably along a longitudinal direction of the connecting section of the first battery module and/or the connecting section of the second battery module.

A connecting section comprises, in particular, a groove which is preferably designed as a profile groove.

A respective profile groove of the connecting section is preferably arranged substantially perpendicular to the stacking direction of the battery module and/or parallel to a short secondary side of the galvanic cells of the battery module.

It can be favorable, in particular, if a respective connecting body comprises a plurality of, for example two connecting sections.

It is, in particular, conceivable for the battery module to comprise a total of four or more than four connecting sections, for example four profile grooves.

It can be favorable if an undercut element is designed as a profile strip or profile block, in particular as a sliding block.

Preferably, a cross-section of the profile groove is formed complementary to a cross-section of the undercut element.

For example, it is conceivable that a profile groove is T-shaped in cross-section.

An undercut element is preferably double-T-shaped in cross-section

Alternatively or additionally, it is conceivable that a profile groove is designed as a regular trapezoid in a cross-section.

An undercut element is preferably designed as a double regular trapezoid in a cross-section.

The undercut element is, for example, a dovetail profile, in particular a double dovetail profile.

In one embodiment of the battery module, it is provided that an electrical insulation film is arranged at least partially or only partially on a surface of the galvanic cells, in particular on a surface of the cell housings of the galvanic cells.

The galvanic cells, in particular the cell housings of the galvanic cells, are welded into the electrical insulation film, for example.

Alternatively, it is conceivable that the electrical insulation film comprises an adhesive material and is affixed onto the galvanic cells, in particular on the cell housings of the galvanic cells.

For example, it is conceivable that an electrical insulation film is arranged only on a cell base wall element of the cell housing of a respective galvanic cell and/or on a part of a surface of the four cell side wall elements of the cell housing of a respective galvanic cell.

In particular, it is conceivable that an electrical insulation film is arranged on at least 20% of a surface of the cell side wall elements of the cell housing.

If the electrical insulation film is arranged only partially on a surface of the galvanic cells, in particular on a surface of the cell housings of the galvanic cells, adhesion of the connecting material to the surface can preferably be improved, since the connecting material adheres better to the surface of the galvanic cells, in particular the cell housing of the same, than the electrical insulation film.

In one embodiment of the battery module, it is provided that one or more connecting bodies are arranged on a long secondary side of the galvanic cells, in particular on a long secondary side of the galvanic cells which face away from the cell poles of the galvanic cells.

A respective connecting body preferably comprises a particularly one-piece receiving body and a particularly one-piece connecting material body.

In one embodiment of the battery module, it is provided that the battery module comprises only a single connecting body which is arranged on the long secondary side of the galvanic cells.

In particular, it can be provided that all long secondary sides of the galvanic cells of the battery module, which are facing away from the cell poles of the galvanic cells, are completely arranged in a receptacle of the receiving body of the single connecting body.

It may be favorable if a receiving body of the connecting body comprises a temperature control channel structure through which a temperature control medium, in particular a temperature control liquid, can be conducted. In particular, a cell base of the galvanic cells of the battery module can be cooled with such a temperature control channel structure.

It may be favorable if a battery module, which comprises only a single connecting body which is arranged on the long secondary side of the galvanic cells facing away from the cell poles of the galvanic cells, does not comprise any further connecting bodies arranged on the short secondary sides of the galvanic cells.

A connecting body arranged on the long secondary side of the galvanic cells facing away from the cell poles of the galvanic cells preferably encloses at most approximately 40%, in particular at most approximately 20%, of a surface of the short secondary sides and/or the primary sides of the galvanic cells.

In one embodiment of the battery module, it is provided that the battery module comprises a plurality of connecting bodies, which are, in particular, arranged parallel to one another and/or parallel to a stacking direction of the battery module.

In one embodiment of the battery module, it is provided that a receiving body of a respective connecting body comprises two side wall elements and a bottom wall element, wherein the side wall elements of the receiving body each comprise one or more receiving areas in which a galvanic cell of the battery module is received in each case.

In particular, the side wall elements project substantially perpendicularly away from the floor wall element.

In one embodiment of the battery module, it is provided that the side wall elements of the receiving body comprise one or more sealing elements for sealing between a respective side wall element and a galvanic cell.

One or more sealing elements of the side wall elements are, in particular, arranged in the region of the receiving areas of the side wall elements.

In particular, a seal in the region of the receiving areas of the side wall elements can be realized by means of the sealing elements.

In particular, one or more sealing elements in the region of the receiving areas can prevent leakage of connecting material from the receiving body during production of the battery module, especially when the connecting material is cast into the receiving body.

One or more sealing elements arranged in the region of the receiving areas of the side wall elements are preferably designed to be compressible.

It can be favorable, for example, if one or more sealing elements arranged in the region of the receiving areas of the side wall elements comprise or are formed from a rubber material.

Preferably, a height tolerance of the galvanic cells of the battery module can be compensated by means of the one or more sealing elements arranged in the region of the receiving areas of the side wall elements.

A respective receiving area of a side wall element of the receiving body preferably has a width in a direction parallel to the stacking direction of the battery module, which is substantially equal to a width of the galvanic cells in the direction parallel to the stacking direction of the battery module.

It can be favorable, in particular, if the side wall elements of the receiving body comprise several receiving areas, wherein a spacing area is arranged between two receiving areas of a side wall element.

A respective receiving area of a side wall element of the receiving body is preferably bounded by two spacing areas.

The spacing areas of a respective side wall element are preferably designed as rectangular projections.

The receiving areas of a respective side wall element are preferably designed as rectangular recesses.

It can be favorable if the side wall elements of the receiving body are mirror-symmetrical to a mirror plane of the receiving body.

Preferably, receiving areas and/or spacing areas of the side wall elements of the receiving body are arranged to be substantially congruent.

The receiving body preferably further comprises two closing elements, which are arranged or can be arranged perpendicular to the two side wall elements and perpendicular to the bottom wall element.

A receptacle of the receiving body can preferably be closed by means of the closing elements.

The two side wall elements, the two closing elements and the floor wall element of the receiving body in particular form and/or bound a receptacle of the receiving body.

It can be favorable if the receiving body, in particular the two side wall elements and/or the floor wall element of the receiving body, comprise a temperature control channel structure through which a temperature control medium, in particular a temperature control liquid, can be conducted.

In one embodiment of the battery module, one or more sealing elements are arranged on edges of the side wall elements.

One or more sealing elements are arranged in particular on edges of the side wall elements in the region of the receiving areas of a respective side wall element.

In one embodiment of the battery module, it is provided that the battery module comprises one or more, for example two, clamping sections and/or tensioning sections, wherein the battery module can preferably be connected to a housing of a battery device by means of the clamping sections and/or tensioning sections, in particular can be fixed to the housing in a clamping and/or tensioning manner.

For example, it is conceivable that the clamping sections and/or tensioning sections are formed as grooves, wherein a longitudinal direction of the grooves is arranged in particular substantially parallel to the stacking direction of the battery module.

Alternatively or additionally, it is conceivable that the clamping sections and/or tensioning sections are formed as grooves, wherein a longitudinal direction of the grooves is arranged in particular substantially perpendicular to the stacking direction of the battery module.

In particular, it can be provided that the battery module comprises two clamping sections and/or tensioning sections, which are arranged parallel to each other.

In one embodiment of the battery module, it is provided that the one or more connecting bodies of the battery module, in particular a respective receiving body of the one or more connecting bodies, each comprise one or more, for example two, clamping sections and/or tensioning sections.

One or more, for example two, clamping sections and/or tensioning sections of a respective connecting body of the battery module, in particular of a respective receiving body of the connecting body, are preferably arranged at an edge region of the connecting body, in particular of the receiving body.

It can be favorable if a battery device comprises one or more clamping elements and/or tensioning elements by means of which a respective battery module can be connected to a housing of the battery device.

The clamping elements and/or tensioning elements of the battery device can be screwed in particular to a housing base of a housing of a battery device, in particular by passing a screw element through the clamping elements and/or tensioning elements and then screwing the screw element into the housing base of the housing of the battery device.

Preferably, clamping sections and/or tensioning sections of a respective connecting body, in particular of a respective receiving body of the connecting body, of the battery module and/or clamping elements and/or tensioning elements of the battery device are formed in such a manner that a respective battery module, when the clamping elements and/or tensioning elements are moved in a direction perpendicular to the stacking direction of the battery module and parallel to a short secondary side of the galvanic cells, for example when the clamping elements and/or the tensioning elements are screwed to the housing base of the housing of the battery device, is clamped and/or tensioned in a direction running perpendicular to the stacking direction parallel to a long secondary side of the galvanic cells.

In particular, it may be provided that the clamping sections and/or tensioning sections of the battery module, in particular of the connecting body of the battery module, and the clamping elements and/or tensioning elements of the battery device each comprise an inclined surface arranged at an angle to the short secondary sides of the galvanic cells.

Clamping elements and/or tensioning elements of the battery device are preferably formed substantially complementary to clamping sections and/or tensioning sections of the connecting body.

In particular, clamping elements and/or tensioning elements can be at least partially inserted into clamping sections and/or tensioning sections of the connecting body.

Clamping elements and/or tensioning elements of the battery device are, for example, clamping strips or sliding blocks.

By means of a clamping strip, a plurality of battery modules can preferably be connected to a housing of a battery device.

By means of one or more sliding blocks, individual battery modules in particular can be connected to a housing of a battery device.

If the clamping elements and/or tensioning elements of the battery device are sliding blocks, it can be provided that several clamping elements are arranged in an axially aligned manner.

The present invention further relates to a battery device which comprises one or more battery modules, in particular one or more battery modules according to the invention.

The battery device according to the invention preferably also has one or more of the features and/or advantages described in connection with the battery module according to the invention.

The battery module according to the invention preferably has one or more of the features and/or advantages described in connection with the battery device according to the invention.

In one embodiment of the battery device, it is provided that the battery device comprises a housing which comprises a cover element, wherein the cover element is fixed or can be fixed to the housing indirectly via the one or more battery modules, in particular by means of one or more connecting elements for detachable and/or tool-free fixing of the cover element to the one or more battery modules.

A housing of the battery device comprises in particular an interior space in which one or more battery modules of the battery device are arranged or can be arranged.

It can be favorable if the interior of the housing is closed or can be closed by means of a single cover element.

In particular, the battery modules of the battery device do not comprise an additional battery module cover element different from the cover element of the battery device.

Preferably, the cover element of the housing closes or can close an interior space in which one or more battery modules of the battery device are arranged or can be arranged.

It can be favorable if the cover element is only connected to the connecting bodies of one or more battery modules, in particular by means of one or more connecting elements for detachable and/or tool-free fixing of the cover element on one or more battery modules.

Preferably, rigidity of the battery device can be increased by connecting the cover element of the battery device to the battery modules of the battery device.

In one embodiment of the battery device, it is provided that the battery device comprises a temperature control device comprising one or more temperature control elements, wherein one or more temperature control elements of the temperature control device are preferably arranged between two adjacent battery modules of the battery device and/or wherein one or more temperature control elements are preferably arranged on a side of a respective battery module facing away from the cell poles of the galvanic cells of one or more battery modules.

Heat can preferably be dissipated from the galvanic cells of the battery modules of the battery device by means of one or more temperature control elements of the temperature control device.

Temperature control elements, which are arranged on a side of the respective battery module facing away from the cell poles of the galvanic cells of one or more battery modules, can preferably be used to control the temperature of a cell base of the galvanic cells, in particular to cool or heat it.

One or more temperature control elements, which are arranged on a side of the respective battery module facing away from the cell poles of the galvanic cells of one or more battery modules, are preferably in thermal contact with a cell base of the galvanic cells.

It can be favorable if one or more temperature control elements are in thermal contact with the cell base by embedding the cell base of the galvanic cells in the connecting material and/or if one or more temperature control elements are in thermal contact with the cell base of the galvanic cells by means of a heat-conducting paste.

Preferably, temperature control elements of the temperature control device arranged between two adjacent battery modules of the battery device are each arranged between the short secondary sides of the galvanic cells of the two adjacent battery modules.

Temperature control elements arranged between two adjacent battery modules, in particular between the short secondary sides of the galvanic cells of the battery modules, are preferably in thermal contact with the short secondary sides of the galvanic cells.

One or more temperature control elements of the temperature control device comprise, in particular, a temperature control channel structure through which a temperature control medium, in particular a temperature control liquid, can be conducted.

A temperature control channel structure of the temperature control elements comprises, for example, one or more temperature control channels which are arranged, in particular, in a meander shape.

Temperature control elements of the temperature control device are, for example, temperature control elements produced by "roll bonding".

It can be favorable if a length of a temperature control element arranged between two adjacent battery modules corresponds at least to approximately 50% of a length of the battery modules in a direction parallel to the stacking direction, in particular at least approximately 75%, preferably at least approximately 95%.

In one embodiment of the battery device, it is provided that the battery device comprises a plurality of undercut elements, wherein battery modules adjacent in a stacking direction are each connected or can be connected to one another by means of one or more undercut elements.

Adjacent battery modules are preferably connected or can be connected to each other by inserting an undercut element in each of two connecting sections of the adjacent battery modules.

Preferably, the connecting bodies, in particular the receiving bodies, of the adjacent battery modules are in direct contact with each other, with the exception of the connecting sections.

In particular, adjacent battery modules are tensioned or can be tensioned against each other by inserting an undercut element into connecting sections of the adjacent battery modules.

In one embodiment of the battery device, it is provided that the battery device comprises a housing, wherein battery modules of the battery device are connected or can be connected to the housing by means of one or more undercut elements.

In particular, the housing comprises a plurality of connecting sections into which an undercut element can be inserted to connect the housing to a battery module.

A battery module is preferably connected or can be connected to the housing of the battery device by inserting an undercut element into a connecting section of the battery module and into a connecting section of the housing.

In one embodiment of the battery device, it is provided that the battery device comprises a housing and a plurality of clamping elements and/or tensioning elements by means of which one or more battery modules can be connected to a housing of the battery device.

In particular, the clamping elements and/or tensioning elements can be connected to the housing and/or to a threaded section fixed to the housing by means of one or more screw elements, in particular by screwing.

Preferably, the clamping elements and/or tensioning elements can be moved to the housing, in particular to a bottom wall of the housing, when they are connected to the housing of the battery device.

One or more battery modules can be fixed to the housing of the battery device in particular by clamping and/or tensioning by means of the clamping elements and/or tensioning elements.

Preferably, a respective battery module comprises two clamping sections and/or tensioning sections, which are arranged in particular parallel to each other.

It can be favorable in particular if a battery module is connected or can be connected to the housing of the battery device by means of two respective clamping elements and/or tensioning elements, wherein the clamping elements and/or tensioning elements are connected to the housing of the battery device in particular by screwing.

Preferably, the clamping sections and/or tensioning sections of a respective battery module and/or the clamping elements and/or tensioning elements are designed in such a manner that the battery modules are clamped and/or tensioned by screwing the clamping elements and/or tensioning elements in a plane running perpendicular to a screwing direction.

The clamping sections and/or tensioning sections of a respective battery module and/or the clamping elements and/or tensioning elements preferably comprise an inclined surface which is arranged in particular at an angle to a screwing direction.

It can be advantageous if several battery modules are arranged or can be arranged parallel to each other by means of the clamping elements and/or tensioning elements, in particular by means of several clamping strips abutting each other and/or at a distance from each other.

In particular, it is conceivable that connecting bodies, especially connecting material bodies of the connecting bodies, of adjacent battery modules are connected to each other in a thermally conductive manner. Preferably, heat can be dissipated from the battery modules through the connecting material of the connecting material bodies.

In one embodiment of the battery device, it is provided that adjacent battery modules perpendicular to a stacking direction of the battery modules are connected to each other by means of a common connecting body.

In particular, the common connecting body comprises a common receiving body and/or a common connecting material body.

In particular, the galvanic cells of a respective adjacent battery module are each connected to the common connecting body.

It can be favorable if galvanic cells of two adjacent battery modules perpendicular to a stacking direction of the battery modules are each arranged in receiving areas of side wall elements of a common receiving body of the common connecting body.

Galvanic cells of two battery modules adjacent perpendicular to a stacking direction of the battery modules are preferably connected to one another by material bonding by means of a common connecting material body of the common connecting body.

The present invention is also based on the further object of providing a method for producing a battery module, in particular a battery module according to the invention, by means of which a battery module with an increased service life can be produced and which, in particular, can be carried out easily and cost-effectively.

This object is achieved by a method for producing a battery module, in particular a battery module according to the invention, with the features of the independent method claim.

The method according to the invention for producing a battery module preferably has one or more of the features and/or advantages described in connection with the battery module and/or battery device according to the invention.

The battery module according to the invention and/or the battery device according to the invention preferably have one or more of the features and/or advantages described in connection with the method for producing a battery module according to the invention.

The method preferably comprises the following:

- providing a plurality of galvanic cells;
- providing a first casting mold, in particular a first receiving body, which comprises a receptacle;
- arranging the galvanic cells along a stacking direction in the receptacle of the first casting mold, in particular of the first receiving body;
- introducing a particularly flowable and/or castable connecting material into the receptacle of the first casting mold, in particular of the first receiving body.

In particular, the connecting material is cast into the receptacle of the first casting mold, in particular the first receiving body.

In one embodiment of the method, it is provided that the connecting material cures and/or cross-links after introduction thereof into the receptacle of the first casting mold, in particular of the first receiving body.

During curing and/or cross-linking, in particular, a connecting material body of a connecting body is formed, which connects the galvanic cells to each other in the stacking direction.

It can be favorable if the connecting material body is removed from the casting mold after curing and/or cross-linking of the connecting material. In particular, the connecting material body forms a connecting body which connects the galvanic cells to each other in the stacking direction.

Alternatively, it is conceivable that the connecting material body remains form-fitted in the receiving body after curing and/or cross-linking of the connecting material. In particular, the connecting material body forms a connecting body together with the receiving body, which connects the galvanic cells to one another in the stacking direction.

It can be favorable if the galvanic cells are arranged in alignment in the receptacle along the stacking direction.

In one embodiment of the method, it is provided that the galvanic cells in the receptacle of the first casting mold and/or of the first receiving body are arranged substantially parallel to one another and/or at a distance from one another.

In one embodiment of the method, it is provided that the galvanic cells are arranged in a plurality of receptacles of a plurality of first casting molds, in particular a plurality of first receiving bodies, wherein the flowable and/or castable connecting material is introduced into the plurality of receptacles of the plurality of first casting molds, in particular the plurality of first receiving bodies.

In one embodiment of the method, it is provided that the galvanic cells are cast on a first side of the galvanic cells when the connecting material is introduced into the receptacle of the first casting mold, in particular of the first receiving body.

For example, the galvanic cells are cast on a short secondary side of the same with the connecting material.

Alternatively or additionally, it is conceivable for the galvanic cells to be cast with the connecting material on a long secondary side of the same.

In one embodiment of the method, it is provided that the galvanic cells, after curing and/or cross-linking of the connecting material in the receptacle of the first casting mold, in particular of the first receiving body, are arranged in a receptacle of a second casting mold, in particular of a second receiving body, and subsequently a particularly flowable and/or castable connecting material is introduced into the receptacle of the second casting mold, in particular the second receiving body.

In one embodiment of the method, it is provided that the connecting material cures and/or cross-links after introduction thereof into the receptacle of the second casting mold, in particular of the second receiving body.

In one embodiment of the method, it is provided that the galvanic cells are cast on a second side of the galvanic cells when the connecting material is introduced into the receptacle of the second casting mold, in particular of the second receiving body.

In particular, the second side of the galvanic cells is a side of the galvanic cells facing away from the first side.

The first side and the second side are in particular the short secondary sides of the galvanic cells and/or the cell housings of the galvanic cells.

It can be favorable if the connecting material does not fully cure and/or cross-link until after the galvanic cells on the first side and the second side have been cast.

In one embodiment of the method, it is provided that the galvanic cells are fixed on a second side while the connecting material is introduced into the receptacle of the first casting mold, in particular of the first receiving body.

In particular, the galvanic cells are fixed on the second side while the galvanic cells are cast on the first side.

Preferably, the galvanic cells are positioned and/or fixed relative to one another during the introduction of the connecting material into the receptacle of the first casting mold, in particular of the first receiving body, and/or during the casting of the galvanic cells on the first side in such a manner that primary sides of the cell housings of the galvanic cells are arranged substantially parallel to one another.

It can be favorable if the galvanic cells are positioned and/or fixed relative to each other by means of a positioning device, for example by means of a receiving body, while casting the galvanic cells on the first side.

In one embodiment of the method, it is provided that the connecting material is first introduced, in particular cast, into a receptacle of a casting mold, in particular of a receiving body, for casting the galvanic cells on a first side and/or on a second side of the galvanic cells, wherein the galvanic cells are then preferably introduced into the still flowable and/or castable connecting material, in particular are pressed into the still flowable and/or castable connecting material.

Alternatively, it is conceivable that the galvanic cells on a first side and/or on a second side of the galvanic cells are first introduced into a receptacle of a casting mold, in particular of a receiving body, for casting the galvanic cells, wherein the connecting material is subsequently introduced, in particular cast, into the receptacle of the casting mold, in particular of the receiving body.

In one embodiment of the method, it is provided that the galvanic cells are heated before the connecting material is introduced into a receptacle of the first casting mold, in particular of the first receiving body, and/or before the connecting material is introduced into a receptacle of a second casting mold, in particular of a second receiving body.

In one embodiment of the method, it is provided that the connecting material is heated, in particular by supplying heat, before the introduction and/or after the introduction thereof into a receptacle of the first casting mold, in particular of the first receiving body, and/or before the introduction and/or after the introduction thereof into a receptacle of the second casting mold, in particular of a second receiving body.

Preferably, the galvanic cells are heated to a temperature in the range of approximately 20° C. to approximately 60° C., for example of approximately 25° C. to approximately 55° C., in particular of approximately 25° C. to approximately 45° C.

Preferably, a dynamic viscosity of the connecting material can be reduced by heating the galvanic cells and/or the connecting material.

In particular, a flow behavior of the connecting material can be improved by heating the galvanic cells and/or the connecting material.

In particular, curing of the connecting material can be accelerated by heating it.

Preferably, a consistent process quality can be achieved by heating the galvanic cells.

Preferably, the galvanic cells are aligned during the production of the one or more connecting bodies in such a manner that cell poles of the galvanic cells of the battery module, in particular all galvanic cells, are arranged in one plane.

Alternatively or additionally, it is conceivable that the galvanic cells are aligned during the production of the one or more connecting bodies in such a manner that cell base wall elements of the cell housings of the galvanic cells of the battery module, in particular of all galvanic cells of the battery module, are arranged in one plane.

Further features and/or advantages of the invention are the object of the following description and the graphic representation of embodiment examples.

Figure 1:
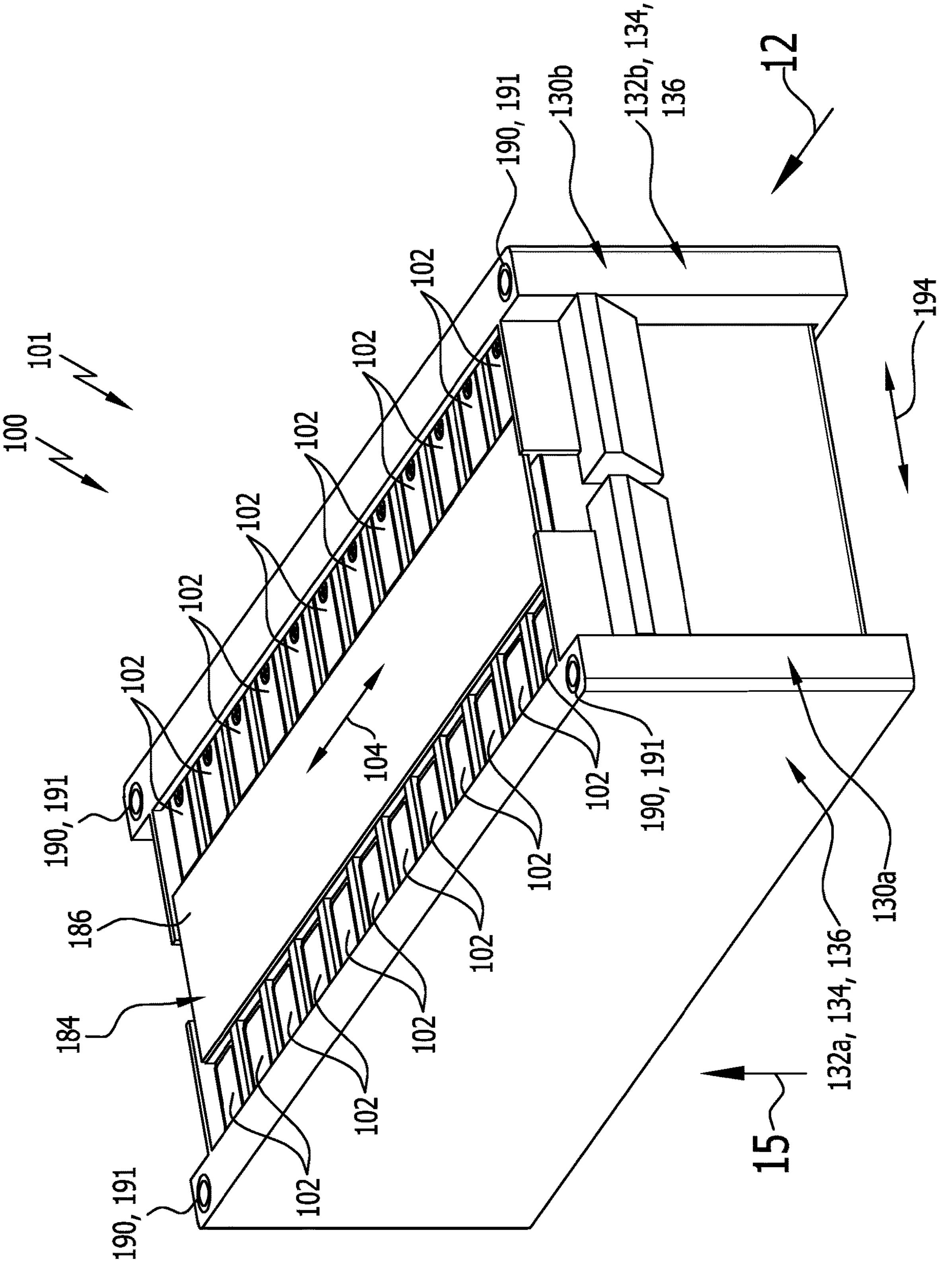
FIG. 1 is a schematic perspective representation of an embodiment of a battery module.

The same or functionally equivalent elements are provided with the same reference signs in all FIGURES.

DETAILED DESCRIPTION OF THE DRAWINGS

FIGS. 1 to 15 show an embodiment of a battery module designated as a whole as 100.

For example, a battery module 100 is part of a battery device 101, which in particular comprises a plurality of battery modules 100.

Such a battery device 101 can be used, for example, in a motor vehicle not shown in the drawing.

Preferably, the battery module 100 comprises a plurality of galvanic cells 102 arranged along a stacking direction, which is indicated by a double arrow 104.

The battery module 100 has, for example, 4 to 24 galvanic cells 102, preferably 8 to 16 galvanic cells 102, more preferably 12 galvanic cells 102.

Figure 18:
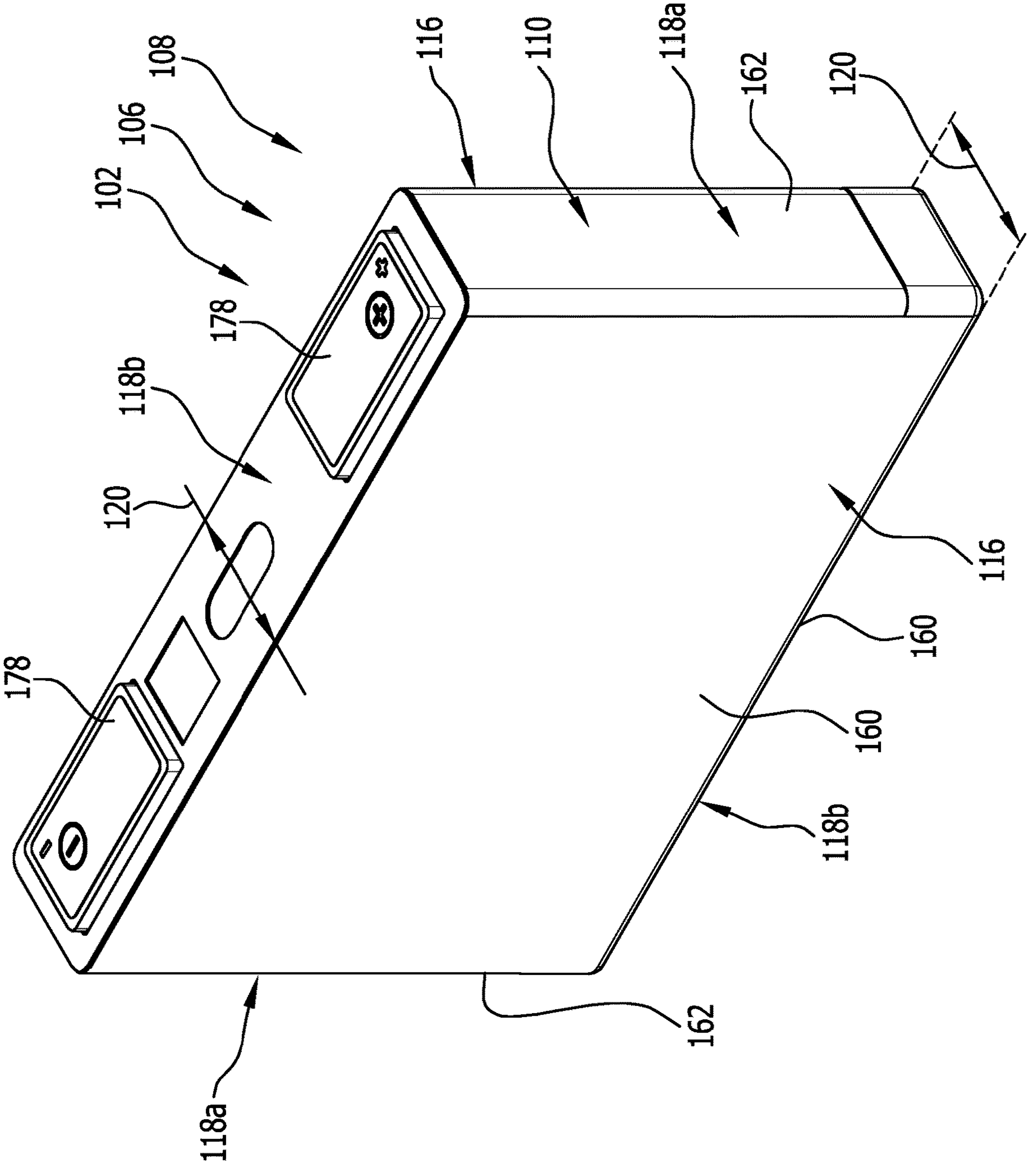
FIG. 18 is a schematic perspective representation of a galvanic cell of the battery module from FIG. 1.

FIG. 18 shows a galvanic cell 102 in a schematic perspective representation.

The galvanic cells 102 are preferably prismatic cells 106, in particular substantially cuboid cells.

The galvanic cells 102 of the battery module 100 are preferably secondary cells 108. The galvanic cells 102 are thus preferably rechargeable galvanic cells 102.

The battery module 100 thus forms in particular an accumulator module.

The galvanic cells preferably each comprise a cell housing 110, which is in particular prismatic, in particular substantially cuboid-shaped.

The galvanic cells 102 are formed, for example, according to the PHEV2 format.

Figure 19:
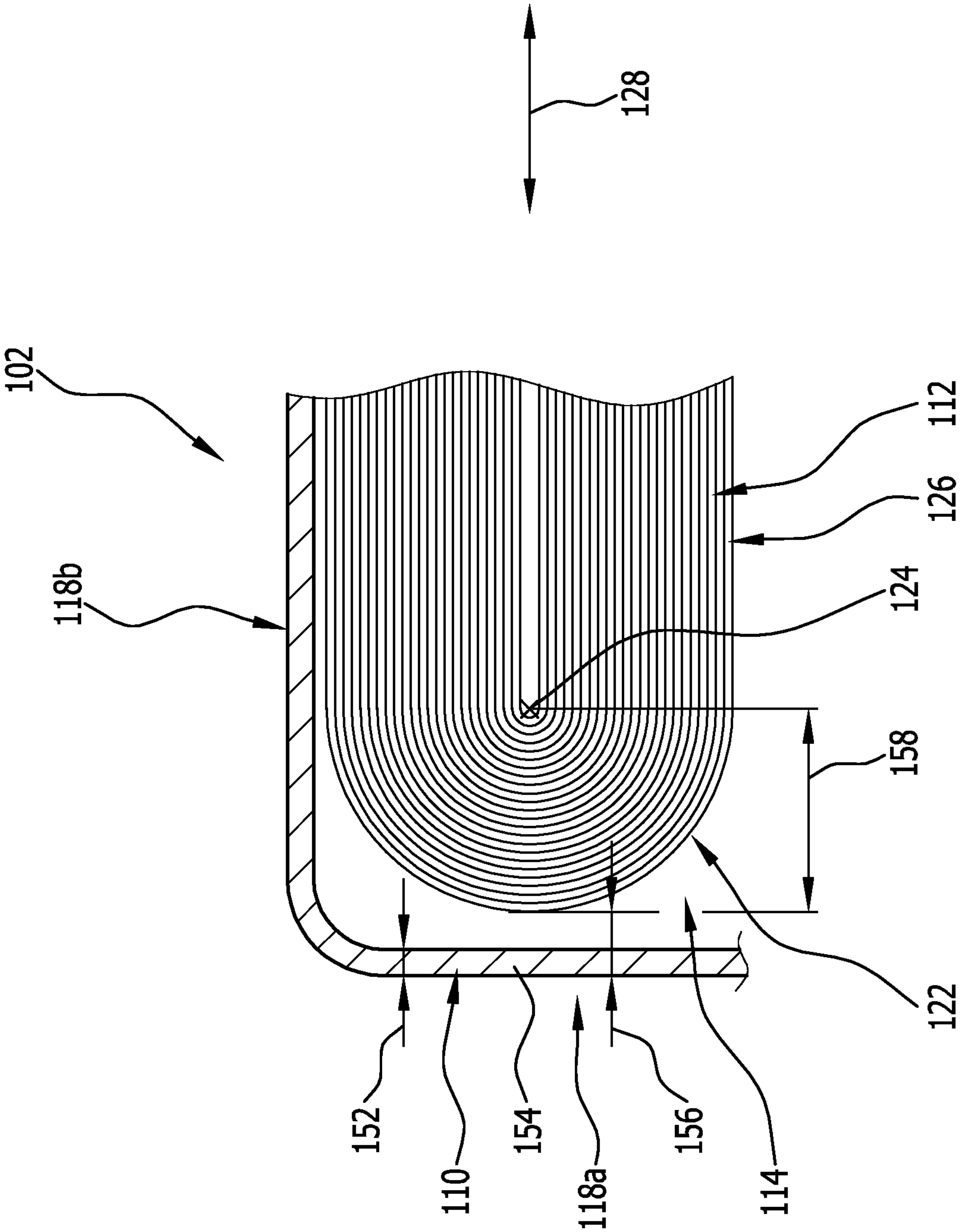
FIG. 19 is a section of a schematic cross-sectional representation of the galvanic cell from FIG. 18.

FIG. 19 shows a schematic cross-sectional representation through a galvanic cell 102.

A respective galvanic cell 102 preferably comprises two cell windings 112 ("jelly rolls").

The cell housing 110 of a respective galvanic cell 102 preferably comprises or forms a receiving space 114.

It can be favorable if the cell windings 112 of a respective galvanic cell 102 are received in the receiving space 114.

A respective galvanic cell 102 and/or a cell housing 110 of a respective galvanic cell 102 preferably comprise two primary sides 116 and four secondary sides 118, in particular two short secondary sides 118*a* and two long secondary sides 118*b*.

Preferably, the two primary sides 116 and/or two respective secondary sides 118 are arranged on opposite sides of a respective galvanic cell 102 and/or a cell housing 110 of a respective galvanic cell 102.

In particular, a primary side 116 of a galvanic cell 102 and/or a cell housing 110 of the galvanic cell 102 faces a primary side 116 of a further galvanic cell 102 and/or a cell housing of the further galvanic cell 102, respectively, in the battery module 100.

The primary sides 116 of a respective galvanic cell 102 and/or a cell housing 110 of a respective galvanic cell 102 have, in particular, a larger surface area than the secondary sides 118 of a respective galvanic cell 102 and/or a cell housing 110 of a respective galvanic cell 102.

In particular, the short secondary sides 118*a* have the same width 120 as the long secondary sides 118*b*, especially in a direction parallel to the stacking direction 104 of the battery module 100.

The long secondary sides 118*b* preferably have a greater length than the short secondary sides 118*a*, particularly in a direction perpendicular to the stacking direction 104 of the battery module 100.

It can be favorable if the two cell windings 112 of the respective galvanic cells 102 are arranged substantially parallel to one another.

The cell windings 112 of a galvanic cell 102 of the battery module 100 are preferably flat windings.

A respective cell winding 112 of the galvanic cells 102 of the battery module 100 comprises, in particular, a plurality of winding layers.

Winding layers of a respective cell winding 112 are preferably arranged substantially parallel to one another.

The cell winding 112 preferably comprises a winding layer web that forms the winding layers. The winding layers are preferably formed by winding up the winding layer web. In particular, it is conceivable that a single winding layer web comprises or forms all winding layers of a respective cell winding.

A respective cell winding 112 of a galvanic cell 102 preferably comprises two deflection regions 122 in which winding layers of the respective cell winding 112 are deflected, wherein the winding layers in a respective deflection region 122 have a common winding line 124.

In the respective deflection region 122 of the cell winding 112, winding layers of the cell windings 112 are preferably deflected, in particular by approximately 180°.

The winding lines 124 of the two deflection regions 122 of a respective cell winding 112 are preferably arranged substantially parallel to one another.

In particular, a respective cell winding 112 of the galvanic cells 102 is formed axisymmetrically with respect to the common winding line 124 in a deflection region 122.

In particular, it is conceivable that the winding layers of the respective cell winding 112 are arranged substantially in a semicircle in a respective deflection region 122 in a cross-section taken perpendicularly to the common winding line 124.

Winding layers of a respective cell winding 112 are arranged in an intermediate region 126 of the cell winding 112 arranged between the two deflection regions 122 of the cell winding 112, preferably substantially parallel to a central plane of the cell winding 112 that is not illustrated in the drawings.

It can be favorable if the common winding line 124 of a respective deflection region 122 of a cell winding 112 is arranged in the central plane of a cell winding 112.

The stacking direction 104 of the battery module 100 preferably runs substantially perpendicular to a central plane of the cell windings 112 of the galvanic cells 102 of the battery module 100.

It can be favorable if the common winding line 124 of winding layers of the respective cell winding 112 forms a common central point of semicircularly arranged winding layers of the cell winding 112 in a respective deflection region of the cell winding 112 in a cross-section taken perpendicular to the common winding line 124.

A winding direction of a respective cell winding 112 represented by means of an arrow 128 preferably runs perpendicular to the common winding lines 124 of the two deflection regions 112 of the respective cell winding 112 and in particular perpendicular to the stacking direction 104 of the battery module 100.

A winding layer of a respective cell winding 112 preferably comprises a plurality of layers, for example two electrode layers and two separator layers.

It can be favorable, in particular, if electrode layers and separator layers are arranged alternately in a winding layer.

A layer sequence in a winding layer of a cell winding 112 is therefore preferably as follows: separator layer, electrode layer, separator layer, electrode layer.

The electrode layers preferably comprise or are formed from an electrically conductive material, for example aluminum or copper.

The separator layers preferably comprise or are formed from an electrically insulating material, for example polyethylene and/or polypropylene.

In particular, the embodiment of the battery module 100 shown in FIGS. 1 to 15 comprises two connecting bodies 130 that connect the galvanic cells 102 to each other in the stacking direction 104.

Preferably, a connecting body 130 is arranged on a respective short secondary side of each of the galvanic cells 102 of the battery module 100.

In particular, the battery module 100 comprises a first connecting body **130*a* by means of which all galvanic cells 102** are connected on a first side thereof.

Preferably, the battery module 100 further comprises a second connecting body **130*b* by means of which all the galvanic cells 102** are connected on a second side thereof.

A respective connecting body 130 preferably completely surrounds a respective short secondary side **118*a* of the galvanic cells 102**.

It can be favorable if a respective connecting body 130 partially encloses both long secondary sides **118*b*** of the galvanic cells.

It can also be favorable if a respective connecting body 130 partially encloses a respective primary side 116 of two outer galvanic cells 102 in the stacking direction 104 of the battery module 100.

Preferably, the two connecting bodies 130 of the battery module 100 each comprise a one-piece receiving body 132.

In particular, the receiving body 132 of a respective connecting body 130 comprises or is formed from a plastic material.

As an alternative to a plastic material, it is conceivable that the receiving body 132 comprises or is formed from a metallic material, for example steel or aluminum.

It can be favorable, for example, if the plastic material of the receiving body 132 is a fiber-reinforced plastic material, such as a glass fiber-reinforced, aramid fiber-reinforced, and/or carbon fiber-reinforced plastic material.

For example, it is conceivable that the fiber-reinforced plastic material of the receiving body 132 comprises a matrix material, such as polyamide, polypropylene, or polybutylene terephthalate.

The plastic material of the receiving body 132 is, for example, PA66-GF35 or PA66-GF50.

Alternatively, it is conceivable that the plastic material of the receiving body 132 is PBT-GF30 or PBT-GF25.

In particular, the plastic material of the receiving body 132 has a tensile strength of at least approximately 100 N/mm2, particularly at least approximately 150 N/mm2, preferably at least approximately 180 N/mm2.

For example, it is conceivable that the plastic material of the receiving body 132 has a tensile strength of approximately 135 N/mm2.

In particular, the plastic material of the receiving body 132 has a creep safety factor (CTI) of at least approximately 400.

The receiving body 132 is preferably an injection molded body 134, particularly an injection molded component 136.

Figure 10:
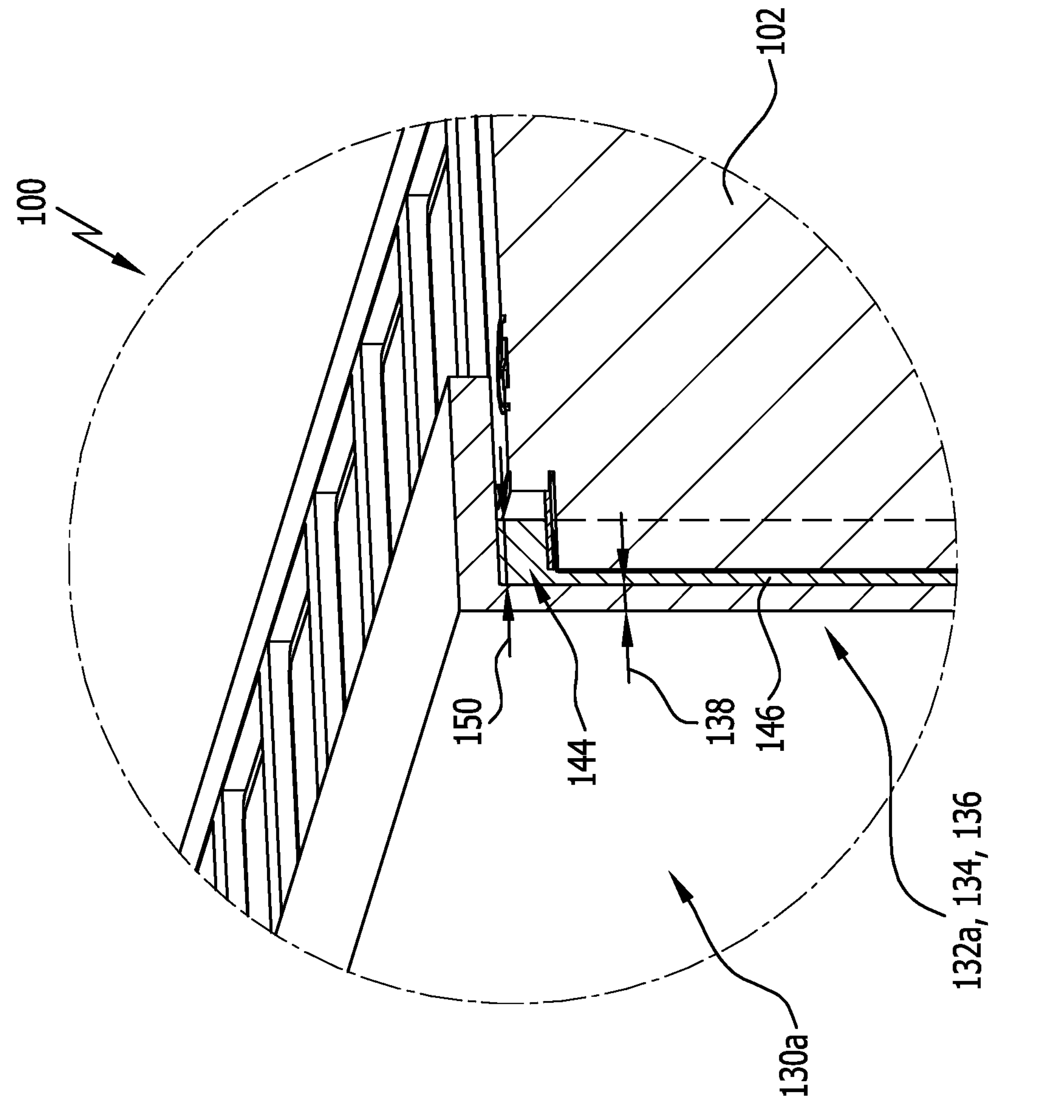
FIG. 10 is an enlarged representation of the region X in FIG. 9.
Figure 11:
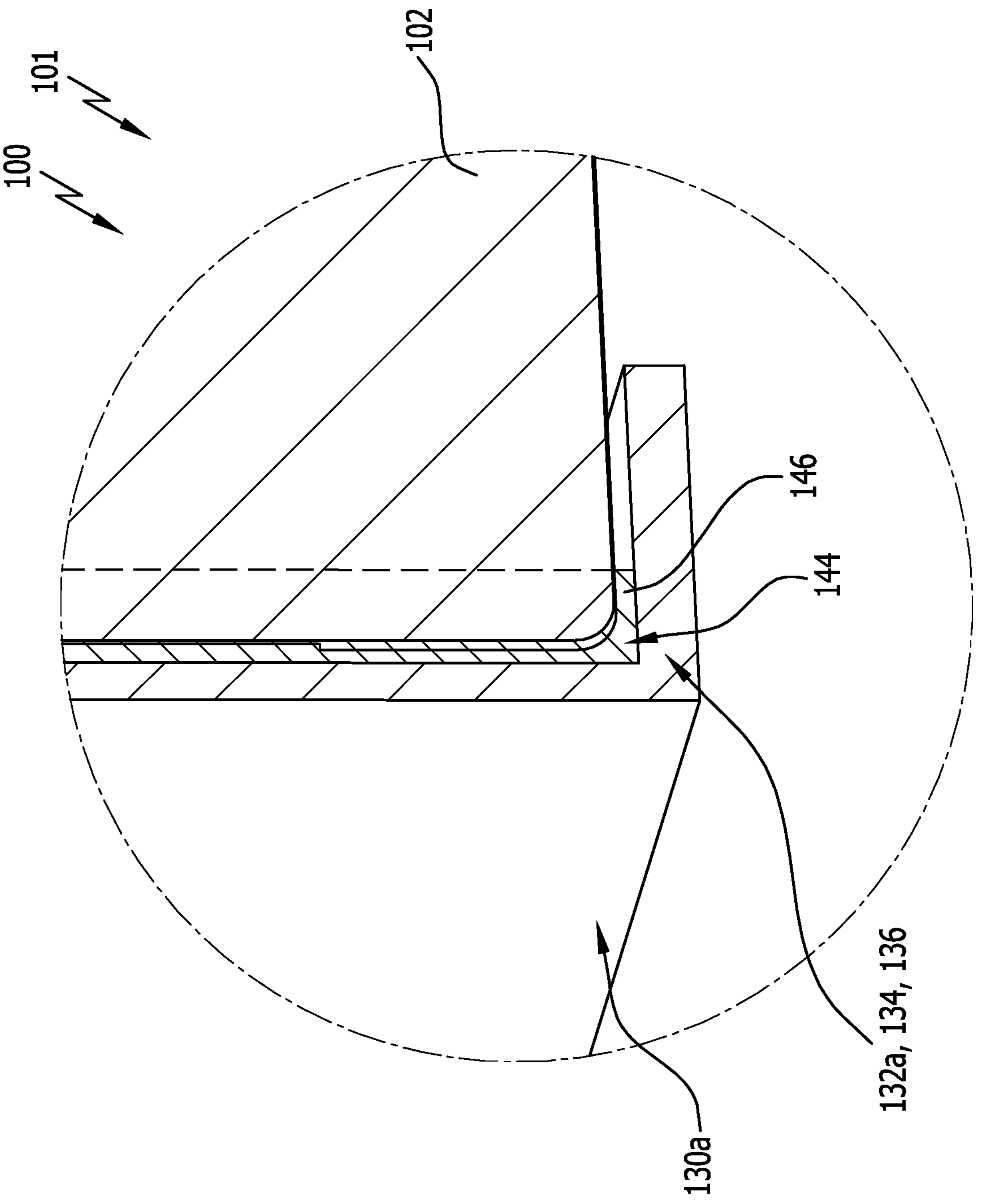
FIG. 11 is an enlarged representation of the region XI in FIG. 9.

The receiving body 132 preferably has an average wall thickness 138 in the range of approximately 1 mm to approximately 5 mm, particularly in the range of approximately 1 mm to approximately 3 mm, for example approximately 2 mm (cf. FIG. 10).

The receiving bodies 132 of the two connecting bodies 130 each preferably have a C-shaped cross-section perpendicular to the stacking direction 104 of the battery module 100.

The receiving bodies 132 of the two connecting bodies 130 are preferably cup-shaped or trough-shaped.

Figure 2:
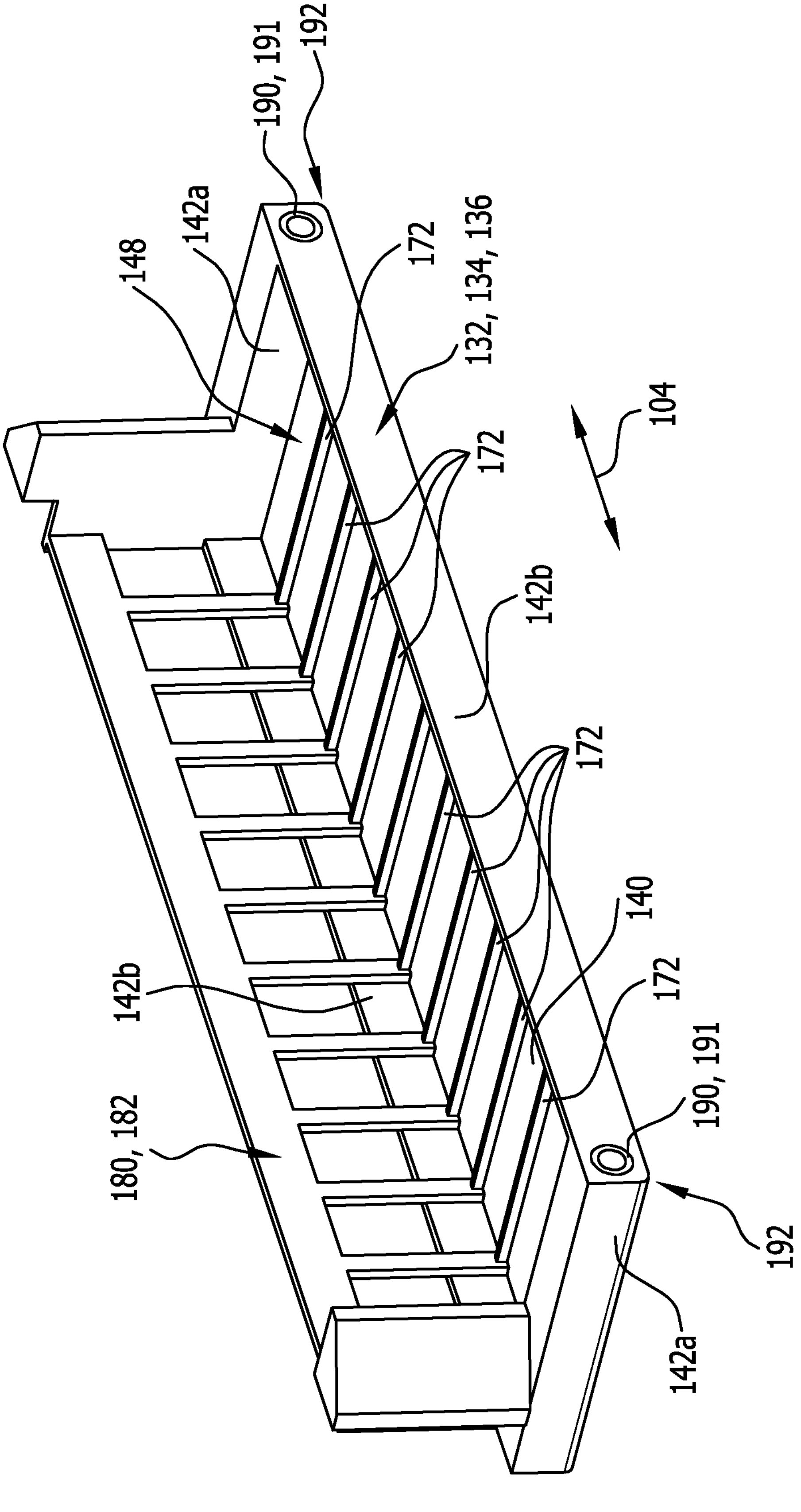
FIG. 2 is a schematic perspective representation of an embodiment of a receiving body in a method step of a method for producing the embodiment of a battery module shown in FIG. 1.

In particular, the cup-shaped and/or C-shaped receiving bodies 132 each comprise a bottom wall element 140 and four side wall elements 142, in particular two short side wall elements **142*a* and two long side wall elements 142*b* (cf. FIG. 2**).

It can be favorable if the bottom wall element 140 and/or the four side wall elements 132 are substantially rectangular in a respective plan view thereof.

It can be favorable in this case if the galvanic cells 102 of the battery module 100 are connected to one another by means of the two connecting bodies 130 in a material bonding and/or form-fitting, in particular load-bearing manner.

The two connecting bodies 130 also preferably each comprise a one-piece connecting material body 144, which comprises or is formed from a connecting material 146.

Preferably, a respective receiving body 132 comprises a receiving body 148 in which the connecting material body 144 of a respective connecting body 130 is received.

It can be favorable if the receptacles 148 of the two receiving bodies 132 are arranged facing each other.

Each of the short secondary sides **118*a* of the galvanic cells 102 of the battery module 100 is preferably arranged on a first side of the galvanic cells 102 in the receptacle 148 of the first receiving body 132*a***.

Each of the short secondary sides **118*a* of the galvanic cells 102 of the battery module 100 are preferably arranged in the receptacle 148 of the second receiving body 132*b* on a second side of the galvanic cells 102 that faces away from the first side of the galvanic cells 102**.

In particular, the connecting material body 144 of the two connecting bodies 130 is a body produced by potting.

Preferably, a width 150 of the connecting material bodies 144 in a direction perpendicular to the stacking direction 104 of the battery module 100 and parallel to a long secondary side **118*b* of the galvanic cells 102 approximately corresponds to a total of a wall thickness 152 of a cell housing wall 154 of the cell housing 110 of a respective galvanic cell 102, a distance 156 of the cell winding 112 of the galvanic cell from the cell housing wall 154 of the cell housing, and a width 158 of the deflection region 122 of the cell winding 112 of the galvanic cell 102 (cf. FIGS. 10 and 19**).

In particular, the width 150 of the connecting material body 144 corresponds to an immersion depth of the galvanic cells 102 into the connecting material 146 of the connecting material body 144.

The width 150 of the connecting material body 144 and/or the immersion depth of the galvanic cells 102 is preferably in the range of approximately 1 mm to approximately 8 mm, in particular of approximately 3 mm to approximately 7 mm.

Preferably, the galvanic cells 102 of the battery module 100 are materially bonded to each other by means of the connecting material 146.

It can be favorable if the galvanic cells 102, in particular the cell housings 110 of the galvanic cells 102, are welded into an electrical insulation film.

For example, it is conceivable that an electrical insulation film is arranged only on a cell base wall element 160 of the cell housing 110 of a respective galvanic cell 102 and/or on a part of a surface of the four cell side wall elements 162 of the cell housing 110 of a respective galvanic cell 102 (cf. FIG. 18).

In particular, it is conceivable that an electrical insulation film is arranged on at least 20% of a surface of the cell sidewall elements 162 of the cell housing 110.

If the electrical insulation film is only partially arranged on a surface of the galvanic cells 102, in particular on a surface of the cell housings 110 of the galvanic cells 102, it is possible to preferably improve an adhesion of the connecting material 146 to the surface, since the connecting material 146 adheres better to the surface of the galvanic cells 102, in particular the cell housings 110 thereof, than the electrical insulation film.

The connecting material body 144 of a respective connecting body 130 is preferably received in the receiving body 132 of the connecting body 130, in particular completely.

In particular, it may be provided that the connecting material body 144 is received in the receiving body 132 by introducing the connecting material 146 into the receptacle 148 of the receiving body 132, in particular by pouring a flowable and/or castable connecting material 146 and subsequently curing and/or cross-linking the connecting material 146.

The connecting material 146 of the connecting material body 144 is preferably a castable material, in particular a potting material.

It can be favorable if the connecting material 146 is a plastic material, in particular a thermosetting plastic material.

The connecting material 146 preferably comprises or is formed from a resin material.

For example, it is conceivable that the connecting material 146 comprises or is formed by a polyurethane material, in particular a polyurethane resin.

In particular, it is conceivable that the connecting material 146 is a two-component casting resin based on polyurethane, polyether and/or polyester polyols.

Alternatively or additionally, it is conceivable that the connecting material 146 comprises or is formed by an epoxy material, in particular an epoxy resin.

Preferably, the connecting material 146 comprises or is formed by a casting resin, in particular a polyurethane casting resin or an epoxy casting resin.

In particular, the connecting material 146 is a two-component material.

The two-component material preferably comprises a first component, such as a resin material, and a second component, such as a hardening material.

For example, it is conceivable that the connecting material 146 is formed by a polyaddition reaction of a first component and a second component.

The hardening material is in particular a reaction triggering material which preferably initiates and/or triggers a cross-linking reaction of the resin material.

A temperature during curing and/or cross-linking of the connecting material is, for example, at most approximately 80° C., in particular at most approximately 70° C., preferably at most approximately 60° C.

The connecting material 146 is, in particular, a material that cures by cross-linking.

In particular, the connecting material 146 has a pot life in the range of approximately 1 minute to approximately 60 minutes, preferably in the range of approximately 20 minutes to approximately 50 minutes, for example, approximately 40 minutes.

It can be favorable if the connecting material 146 has a curing time of approximately 5 minutes to approximately 35 hours at 22° C., in particular a curing time of approximately 1 hour to approximately 30 hours.

For example, it is conceivable that the connecting material 146 has a curing time of approximately 8 to 12 hours at 22° C.

Furthermore, it is conceivable that the connecting material 146 has a curing time of approximately 16 to 30 hours at 22° C.

The connecting material 146 has, for example, a curing time at approximately 22° C. to a final chemical curing and/or complete cross-linking of approximately 7 days or approximately 168 hours.

The connecting material 146 preferably assumes a smaller volume after complete curing and/or complete cross-linking thereof than before complete curing and/or before complete cross-linking.

It can be favorable if the connecting material 146 has a curing shrinkage in the range of approximately 0.5% to approximately 2%, for example approximately 1%.

The connecting material 146 preferably has a density in the range of approximately 1.1 g/cm3 to approximately 2 g/cm3.

It can also be favorable if the connecting material 146 has a thermal conductivity in the range of approximately 0.8 W/m*K to approximately 2 W/m*K, for example, a thermal conductivity of approximately 1 W/m*K or a thermal conductivity of 1.5 W/m*K.

In particular, the connecting material 146 has a dielectric strength in the range of approximately 15 kV/mm to approximately 40 kV/mm, particularly in the range of approximately 20 kV/mm to approximately 36 kV/mm, for example a dielectric strength of approximately 24 kV/mm or of approximately 28 kV/mm.

Preferably, the connecting material 146 has a volume resistivity in the range of approximately 10^14 Ω/cm to approximately 10^15 Ω/cm.

It can be favorable if the connecting material 146 has a coefficient of thermal expansion in the range of approximately 50 ppm/K to approximately 210 ppm/K below a glass transition temperature of the connecting material.

It can also be favorable if the connecting material 146 has a coefficient of thermal expansion in the range of approximately 50 ppm/K to approximately 250 ppm/K above a glass transition temperature of the connecting material.

A glass transition temperature of the connecting material 146 is, for example, in the range of approximately 5° C. to approximately 90° C.

A glass transition temperature of the connecting material 146 is, for example, approximately 10° C.

For example, it is conceivable that the connecting material 146 has a glass transition temperature of approximately 10° C., wherein the connecting material below the glass transition temperature has a coefficient of thermal expansion of approximately 72.5 ppm/K and/or that the connecting material above the glass transition temperature has a coefficient of thermal expansion of approximately 141.7 ppm/K.

The connecting material 146 preferably has a tensile strength in the range of approximately 5 N/mm2 to approximately 80 N/mm2, particularly in the range of approximately 30 N/mm2 to approximately 60 N/mm2.

It may be favorable if the connecting material 146 has a modulus of elasticity in the range of approximately 2000 N/mm2 to approximately 14000 N/mm2, particularly in the range of approximately 8000 N/mm2 to approximately 12000 N/mm2.

Figure 4:
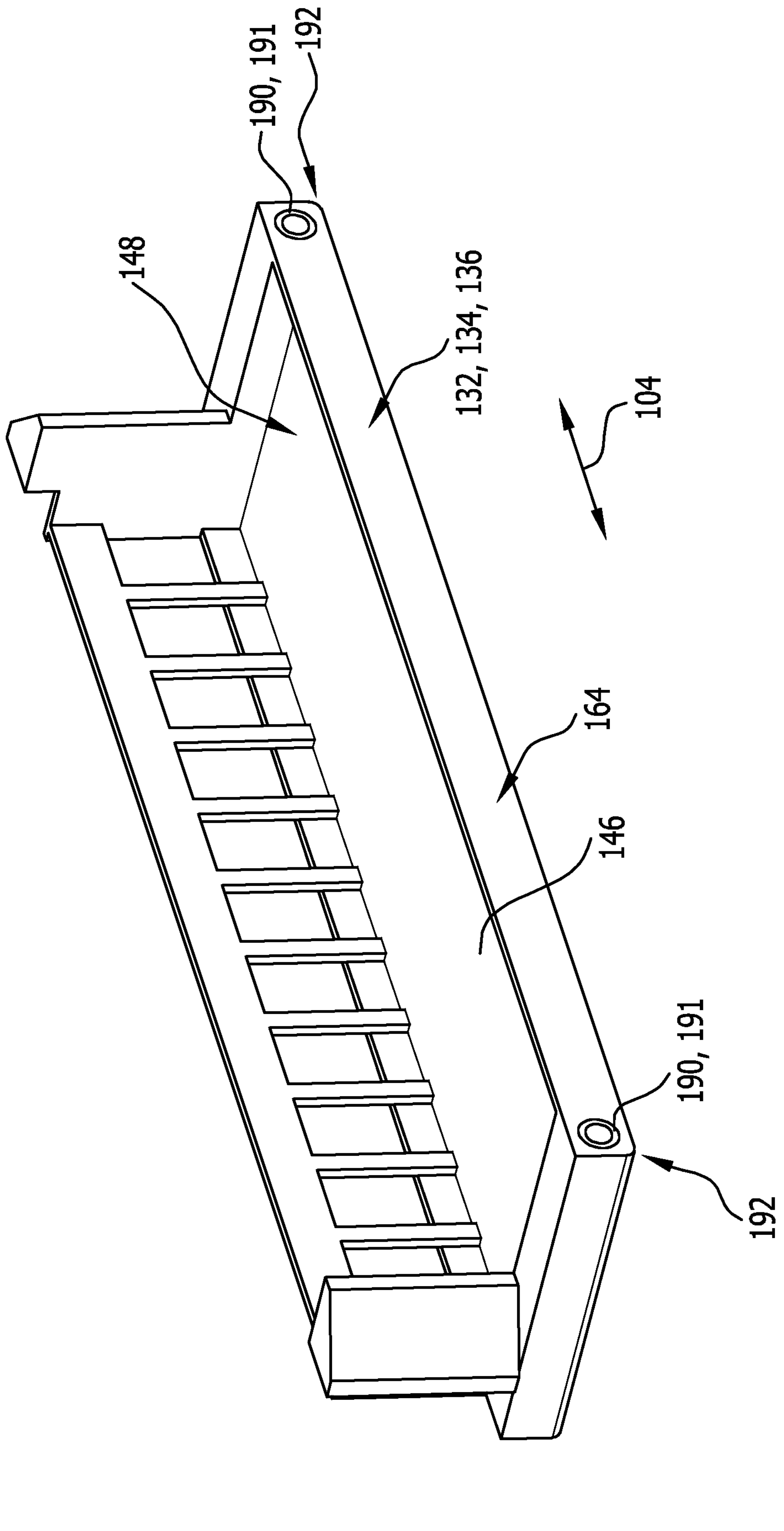
FIG. 4 is a schematic perspective representation of the receiving body of FIG. 2 and of connecting material inserted into a receptacle of the receiving body in a method step following the method step of FIG. 2 of a method for producing the embodiment of a battery module shown in FIG. 1.
Figure 5:
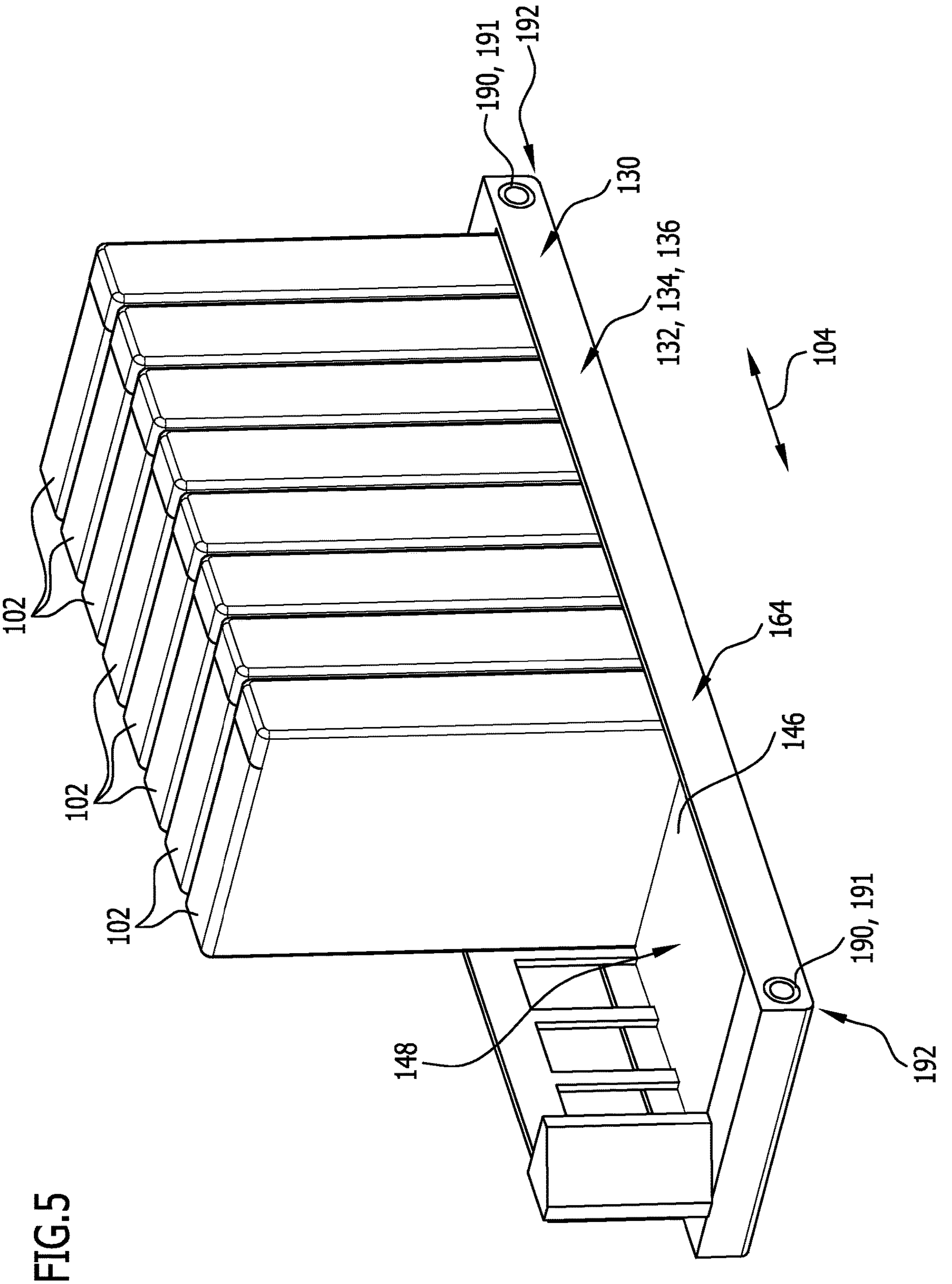
FIG. 5 is a schematic perspective representation of the receiving body from FIG. 2 and of galvanic cells arranged in a receptacle of the receiving body in a method step following the method step of FIG. 3 or the method step of FIG. 4 of a method for producing the embodiment of a battery module shown in FIG. 1.
Figure 6:
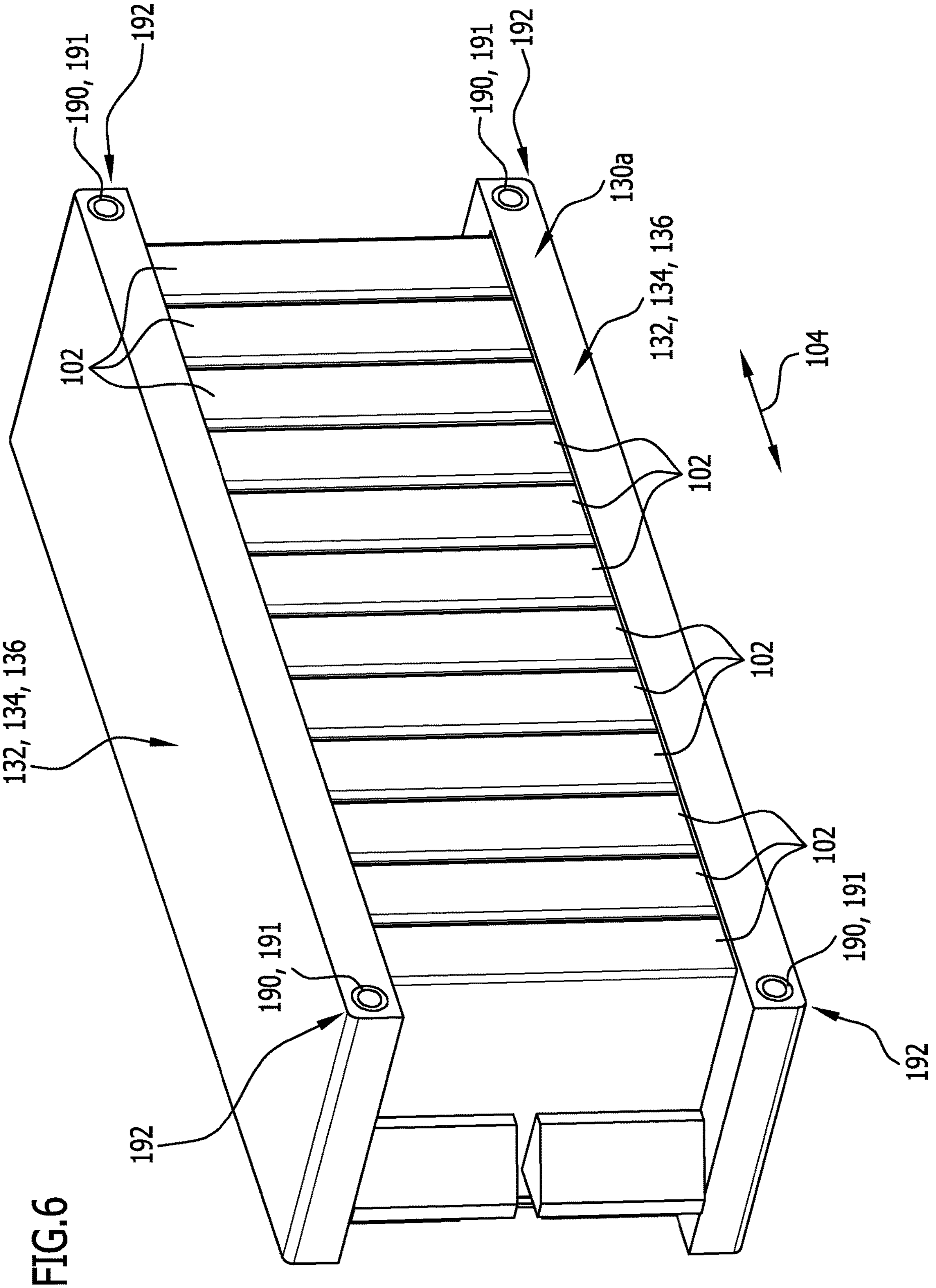
FIG. 6 is a schematic perspective representation of two receiving bodies of FIG. 2 and of galvanic cells arranged in a receptacle of the receiving bodies in a method step, following the method step of FIG. 5, of a method for producing the embodiment of a battery module shown in FIG. 1.
Figure 7:
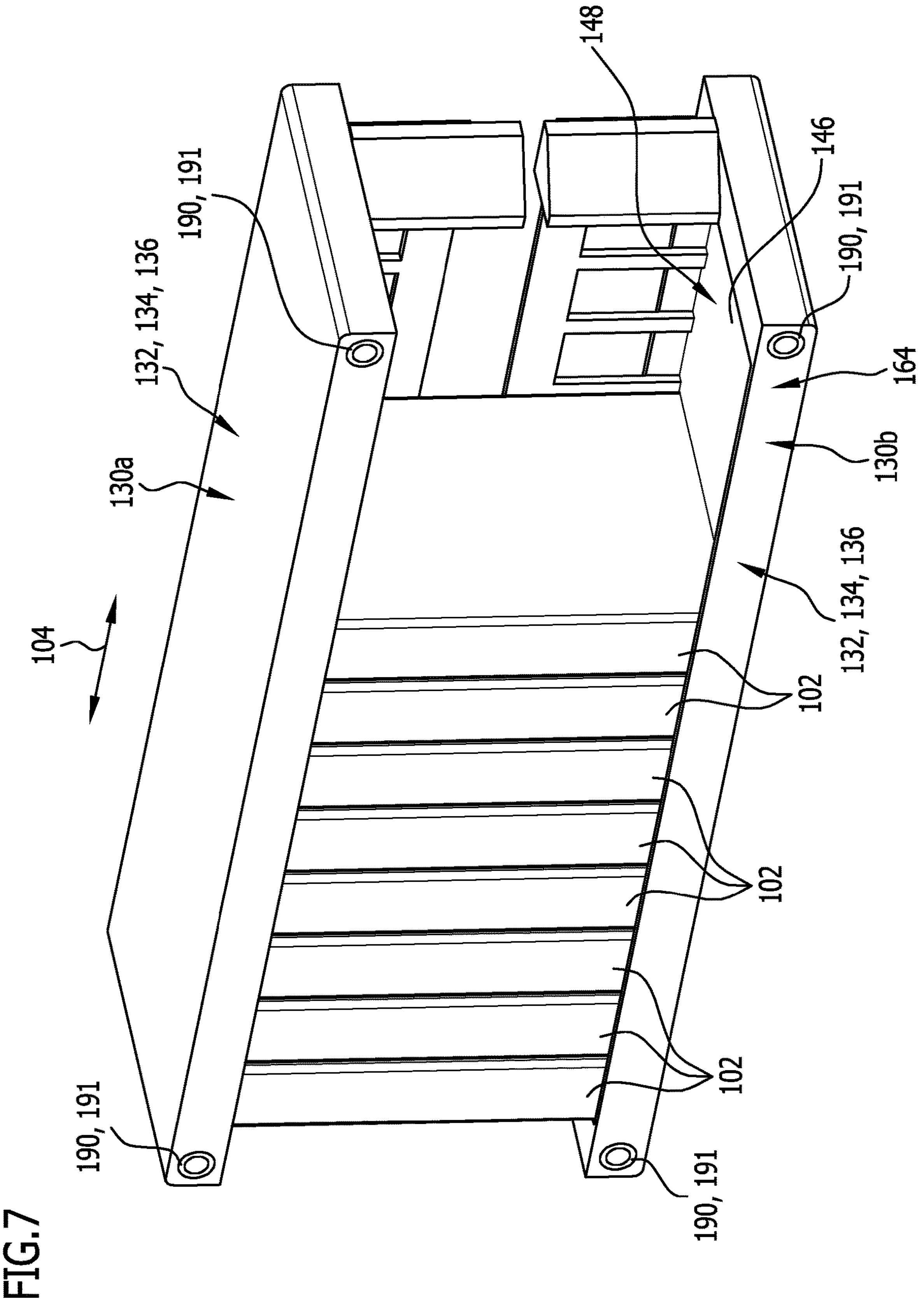
FIG. 7 is a schematic perspective representation of two receiving bodies from FIG. 2 and of galvanic cells arranged in a receptacle of the receiving bodies in a method step following the method step from FIG. 6 of a method for producing the embodiment of a battery module shown in FIG. 1.
Figure 8:
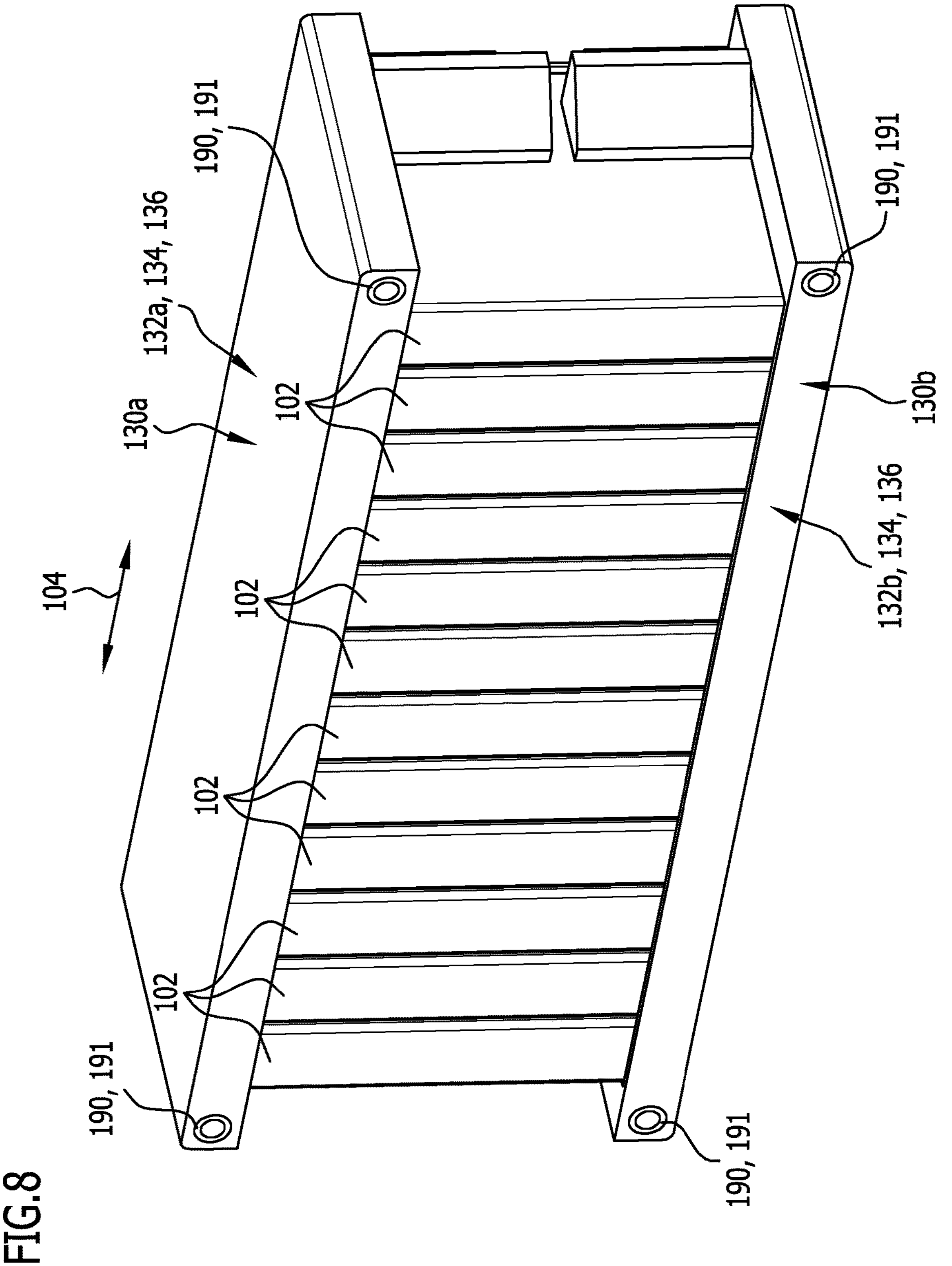
FIG. 8 is a representation corresponding to the one in FIG. 7, wherein twelve galvanic cells are arranged in a receptacle of the two receiving bodies.
Figure 9:
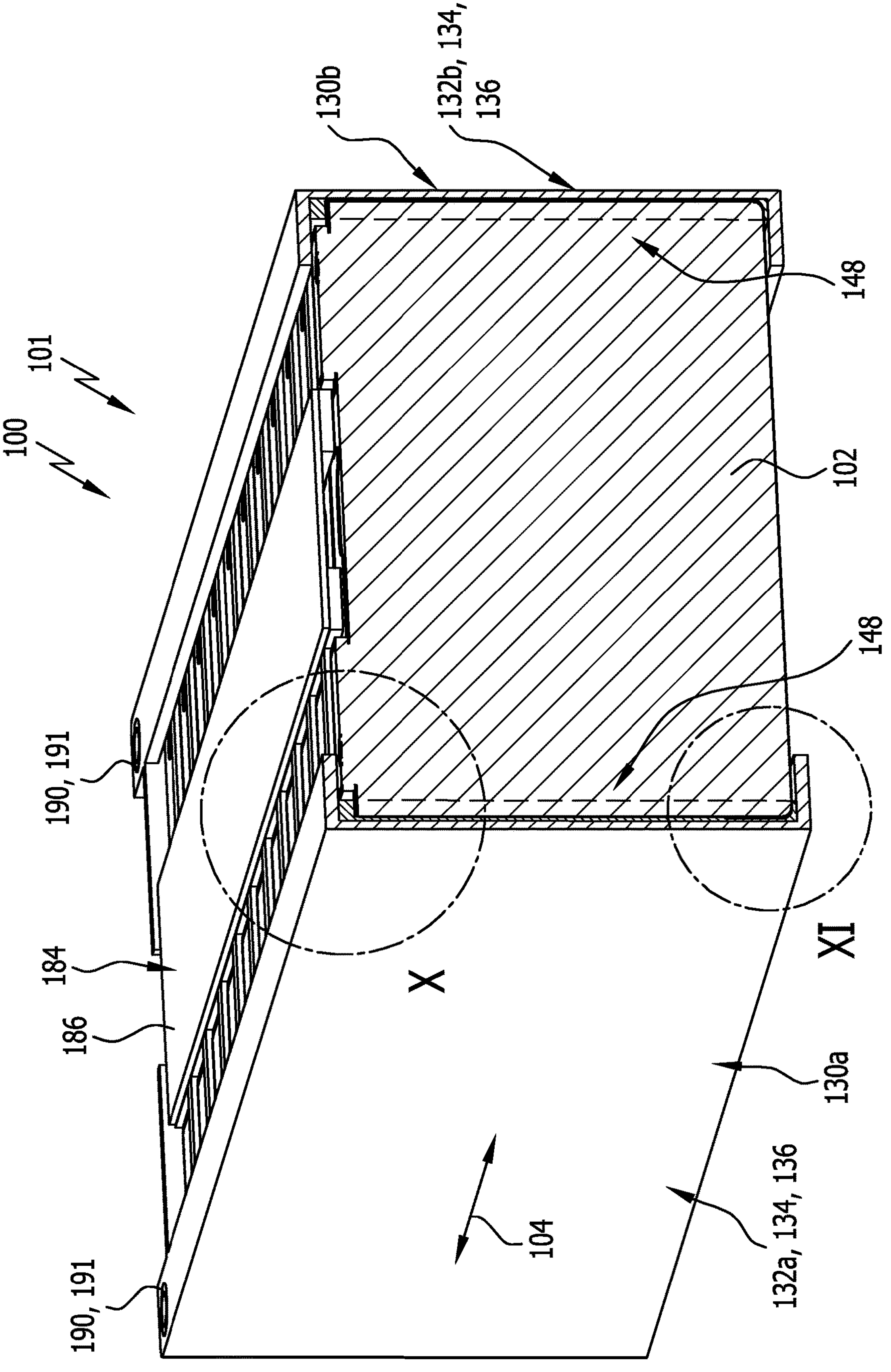
FIG. 9 is a schematic perspective representation of a partial section of the battery module from FIG. 1.

Preferably, a respective receiving body 132 forms a casting mold 164 for the connecting material 146 of the connecting material body 144 when the connecting body 130 is produced (cf. FIGS. 4, 5 and 7).

The connecting material body 144 is preferably materially bonded to the receiving body 132.

The galvanic cells 102 of the battery module 100, in particular the cell housings 110 of the galvanic cells 102, the connecting material 146 of the connecting material body 144 and the receiving body 132 together form in particular a composite component, so that preferably a high degree of rigidity of the battery module 100 can be realized in a direction running parallel to the stacking direction 104 of the battery module 100.

It can be favorable if the galvanic cells 102 of the battery module 100 are arranged spaced apart from one another in the stacking direction 104 by means of the two connecting bodies 130, in particular arranged substantially parallel to one another.

In this case, the primary sides 116 of two adjacent galvanic cells 102, in particular primary sides 116 of cell housings 110 of two adjacent galvanic cells 102, are arranged substantially parallel to each other.

In particular, the galvanic cells 102 are spaced apart in the stacking direction of approximately 1 mm to approximately 5 mm, in particular of approximately 2 mm to approximately 4 mm, for example of approximately 2 mm (cf. FIG. 166).

Figure 14:
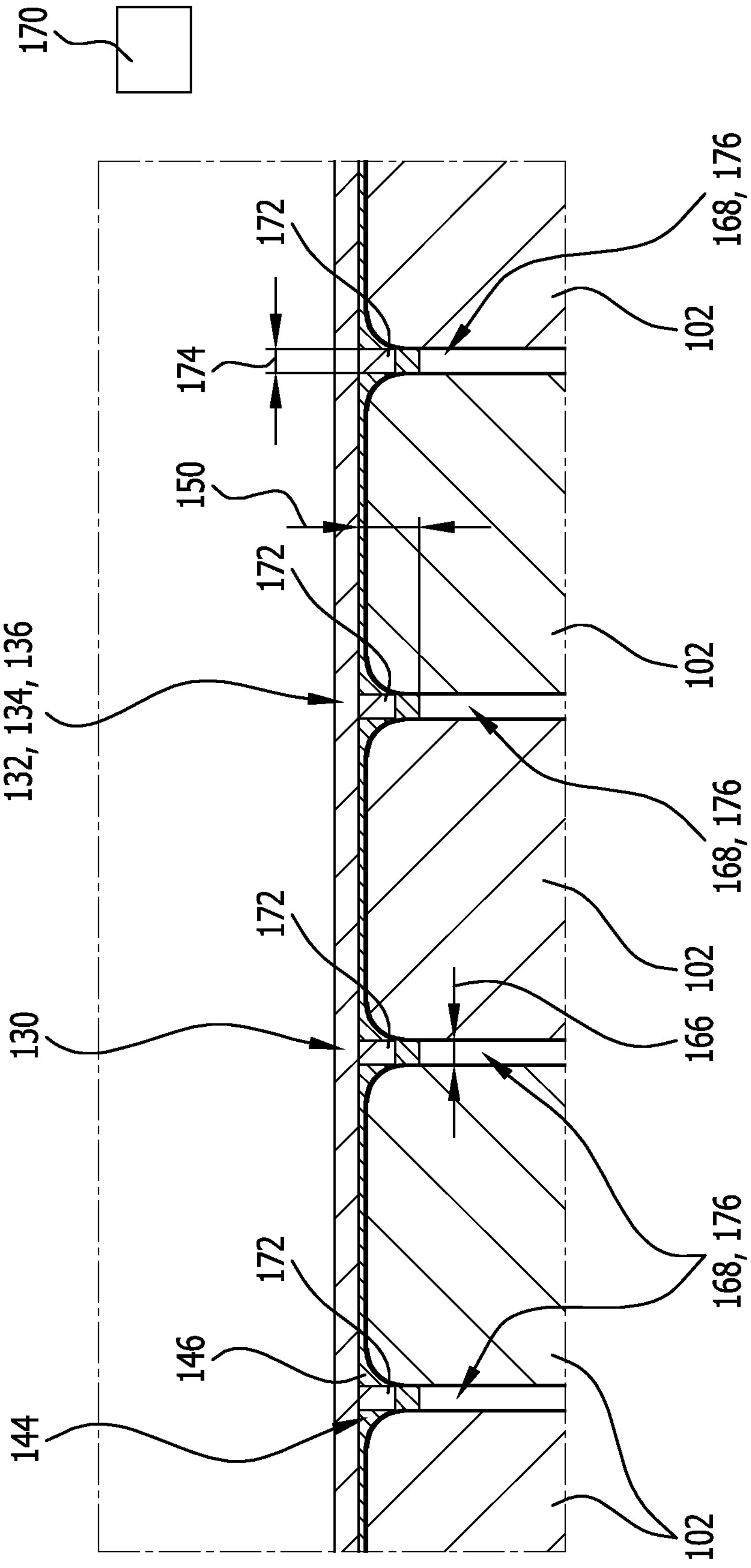
FIG. 14 is an enlarged representation of the region XIV in FIG. 13.
Figure 15:
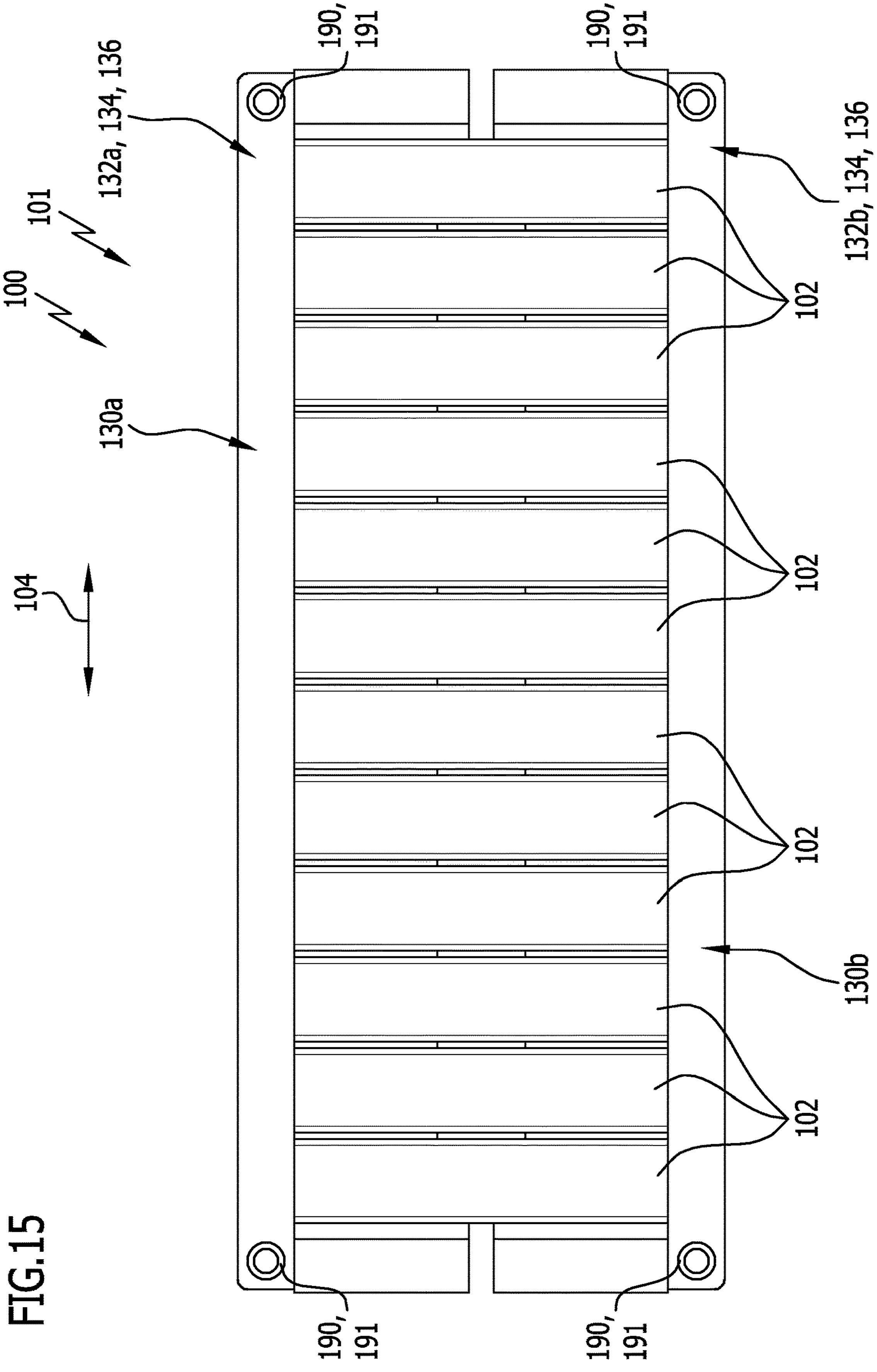
FIG. 15 is a schematic plan view of the battery module of FIG. 1 when viewed in the direction of arrow 15 in FIG. 1.

Two galvanic cells 102 adjacent in the stacking direction 104 and/or the two connecting bodies 130 of the battery module 100 preferably each bound a ventilation duct 168 in a direction perpendicular to the stacking direction 104 of the battery module 100 and/or parallel to a short secondary side 118*a* of the galvanic cells 102, in particular in a direction parallel to the direction of gravity (cf. FIG. 14).

In particular, the two primary sides 116 of the galvanic cells 102 adjacent to each other in the stacking direction 104 are spaced apart from each other.

In particular, at least approximately 50%, preferably at least approximately 75%, of each of the respective surfaces of the two primary sides 116 are spaced apart from each other.

It can be favorable if the battery module 100 comprises a fan device 170, which is shown only schematically and is arranged and designed in such a manner that an air flow directed into the ventilation ducts 168 of the battery module 100 is able to be generated by means of the fan device 170.

Preferably, the receiving bodies 132 of the two connecting bodies 130 each comprise a plurality of spacer elements 172, which are in particular arranged substantially parallel to each other.

Preferably, the galvanic cells 102 of the battery module 100 are positioned or can be positioned relative to each other and/or relative to a respective receiving body 132 by means of the spacer elements 172.

The spacer elements 172 preferably have a width 174 parallel to the stacking direction 104 of the battery module 100 of approximately 1 to 5 mm, in particular of approximately 2 mm to approximately 4 mm, for example of approximately 2 mm (c.f. FIG. 14).

The spacer elements 172 of a respective receiving body 132 have a distance from each other parallel to the stacking direction 104, for example, substantially corresponding to a width of a secondary side 118 of a respective galvanic cell 102 in a direction parallel to the stacking direction 104 of the battery module 100.

The spacer elements 172 of the receiving body are, for example, separators.

Alternatively, it is conceivable that a respective spacer element 172 comprises a plurality of separator pins not shown in the drawing, which in particular are each arranged in alignment in a direction perpendicular to the stacking direction 104 of the battery module 100. A plurality of axially aligned separating pins preferably form a spacer element 172.

An intermediate space 176 is thus preferably arranged between adjacent galvanic cells 100 respectively, in which cell housings 110 of two adjacent galvanic cells 102 preferably do not contact each other.

The intermediate space 176 forms, for example, the ventilation duct 168.

It can be favorable if one or more additional elements that are not shown in the drawing are arranged in the intermediate space 176, for example one or more propagation protection elements, one or more sensor elements and/or one or more temperature control elements.

Propagation of a thermal runaway of a galvanic cell 102 can preferably be delayed and/or prevented by means of one or more propagation protection elements disposed in the intermediate space 176.

By means of one or more temperature control elements arranged in the intermediate space 176, the galvanic cells 102 adjacent to the intermediate space 176 can preferably be temperature-controlled, for example cooled.

Preferably, heat can be dissipated from the intermediate space 176 by means of one or more temperature control elements arranged in the intermediate space 176.

It can be favorable if spacer elements 172 of a respective receiving body 132 are formed as heat conducting elements, in particular if the receiving body 132 comprises or is formed from a metallic material.

It can also be favorable if spacer elements 172 of a respective receiving body 132 comprise a temperature control channel structure, which is not shown in the drawing, through which a temperature control medium, in particular a temperature control liquid, can be conducted.

Sensor elements arranged in the intermediate space 176 comprise or are formed by, for example, temperature sensors, expansion sensors, and/or pressure sensors.

It can be favorable if a propagation protection element of a battery module 100 comprises the following:

- a phyllosilicate, in particular mica, vermiculite and/or expanded graphite;
- basalt;
- a ceramic material; and/or
- a silicone mat having an endothermic filler.

Preferably, a propagation protection element has a thermal conductivity in a direction parallel to the stacking direction 104 of the battery module 100 of at most approximately 1 W/m*K, in particular at most approximately 0.3 W/m*K, preferably at most approximately 0.1 W/m*K.

A propagation protection element preferably has a heat resistance of at least approximately 600° C., for example a heat resistance of at least approximately 800° C.

The battery module further preferably comprises a cell contact system that is not shown graphically in FIGS. 1 to 15 and, in particular, comprises a plurality of cell connection elements.

The cell poles 178 of two galvanic cells 102 shown in FIG. 18 are in particular connected or can be connected to one another by means of a respective cell connection element, in particular cell poles 178 of two galvanic cells 102 adjacent in the stacking direction 104.

Preferably, a respective receiving body 132 of a connecting body 130 includes a fastening device 180 for fastening the cell contacting system of the battery module 100 (cf. FIG. 2).

The cell contacting system is fastened or can be fastened in particular to the receiving bodies 132 by means of the fastening device 180.

It can be favorable if the fastening device 180 comprises a carrier device 182 to which a cell contacting system of the battery module 100 is fastened or can be fastened.

The battery module 100 also preferably comprises a cell monitoring system 184, which in particular comprises a cell monitoring board 186 (cf. FIG. 1).

Preferably, the two connecting bodies 130, in particular the receiving bodies 132 of the two connecting bodies 130, each comprise one or more fastening elements 190, by means of which the battery module 100 can be fixed to a housing of a battery device 101 and which, in particular, are each designed for a connecting element that is not shown in the drawing to pass therethrough.

The fastening elements 190 are, in particular, sleeve elements 191 for the passage of a screw element, for example a screw.

The fastening elements 190 are preferably each arranged in end regions 192 of a respective receiving body 132.

In particular, the receiving bodies 132 of the two connecting bodies 130 each comprise two fastening elements 190. Preferably, a respective battery module 100 comprises four fastening elements 190.

A longitudinal axis of the sleeve elements 191 is, for example, substantially parallel to a common winding line 124 of a cell winding 112 of a galvanic cell 102 and/or parallel to a short secondary side 118*a* of a galvanic cell 102.

The fastening elements 190 preferably comprise or are formed from a metallic material, for example steel or aluminum.

The fastening elements 190 are in particular metallic sleeves.

Preferably, the fastening elements 190 of the two connecting bodies 130, in particular the receiving body 132 of the two connecting bodies, are overmolded with the plastic material of the receiving body 132.

In particular, the fastening elements 190 are overmolded with the plastic material of the receiving body 132 in an injection molding process during the production of the receiving body 132.

Alternatively, it is conceivable that the fastening elements 190 of the receiving bodies 132 are pressed into the plastic material of the respective receiving body 132. In particular, the receiving bodies 132 are first produced in an injection molding process, wherein the fastening elements 190 are subsequently pressed into openings of the receiving body 132, which are introduced into the receiving body 132 during its production.

Preferably, the two connecting bodies 130 of the battery module 100 are connected or can be connected to one another in a force-fitting and/or form-fitting manner.

It can be favorable if the battery module 100 comprises a bracing device 194, by means of which the two connecting bodies 130 of the battery module 100 are connected or can be connected to one another in a force-fitting and/or form-fitting manner.

Figure 12:
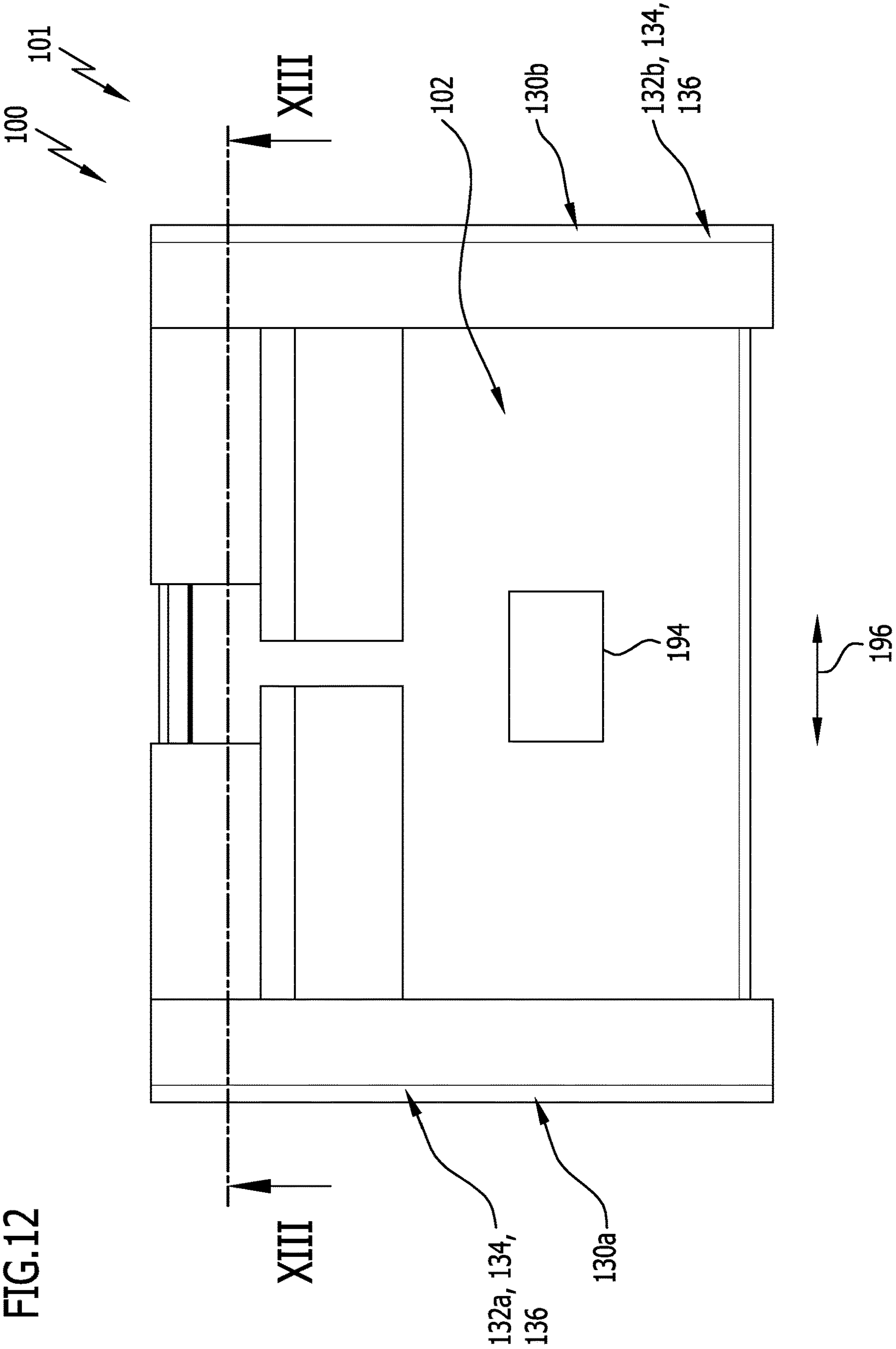
FIG. 12 is a schematic front view of the battery view of FIG. 1 when viewed in the direction of arrow 12 in FIG. 1.
Figure 13:
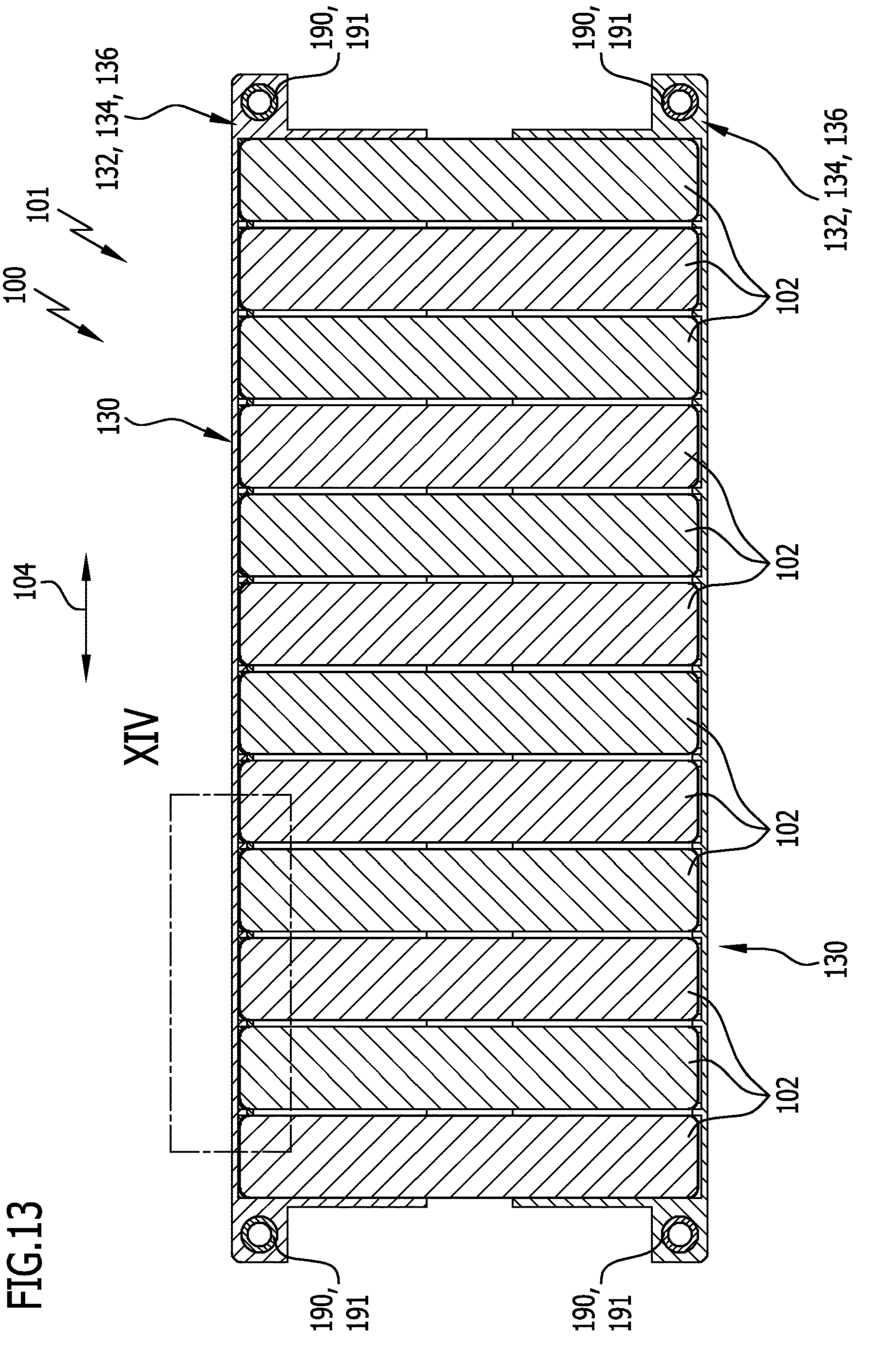
FIG. 13 a schematic sectional representation through the battery module of FIG. 1 along the line XIII-XIII in FIG. 12.

The bracing device 1944 is shown only schematically in FIG. 12.

In particular, a bracing device 194 can be used to exert a bracing force on the two connecting bodies 130 of the battery module 100, in particular a bracing force directed in a direction perpendicular to the stacking direction 104 of the battery module 100 and parallel to a long secondary side 118*b* of the galvanic cells 102 of the battery module 100, which is indicated by an arrow 196 in FIGS. 1 and 12.

The two connecting bodies 130 of the battery module 100 can preferably be tensioned against each other and/or towards each other by means of the bracing device 194.

It can be favorable if the bracing device 194 comprises one or more bracing clamp elements that are not shown in the drawing.

The battery module 100 shown in FIG. 1 can preferably be produced as follows:

Preferably, a first receiving body 132 is first provided (cf. FIG. 2).

Figure 3:
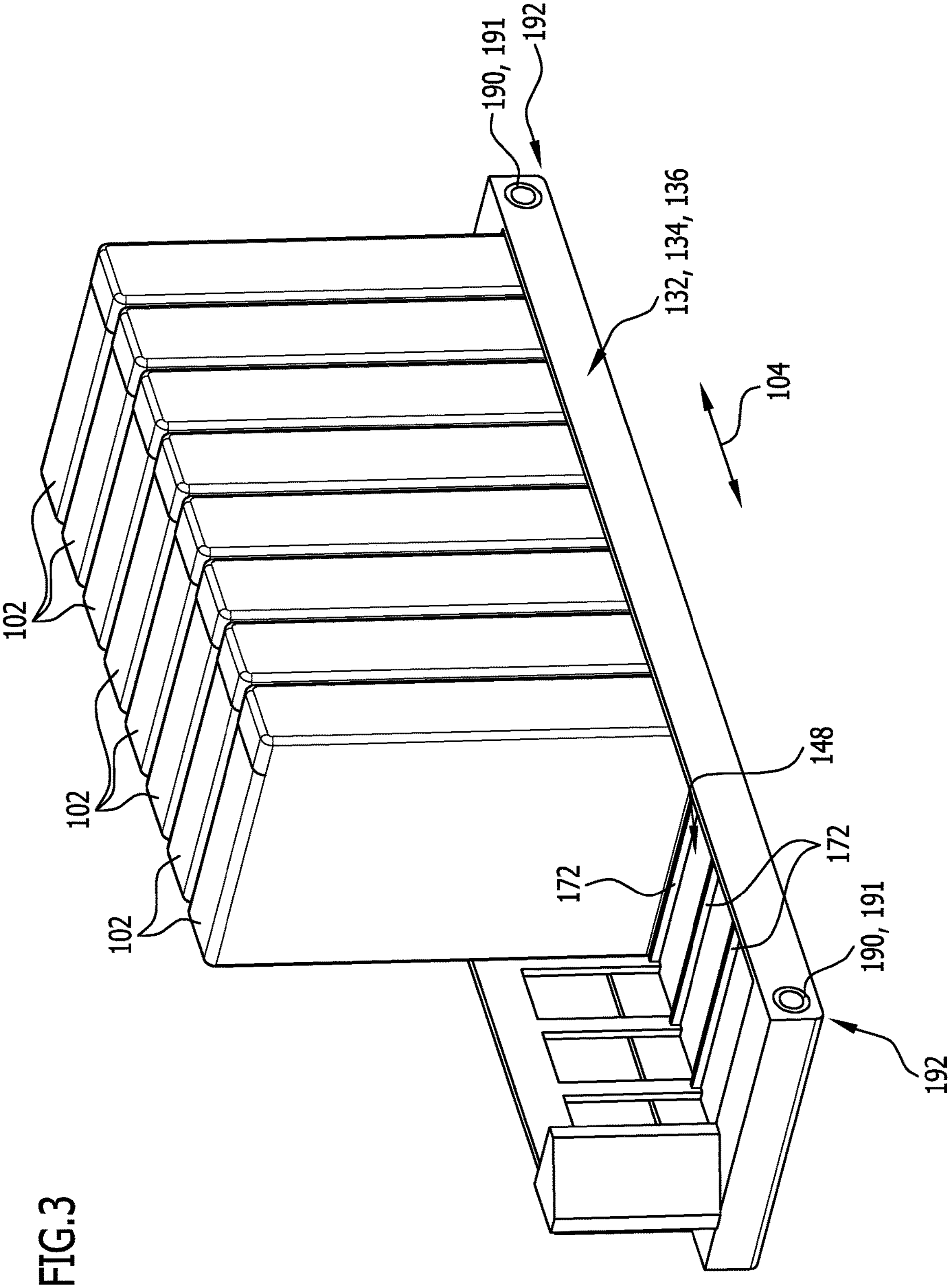
FIG. 3 is a schematic perspective representation of the receiving body of FIG. 2 and of galvanic cells arranged in a receptacle of the receiving body in a method step following the method step of FIG. 2 of a method for producing the embodiment of a battery module shown in FIG. 1.

It can be favorable if the galvanic cells 102 are arranged in the receptacle 148 of the receiving body 132*a* along the stacking direction 104, in particular in alignment (cf. FIG. 3).

By means of the spacer elements 172, the galvanic cells 102 are positioned in particular relative to each other and/or relative to the first receiving body 132*a*.

In particular, the galvanic cells 102 are arranged in the receptacle 148 of the first receiving body 132*a* substantially parallel to each other and/or spaced apart from each other.

Subsequently, a particularly flowable and/or castable connecting material 146 is preferably introduced into the receptacle 148 of the first receiving body 132*a* (cf. FIG. 5).

In particular, the connecting material 146 is cast into the receptacle 148 of the first receiving body 132*a*, which forms a casting mold (cf. FIG. 5).

Alternatively, it is conceivable that the connecting material 146 is initially introduced, in particular cast, into the receptacle 148 of the first receiving body 132*a* (cf. FIG. 4), wherein the galvanic cells 102 are subsequently arranged in the receptacle 148 of the first receiving body 132*a* (cf. FIG. 5).

Preferably, the connecting material 146 at least partially cures and/or at least partially cross-links after introduction thereof into the receptacle 148 of the first receiving body 132*a*.

When the connecting material 146 is at least partially cured and/or cross-linked, in particular, a connecting material body 144 of a first connecting body 130*a* is formed, which connects the galvanic cells 102 to each other in the stacking direction 104.

The connecting material body 144 preferably remains form-fitted in the first receiving body 132*a* after curing and/or cross-linking of the connecting material 146. In particular, the connecting material body 144 together with the first receiving body 132*a* forms a first connecting body 130*a*, which connects the galvanic cells 102 to each other in the stacking direction 104.

The galvanic cells 102 are connected to each other by means of the connecting material 146 preferably on a first side of the latter, in particular on a short secondary side 118*a* of the galvanic cells 102.

It can be favorable if the galvanic cells 102 are fixed on a second side while the connecting material is still flowable and/or castable in the receptacle 148 of the first receiving body 132*a*.

The galvanic cells 102 are in particular fixed on the second side while the galvanic cells 102 are cast on the first side.

Preferably, the galvanic cells 102 are positioned and/or fixed relative to each other on the second side during the introduction of the connecting material 146 into the receptacle 148 of the first receiving body 132*a* and/or during casting of the galvanic cells 102 on the first side in such a manner that primary sides 116 of the cell housings 110 of the galvanic cells 102 are arranged substantially parallel to each other.

The second side of the galvanic cells 102 is in particular a side of the galvanic cells 102 facing away from the first side.

The first side and the second side are, in particular, the short secondary sides 118*a* of the galvanic cells 102 and/or the cell housings 110 of the galvanic cells 102.

It can be favorable if the galvanic cells are positioned and/or fixed relative to each other by means of a second receiving body 132*b* on the second side of the galvanic cells while the galvanic cells 102 are being cast together.

Preferably, the galvanic cells 102, after curing and/or cross-linking of the connecting material 146 in the receptacle 148 of the first receiving body 132*a*, are arranged in the receptacle of a second receiving body 132*b*.

Subsequently, a connecting material 146, which is in particular flowable and/or castable, is preferably introduced into the receptacle 148 of the second receiving body 132*b*.

The second receiving body 132*b* forms a mold 164 for the connecting material 146.

The connecting material 146 cures and/or cross-links, preferably at least partially, after introduction thereof into the receptacle 148 of the second receiving body 132*b*.

When the connecting material 146 is at least partially cured and/or cross-linked, a connecting material body 144 of a second connecting body 130*b* is formed, in particular, which connects the galvanic cells 102 to each other in the stacking direction 104.

The connecting material body 144 preferably remains form-fitted in the second receiving body 132*b* after curing and/or cross-linking of the connecting material 146. In particular, the connecting material body 144 together with the second receiving body 132*b* forms a second connecting body 130*b*, which connects the galvanic cells 102 to each other in the stacking direction 104.

The connecting material 146 preferably does not fully cure and/or fully cross-link until after the galvanic cells 102 on the first side and the second side have been cast.

It can be favorable if the galvanic cells 102 are heated and/or dried prior to introducing the connecting material 146 into the receptacle 148 of the first and/or second receiving body 132*a*, 132*b*.

Alternatively or additionally, it can be provided that the connecting material 146 is heated before being introduced and/or after being introduced into the receptacle 148 of the first and/or second receiving body 132*a*, 132*b*, in particular by supplying heat.

Preferably, the galvanic cells 102 are heated to a temperature in the range of approximately 20° C. to approximately 60° C., for example of approximately 25° C. to approximately 55° C., in particular of approximately 25° C. to approximately 45° C.

Preferably, a dynamic viscosity of the connecting material 146 can be reduced by heating the galvanic cells 102 and/or the connecting material 146.

A flow behavior of the connecting material 146, in particular, can be improved by heating the galvanic cells 102 and/or the connecting material 146.

It can also be favorable if heating the galvanic cells 102 can accelerate curing of the connecting material 146.

Preferably, a consistent process quality can be realized by heating the galvanic cells 102. Preferably, a bubble formation during a curing of the connecting material 146 can be prevented by drying the galvanic cells 102 prior to introducing the connecting material 146 into the receptacle 148 of the receiving body 132 and/or prior to casting the galvanic cells 102.

The galvanic cells 102 are preferably aligned during the production of the two connecting bodies 130 in such a manner that cell poles 178 of the galvanic cells 102 of the battery module 100, in particular of all galvanic cells 102 of the battery module 100, are arranged in one plane.

The galvanic cells 102 of the battery module 100 are cast with the connecting material 146 preferably at normal pressure or at a negative pressure, for example, at a pressure in the range of approximately 200 mbar to approximately 800 mbar.

The connecting material 146 in particular forms a one-piece connecting material body 144 in each case, wherein a one-piece connecting material body 144 preferably connects all galvanic cells 102 of the battery module 100 to one another in a materially bonded and/or form-fitting manner.

Figure 16:
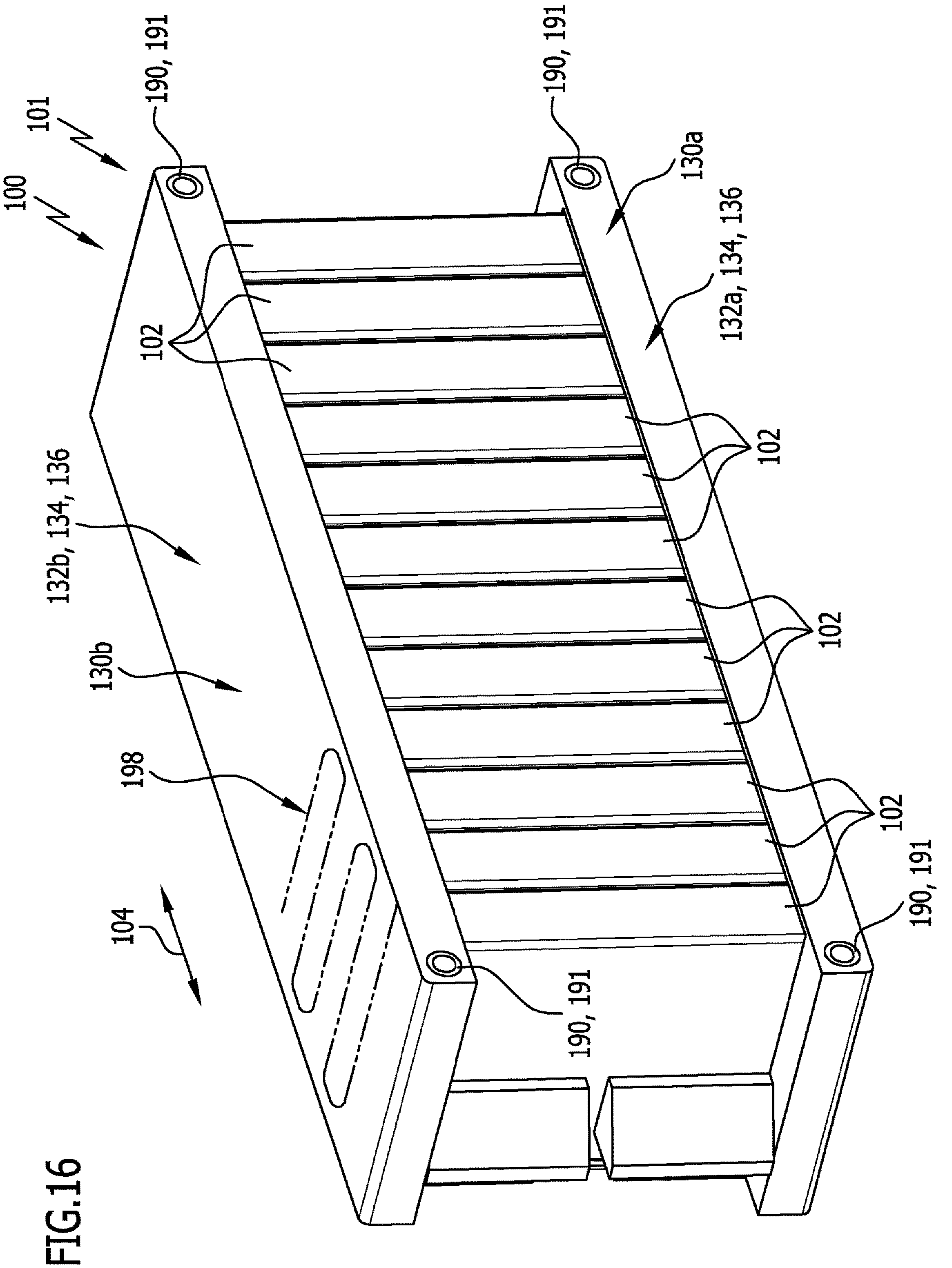
FIG. 16 is a representation corresponding to the representation in FIG. 8, wherein the receiving bodies of the battery module comprise a temperature control channel structure.

An embodiment of a battery module 100 shown in FIG. 16 differs from the embodiment of a battery module 100 shown in FIGS. 1 to 15 substantially in that the receiving bodies 132 of the two connecting bodies 130 comprise a temperature control channel structure 198 through which a temperature control medium can be conducted.

A temperature control medium is, for example, a temperature control liquid, in particular water.

The galvanic cells 102 of the battery module 100 can preferably be temperature controlled, in particular cooled or heated, by means of the temperature control channel structure 198.

A tempering channel structure 198 of the receiving bodies 132 is, for example, a temperature controlled channel structure 198 produced by roll bonding, in particular when the receiving body 132 comprises or is formed from a metallic material, in particular aluminum.

In other respects, the embodiment of a battery module 100 shown in FIG. 16 is identical in structure and function to the embodiment of a battery module 100 shown in FIGS. 1 to 15, so that reference is made to their above description in this respect.

Figure 17:
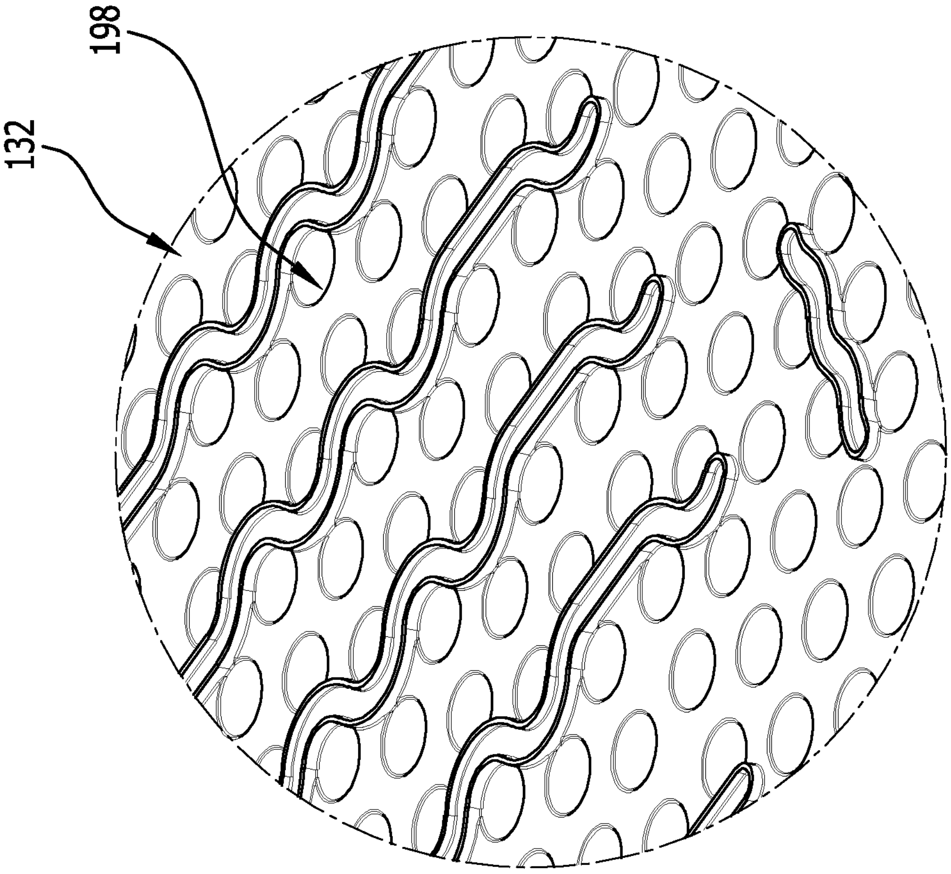
FIG. 17 is a schematic perspective representation of a temperature control channel structure of a receiving body.

An embodiment of a battery module 100 shown in FIG. 17 differs from the embodiment of a battery module 100 shown in FIG. 16 substantially in that the temperature control channel structure 198 of the receiving bodies 132 is a temperature control channel structure 198 produced by welding, in particular by friction welding, of a plurality of partial bodies of the receiving bodies 132.

In particular, the receiving bodies 132 comprise or are formed from a plastic material.

It can be favorable if the partial bodies of the receiving bodies 132 are injection-molded components.

In other respects, the embodiment of a battery module 100 shown in FIG. 17 is identical in structure and function to the embodiment of a battery module 100 shown in FIG. 16, so that reference is made to the foregoing description thereof.

Figure 20:
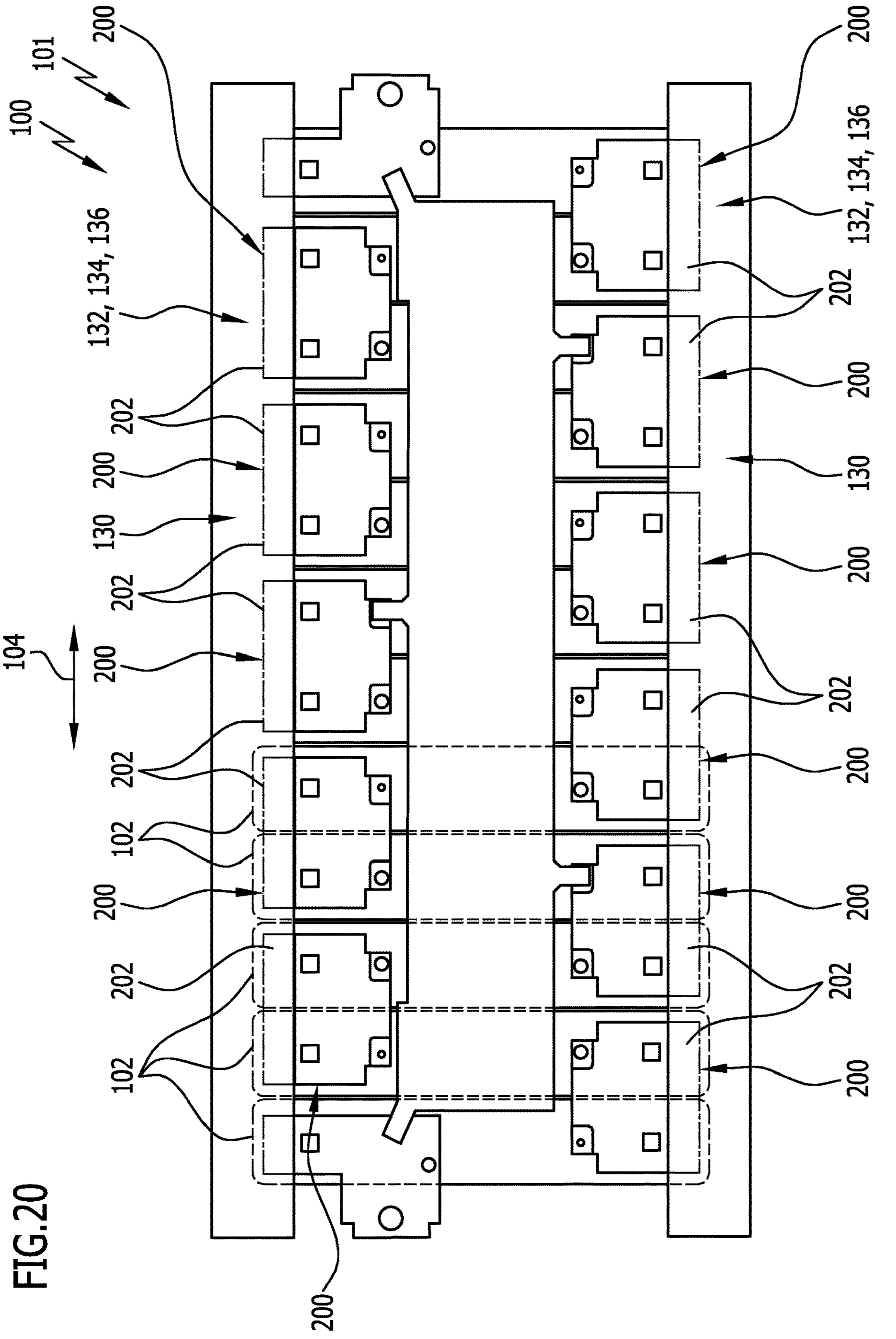
FIG. 20 is a top view of the battery module of FIG. 1, wherein a cell contacting system of the battery module is shown.

An embodiment of a battery module 100 shown in FIG. 20 differs from the embodiment of a battery module 100 shown in FIGS. 1 to 15 substantially in that cell connection elements 200 are thermally coupled, in particular thermally conductively connected, to the connecting material bodies 144 of the two connecting bodies 130.

The cell connection elements 200 preferably comprise or are formed from a metallic material, in particular a sheet material.

Two galvanic cells 102 are preferably electrically connected or can be connected to each other by means of a respective cell connection element 200.

Cell poles 178 of two galvanic cells 102 of the battery module 100 are in particular connected or can be connected to one another by means of the cell connection elements 200, in particular cell poles 178 of two galvanic cells 104 adjacent in the stacking direction 104.

A respective cell connection element 200 comprises, in particular, two connection sections in each case, wherein the cell connection element 200 is electrically connected or can be connected to a respective cell pole 178 of a galvanic cell 102 by means of a respective connection section.

The cell connection elements 200 in particular do not comprise any compensating sections by means of which a distance between the two connection sections of a respective cell connection element 200 can be changed.

The cell connection elements 200 are preferably formed substantially flat and/or flat.

The cell connection elements 200 preferably each comprise a heat conduction section 202, by means of which heat can be dissipated from the respective cell connection element 200.

In particular, the heat conduction section 202 of the cell connection elements 200 is thermally coupled, in particular thermally conductively coupled, in each case to a connecting material body 144 of the two connecting bodies 130.

The heat conduction portion 202 of a respective cell connection element 200 is enclosed with the connecting material 146 of the connecting material body 144, in particular at least partially, preferably substantially completely.

The heat conduction section 202 of a respective cell connection element 200 is preferably cast into the connecting material 146 of the connecting matrix body 144.

Preferably, the galvanic cells 102 of the battery module 100 can be cooled by dissipating heat from the cell connection elements 200 of the battery module 100.

In other respects, the embodiment of a battery module 100 shown in FIG. 20 is identical in structure and function to the embodiment of a battery module 100 shown in FIGS. 1 to 15, so that the description thereof above is referred to in this respect.

Figure 21:
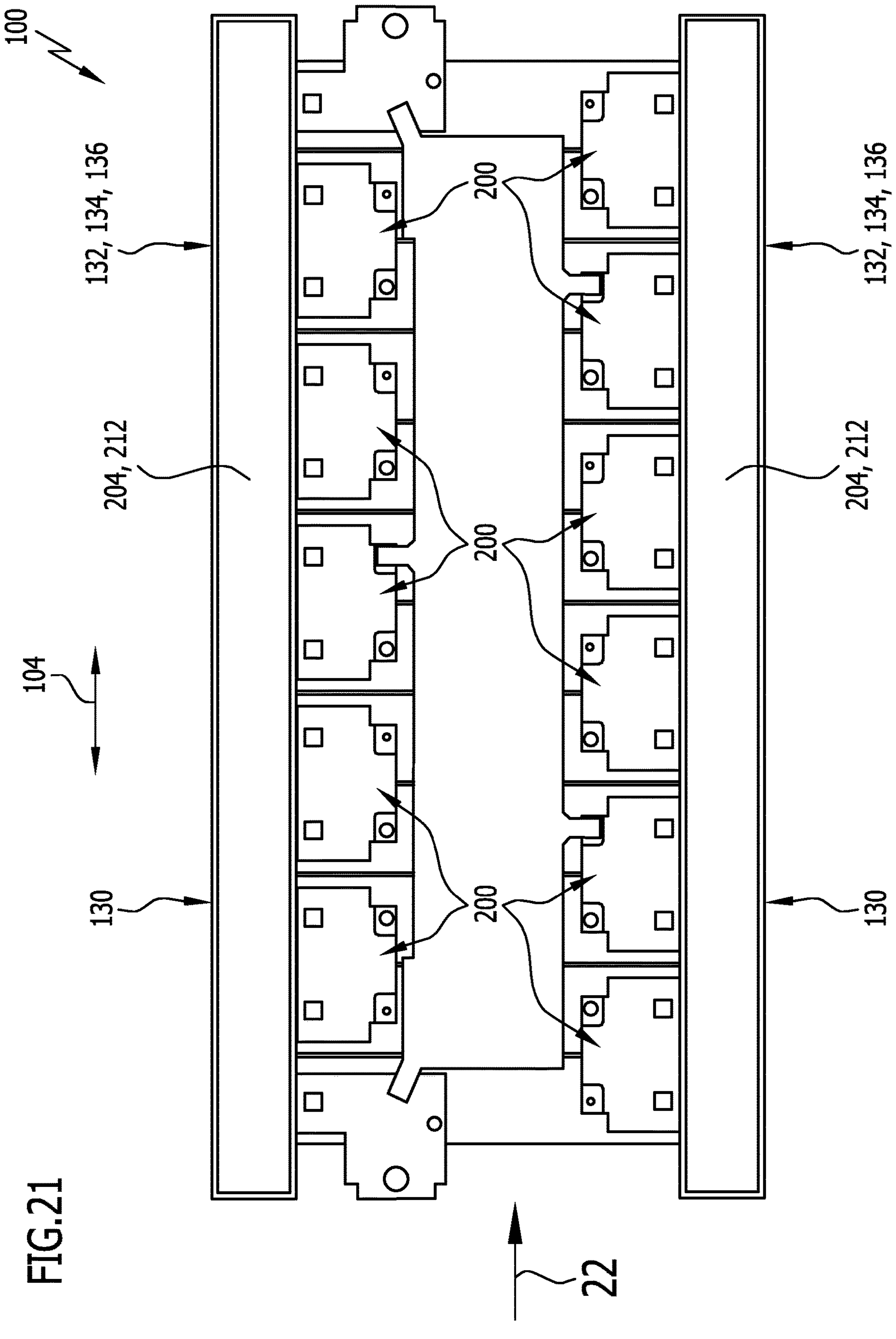
FIG. 21 is a representation corresponding to FIG. 20, wherein the battery module comprises connecting elements for detachable and/or tool-free fixing of a cover element to the battery module, which are arranged on connecting bodies, in particular on receiving bodies, of the battery module.
Figure 22:
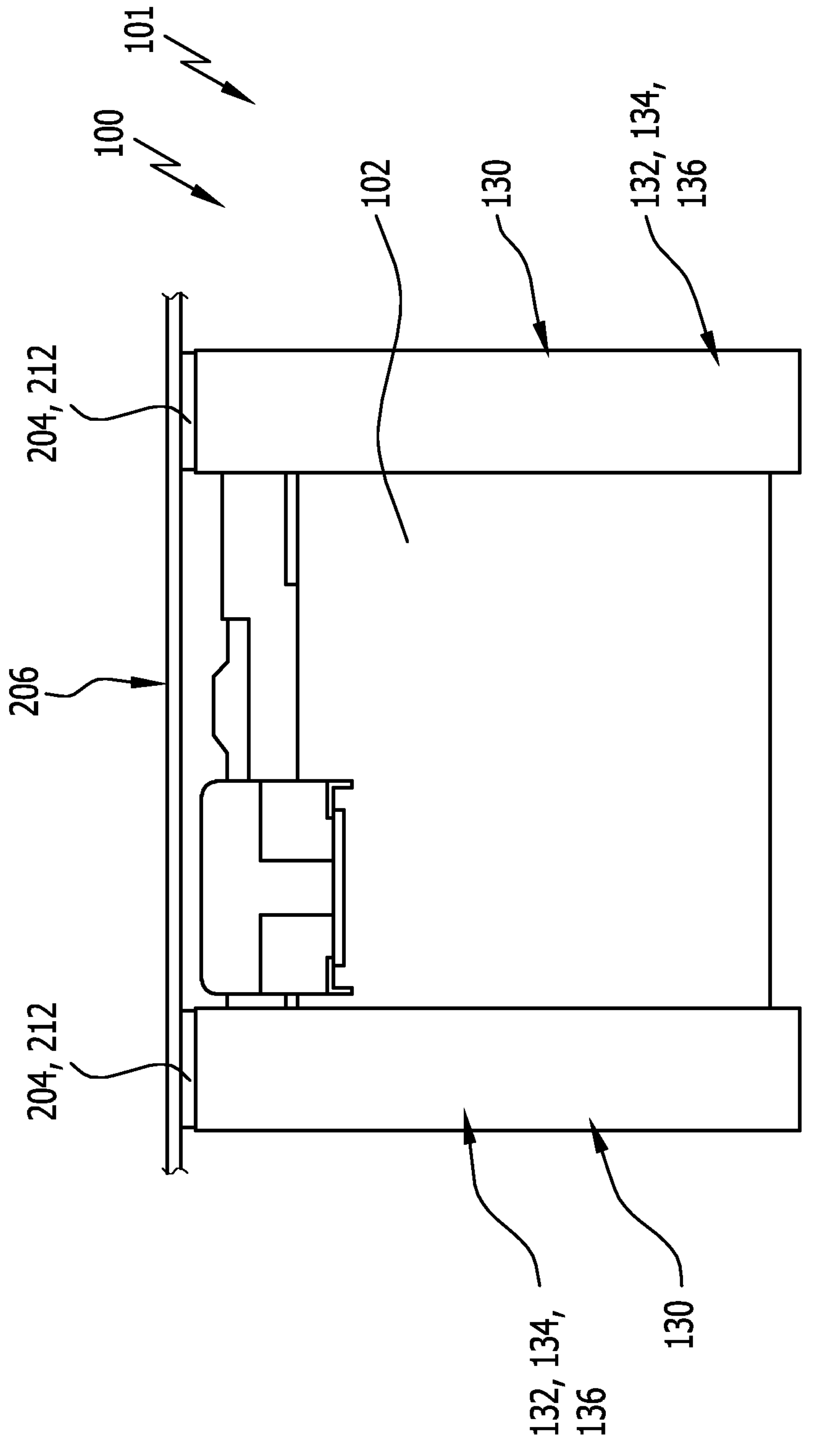
FIG. 22 is a schematic side view of the battery module of FIG. 21, looking in the direction of arrow 22 in FIG. 21, wherein a cover element is detachably fixed to the battery module by means of the connecting elements.
Figure 23:
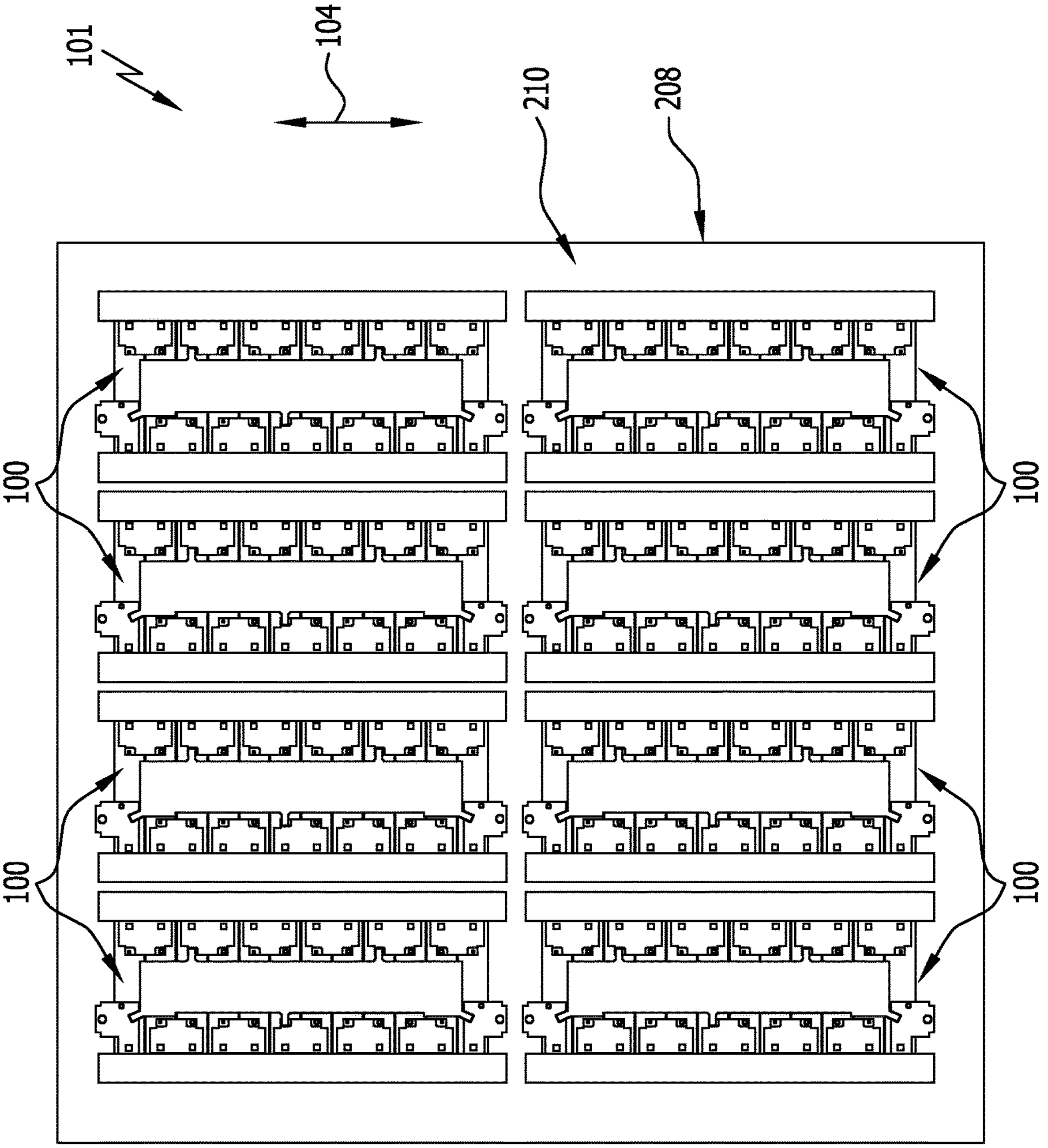
FIG. 23 is a schematic top view of a battery device comprising a housing and a plurality of battery modules shown in FIG. 21.

An embodiment of a battery module 100 shown in FIGS. 21 to 23 differs from the embodiment of a battery module 100 shown in FIG. 20 substantially in that the battery module 100 comprises connecting elements 204 for securing a cover element 206 of a battery device 101 to the battery module 100 in a detachable and/or tool-free manner, as shown in FIG. 22.

The battery device 101 preferably comprises a housing 208 and a plurality of battery modules 100.

It can be favorable if the housing 208 comprises the cover element 206.

In particular, the housing 208 of the battery device 101 comprises an interior space 210 in which the battery modules 100 of the battery device 101 are arranged or can be arranged.

The interior space 210 of the housing 208 of the battery device 101 is preferably closed or can be closed by means of a single cover element 206.

The connecting elements 204 provided for securing the cover element to the battery modules 100 of the battery device shown in FIG. 23 in a detachable and/or tool-free manner are preferably arranged on an upper side of the two connecting bodies 130, in particular of the receiving bodies 132 of the two connecting bodies 130, facing the cell poles 178 of the galvanic cells 102 of the battery module 100.

It can be favorable, in particular, if a respective connecting element 204 enabling the cover element 206 to be fixed to a respective battery module 100 in a detachable and/or tool-free manner is arranged on a long side wall element 142*b* of the receiving body 132 of a respective connecting body 130.

The cover element 206 is preferably indirectly fixed or can be fixed to the housing 208 via the battery modules 100, in particular by means of the connecting elements 204 for fixing the cover element 206 to the battery modules 100 in a detachable and/or tool-free manner.

The cover element 206 of the battery device 101 is preferably connected only to the connecting bodies 130 of the battery modules 100.

The battery modules 100 of the battery device 101 shown in FIG. 23 particularly do not comprise an additional battery module cover element different from the cover element 206 of the battery device 101.

Preferably, a rigidity of the battery device 101 can be increased by connecting the cover element 206 of the battery device 101 to the battery modules 100 of the battery device 101.

It can be favorable if the connecting elements 204 for fastening the cover element 206 to the battery modules 100 in a detachable and/or tool-free manner are designed as hook-and-loop fastener elements 212, in particular as hook-and-loop fastener straps.

Alternatively or additionally thereto, it is conceivable that one or more connecting elements 204 for fastening the cover element 206 to the battery modules 100 in a detachable and/or tool-free manner are designed as magnetic elements, in particular as magnetic strips.

Further, an adhesive connection can be provided as one or more connecting elements 204 for fastening the cover element 206 to the battery modules 100, at least in a tool-free manner.

In addition, it is conceivable that one or more rows of individual magnets form one or more connecting elements 204 for fastening the cover element 206 to the battery modules 100 in a detachable and/or tool-free manner.

The connecting elements 204 for fixing the cover element 206 to the battery modules 100 in a detachable and/or tool-free manner are fixed to the cover element 206, in particular by means of an adhesive connection. At least a sub-element of a respective connecting element 204 is preferably fixed to the cover element 206 by means of an adhesive connection.

The connecting elements 204 for fixing the cover element 206 to the battery modules 100 in a detachable and/or tool-free manner preferably each comprise two sub-elements, wherein one of the sub-elements of each connecting element 204 is fixed or can be fixed, in particular bonded or can be bonded, to the cover element 206 and another to a respective battery module 100.

The sub-elements of the connecting elements 204 are preferably each individually fixed to the cover element 206 or to the battery modules 100 in a non-detachable manner.

A tool-free and/or detachable connection between the cover element 206 and the battery modules 100 then preferably results from the fact that the two sub-elements can be fixed to each other in a detachable and/or tool-free manner.

One or more connecting elements, preferably one or two or more than two sub-elements of the connecting elements 204, can in particular comprise or be formed from a plastic material.

For example, plastic material may include the following:
Poly(p-phenylene terephthalamide) (PPTA) and/or
Poly(m-phenylene isophthalamide) (PMPI).

Alternatively or additionally, it can be provided that the connecting elements 204 for fixing the cover element 206 to the battery modules 100 in a detachable and/or tool-free manner, preferably one or two or more than two sub-elements of the connecting elements 204 for fixing the cover element 206 to the battery modules 100 in a detachable and/or tool-free manner, comprise a metal material or are formed from a metal material.

For example, plastic hook-and-loop fastener elements and/or metal hook-and-loop fastener elements can be provided.

In other respects, the embodiment of a battery module 100 shown in FIGS. 21 to 23 corresponds in terms of structure and function to the embodiment of a battery module 100 shown in FIG. 20, so that reference is made to the above description thereof.

Figure 24:
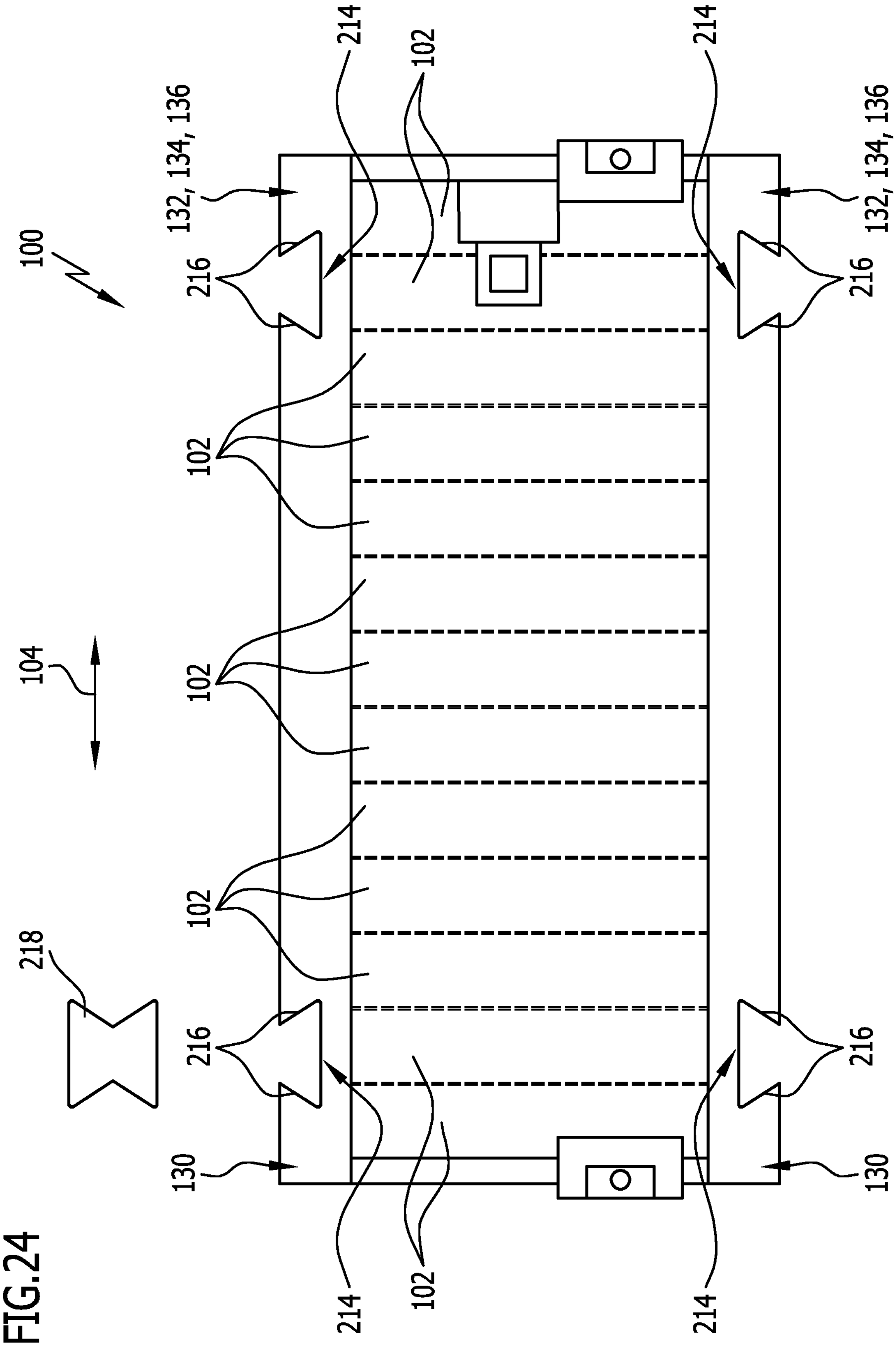
FIG. 24 is a schematic top view of a further embodiment of a battery module comprising connection sections, and of an undercut element of a battery device.
Figure 25:
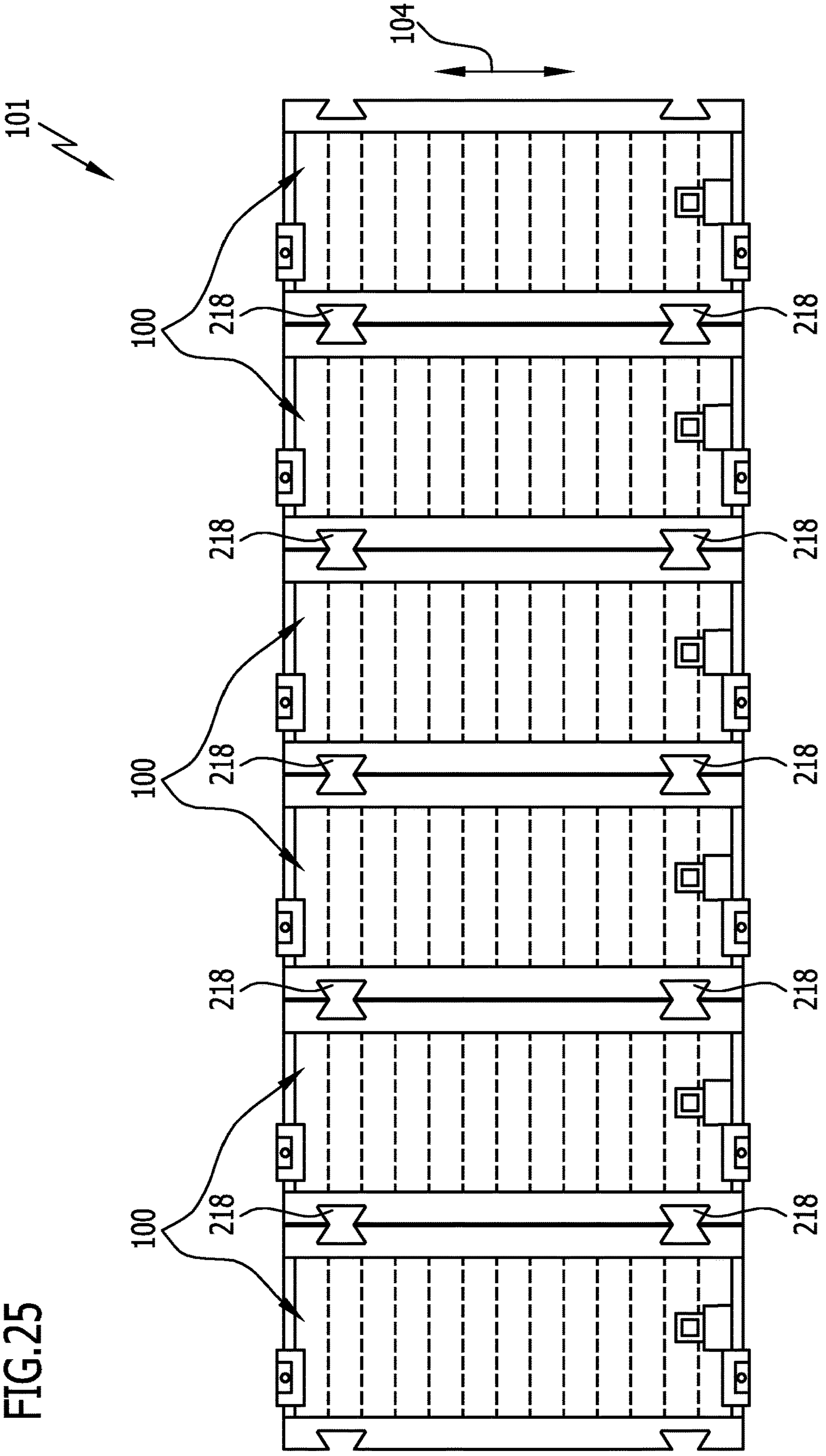
FIG. 25 is a schematic top view of a battery device comprising several battery modules shown in FIG. 24, which are connected to each other by means of undercut elements shown in FIG. 24.

An embodiment of a battery module 100 shown in FIGS. 24 and 25 differs from the embodiment of a battery module 100 shown in FIGS. 1 to 15 substantially in that the two connecting bodies 130 of the battery module 100 each comprise two connecting sections 214, by means of which a respective connecting body 130 can be connected to a connecting body 130 of an adjacent battery module 100 (cf. FIG. 25).

The connecting sections 214 of the connecting bodies 130 comprise, in particular, one or more undercut sections 216 or are formed by the latter.

Two adjacent battery modules 100 can preferably be connected to each other by means of two undercut elements 218.

Preferably, an undercut element 218 for connecting two adjacent battery modules 100 can be inserted into a connecting section 214 of a first battery module 100 and into a connecting section 214 of a second battery module 100, respectively, in particular along a longitudinal direction of the connecting section 214 of the first battery module 100 and/or of the connecting section 214 of the second battery module 100.

Preferably, the connecting bodies 130, in particular the receiving bodies 132, of connected battery modules 100 are in direct contact with each other, with the exception of the connecting sections 214.

Adjacent battery modules 100 are preferably tensioned or can be tensioned against each other by inserting an undercut element 218 into the connecting sections 214 of the adjacent battery modules 100.

It can be favorable for a battery device 101 to comprise a housing 208, wherein battery modules 100 of the battery device 101 are connected or can be connected to the housing 208 by means of one or more undercut elements 214.

In particular, the housing 208 comprises a plurality of connection sections 214 into which an undercut element 218 can be inserted to connect the housing 208 to a respective battery module 100.

A battery module 100 is connected or can be connected to the housing 208 of the battery device 101 preferably by inserting an undercut element 218 into a connecting section 214 of the battery module 100 and a connecting section 214 of the housing 208.

A connecting section 214 comprises in particular a groove, which is preferably formed as a profile groove.

A respective profile groove of the connecting section 214 is preferably arranged substantially perpendicular to the stacking direction 104 of the battery module 100 and/or parallel to a short secondary side 118*a* of the galvanic cells 102 of the battery module 100.

It is conceivable, in particular, that the battery module includes a total of four or more than four connection sections 214, such as four profile grooves.

It can be favorable if an undercut element 218 is formed as profile strip or as a profile block, in particular as a sliding block.

Preferably, a cross-section of the connecting section 214, in particular the profile groove, is complementary to a cross-section of the undercut element 218.

It can be favorable if a connecting section 214, in particular a profile groove, is formed in a cross-section as a regular trapezoid.

An undercut element 218 is thereby preferably formed as a double regular trapezoid in a cross-section.

The undercut element 218 is, for example, a dovetail profile, in particular a double dovetail profile.

In other respects, the embodiment of a battery module 100 shown in FIGS. 24 and 25 corresponds in terms of structure and function to the embodiment of a battery module 100 shown in FIGS. 1 to 15, so that reference is made to the above description thereof.

Figure 26:
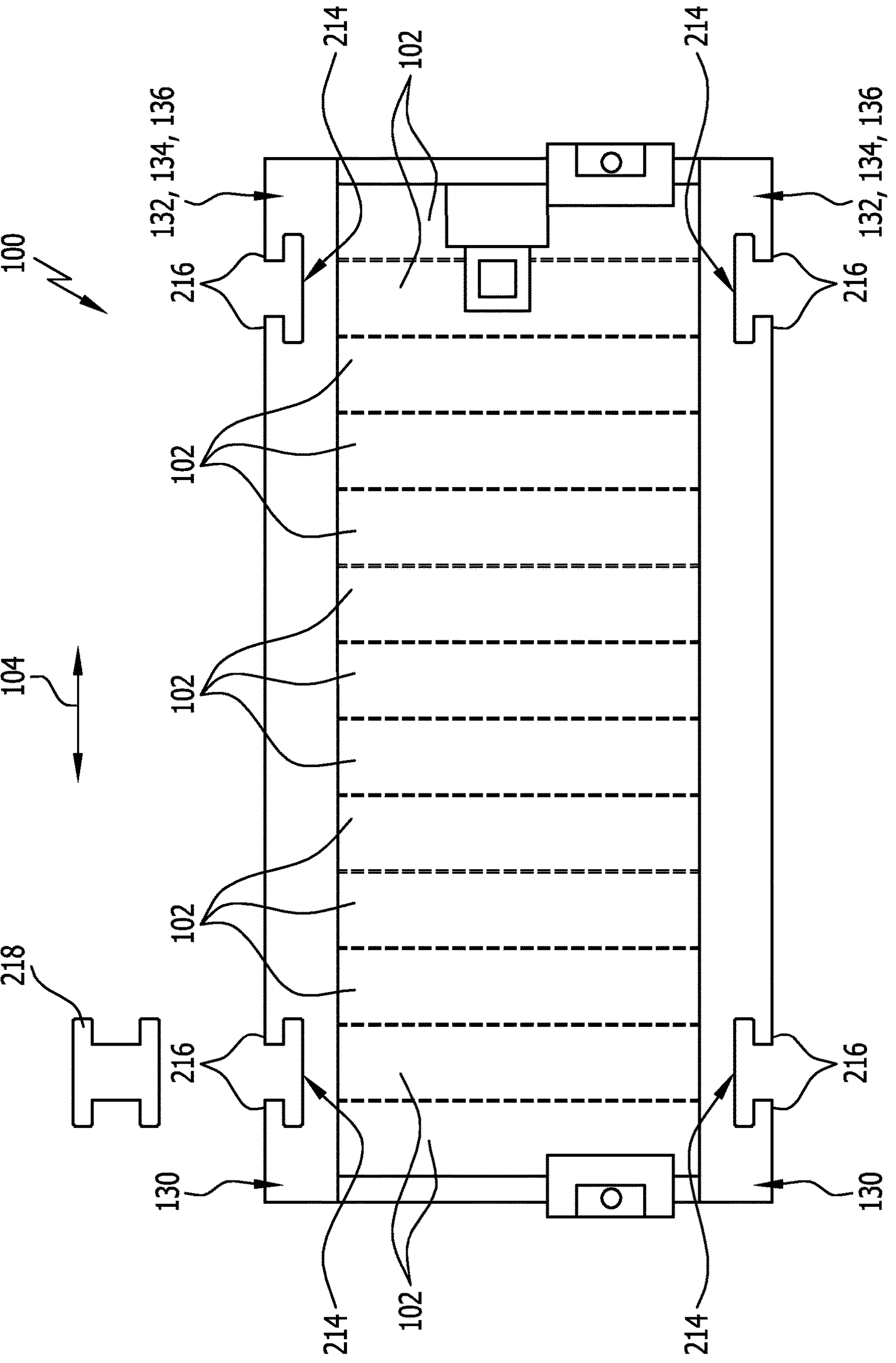
FIG. 26 is a schematic top view of a further embodiment of a battery module comprising connection sections, and of an undercut element of a battery device.
Figure 27:
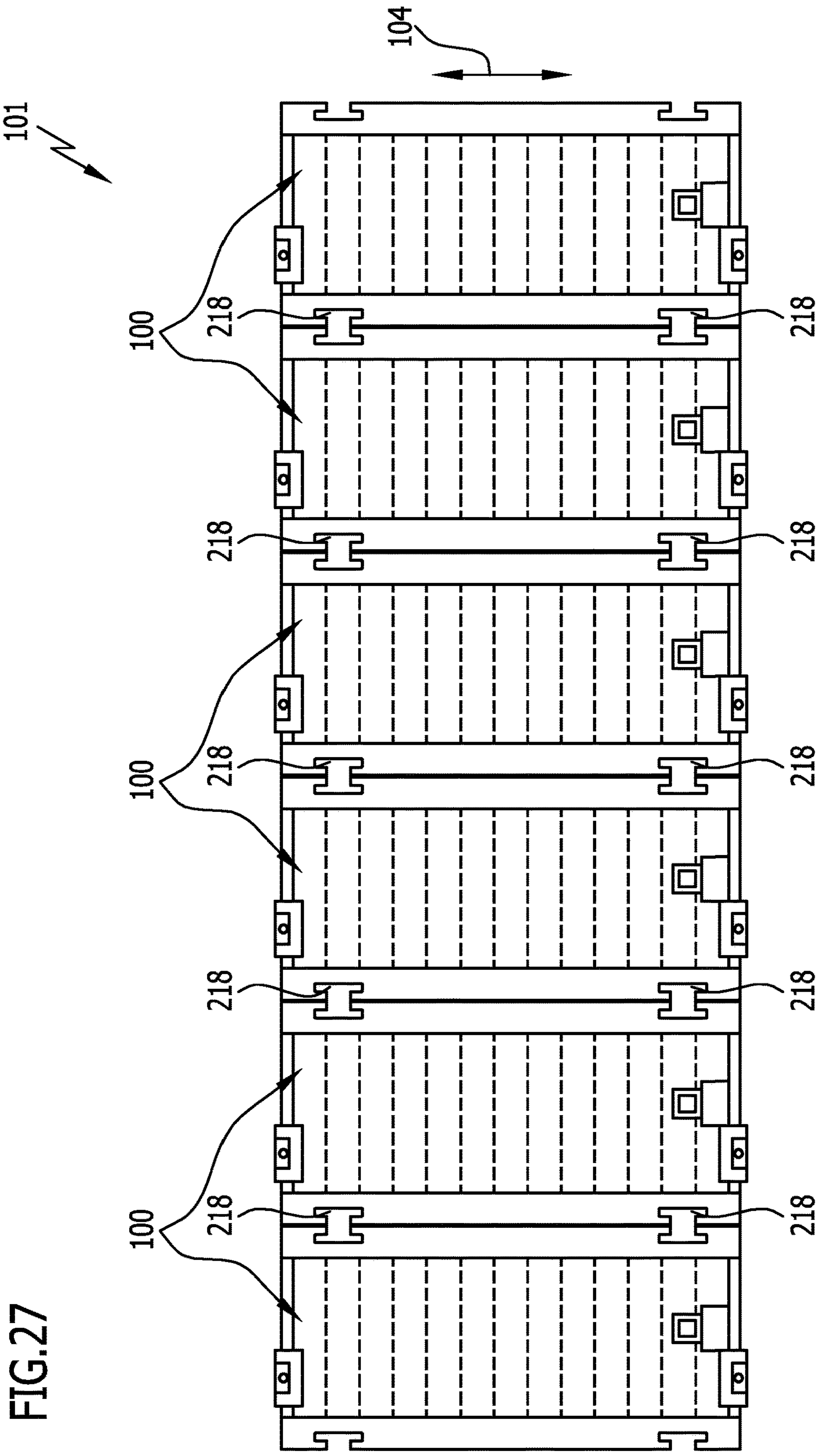
FIG. 27 is a schematic top view of a battery device comprising several battery modules shown in FIG. 26, which are connected to each other by means of undercut elements shown in FIG. 26.
Figure 28:
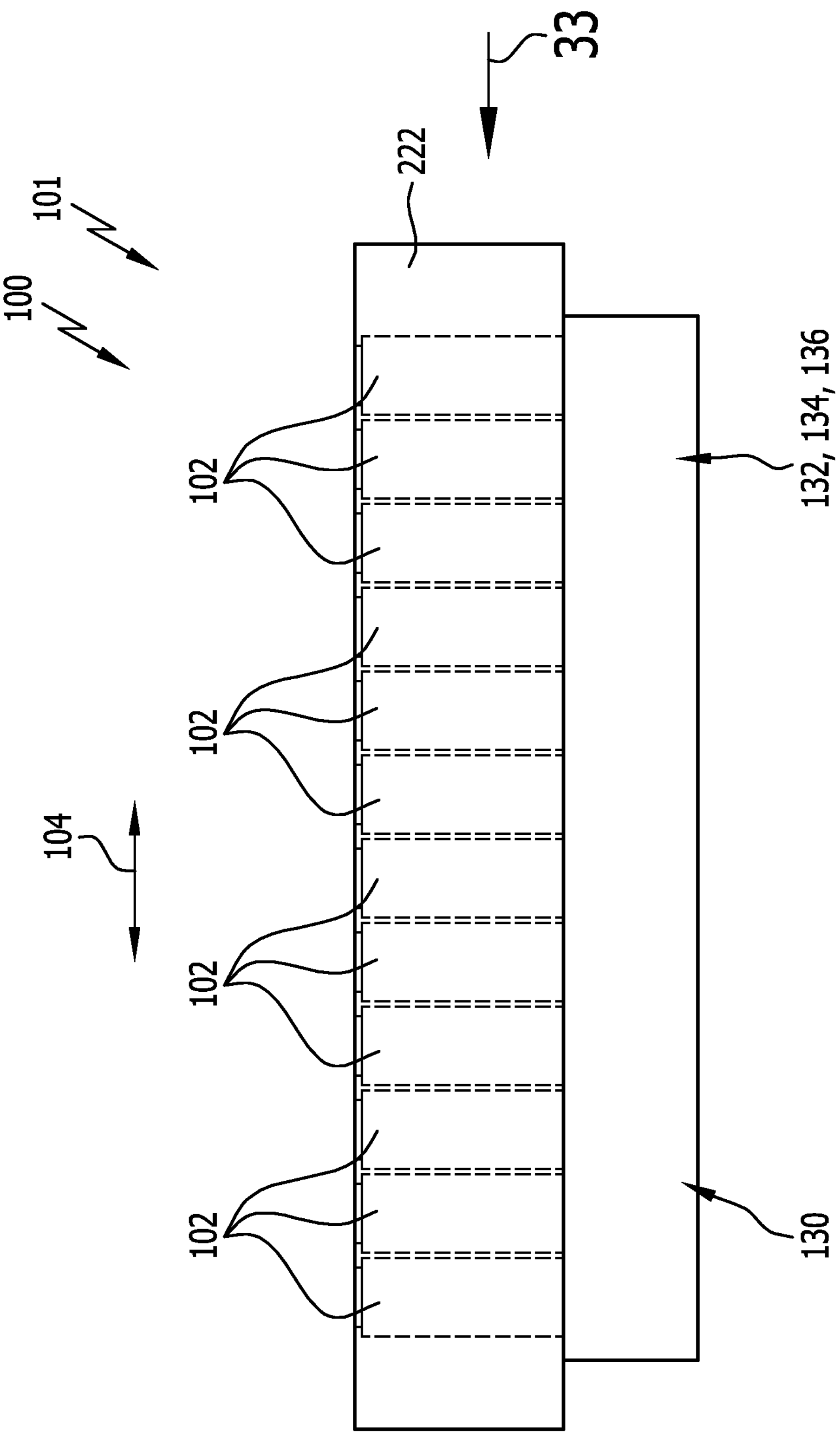
FIG. 28 is a schematic side view of a further embodiment of a battery module.

An embodiment of a battery module 100 shown in FIGS. 26 and 27 differs from the embodiment of a battery module 100 shown in FIGS. 24 and 25 substantially in that a respective connecting section 214, in particular a profile groove, is T-shaped in a cross-section.

An undercut element 218 is preferably double-T-shaped in a cross-section.

In other respects, the embodiment of a battery module 100 shown in FIGS. 26 and 27 corresponds in terms of structure and function to the embodiment of a battery module 100 shown in FIGS. 24 to 25, so that reference is made to the above description thereof.

An embodiment of a battery module 100 shown in FIGS. 28 to 34 differs from the embodiment of a battery module 100 shown in FIGS. 1 to 15 substantially in that a connecting body 130 is arranged on a long secondary side 118*b* of the galvanic cells 102, in particular on a long secondary side 118*b* of the galvanic cells 102 facing away from the cell poles 178 of the galvanic cells 102.

The battery module 100 preferably comprises only a single connecting body 130, which is arranged on the long secondary side 118*b* of the galvanic cells 102.

In particular, the battery module 100 does not comprise any further connecting bodies arranged on the short secondary sides 118*a* of the galvanic cells 102.

It can be favorable if all long secondary sides 118*b* of the galvanic cells 102 of the battery module 100 are completely arranged in a receptacle 148 of the receiving body 132 of the single connecting body 130, which are facing away from the cell poles 178 of the galvanic cells 102.

The connecting body 130 preferably encloses at most approximately 40%, particularly at most approximately 20%, of a surface area of the short secondary sides 118*a* and/or the main sides 116 of the galvanic cells 102.

It can be favorable if the receiving body 132 of the connecting body 130 comprises a temperature control channel structure, which is not shown in the drawing, through which a temperature control medium, in particular a temperature control liquid, can be conducted. In particular, a cell base of the galvanic cells 102 of the battery module 100 can be cooled with such a temperature control channel structure.

Production of the embodiment of the battery module 100 shown in FIGS. 28 to 34 is preferably analogous to a production of the embodiment of a battery module 100 shown in FIGS. 1 to 15.

It is conceivable that the galvanic cells 102 are first arranged in the receptacle 148 of the receiving body 132 and then the connecting material 146 is introduced, in particular cast, into the receptacle 148 of the receiving body 132.

Figure 32:
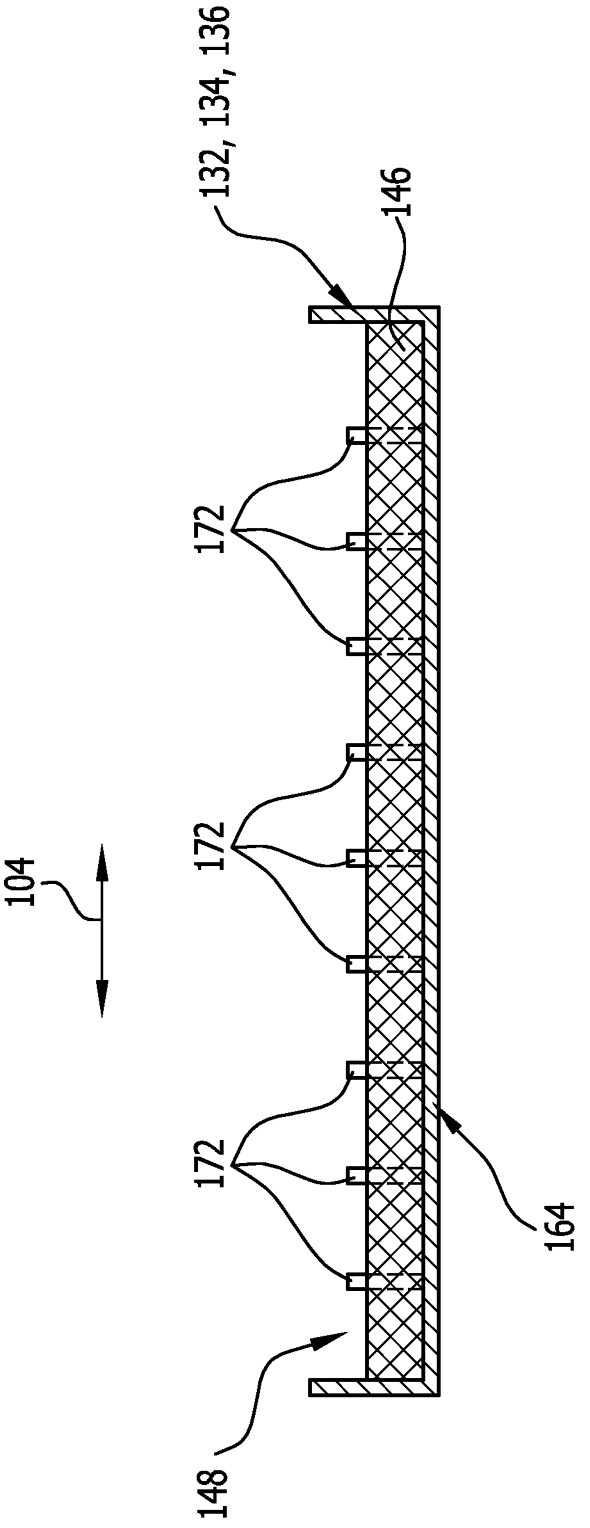
FIG. 32 is a representation of the receiving body corresponding to the representation in FIG. 31, wherein connecting material is inserted into a receptacle of the receiving body.
Figure 33:
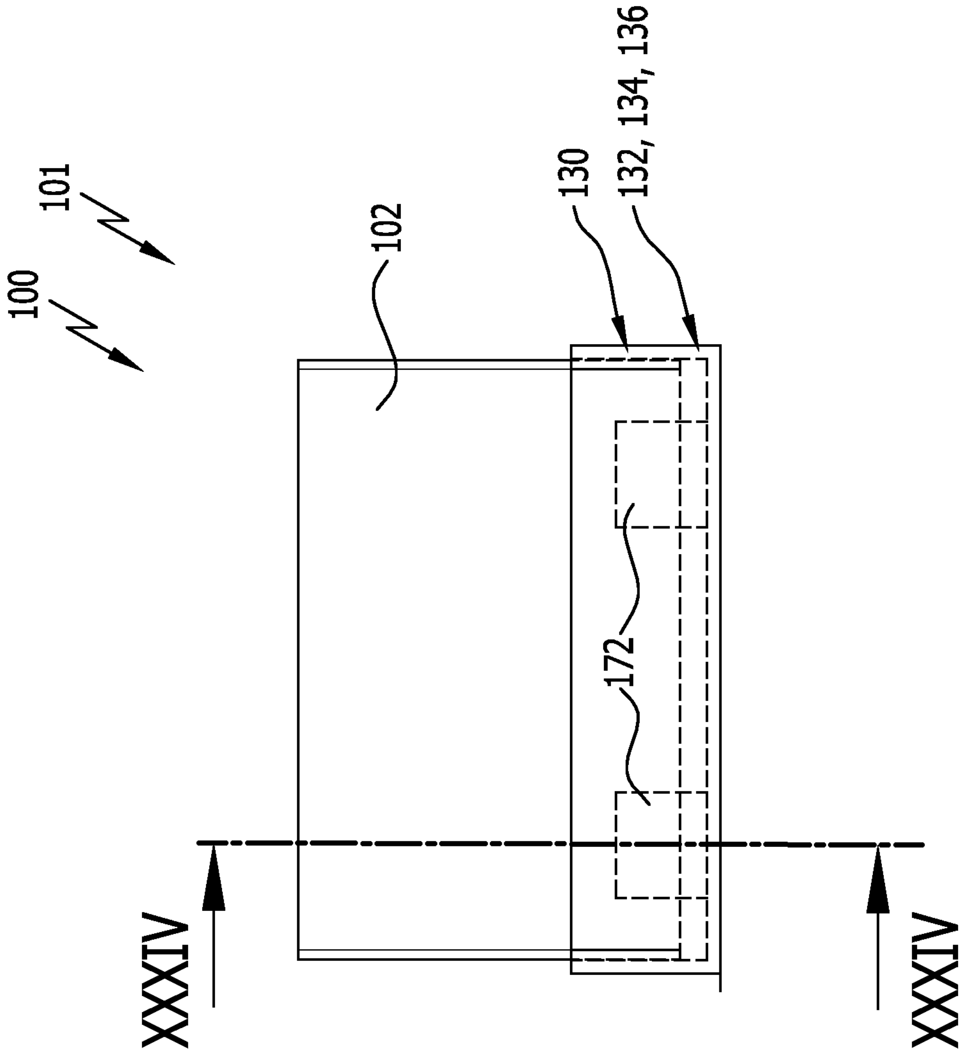
FIG. 33 is a schematic front view of the battery module from FIG. 28 along the line 33 in FIG. 28.
Figure 34:
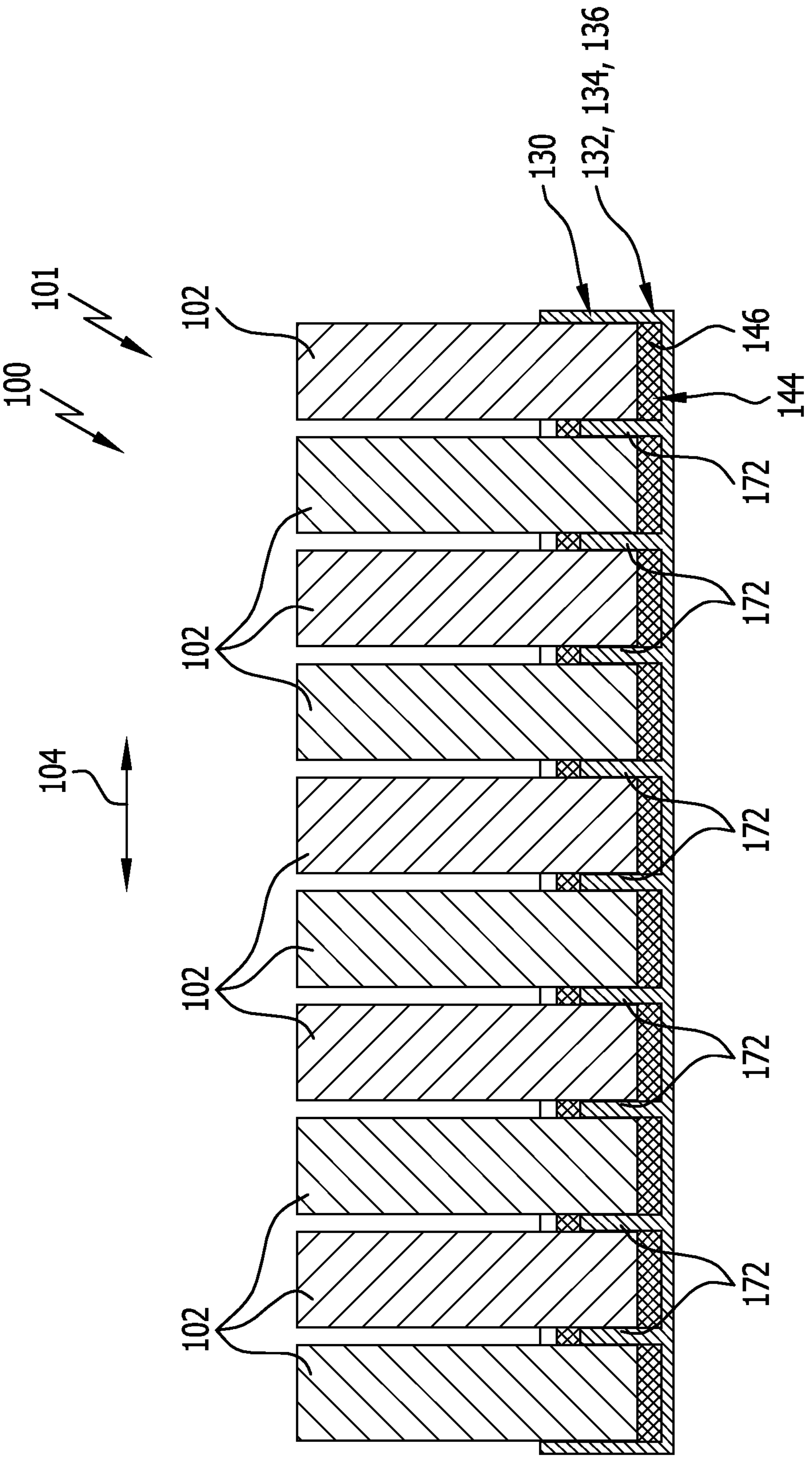
FIG. 34 is a schematic section of the battery module from FIG. 33 along the line XXXIV-XXXIV in FIG. 33.

Alternatively, it is possible that the connecting material 146 is first placed in the receptacle 148 of the receiving body 132 and then the galvanic cells 102 are arranged in the receptacle 148 of the receiving body 132 (cf. FIGS. 32 to 34).

Figure 29:
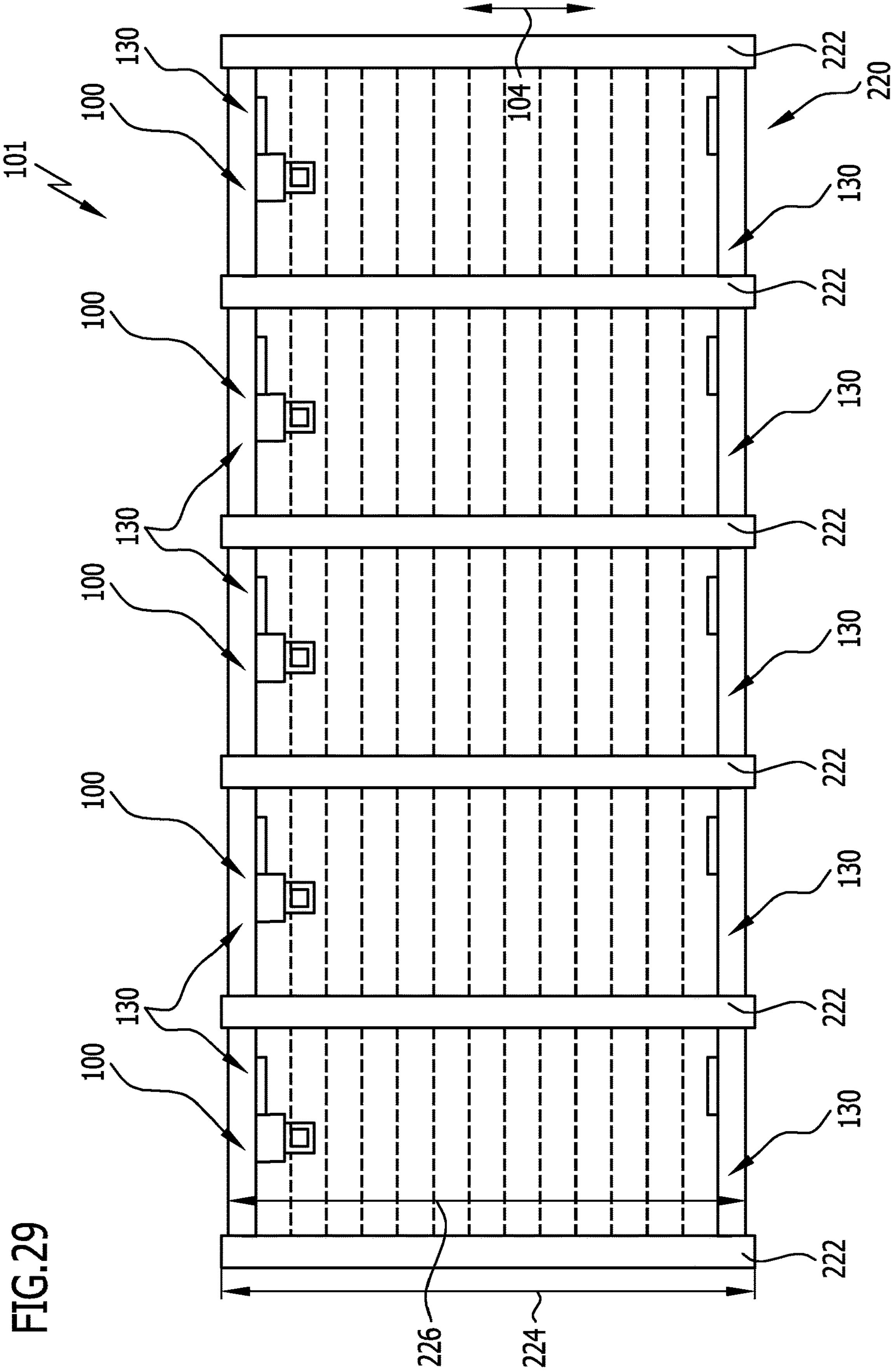
FIG. 29 is a schematic top view of an embodiment of a battery device comprising several of the battery modules shown in FIG. 28.
Figure 30:
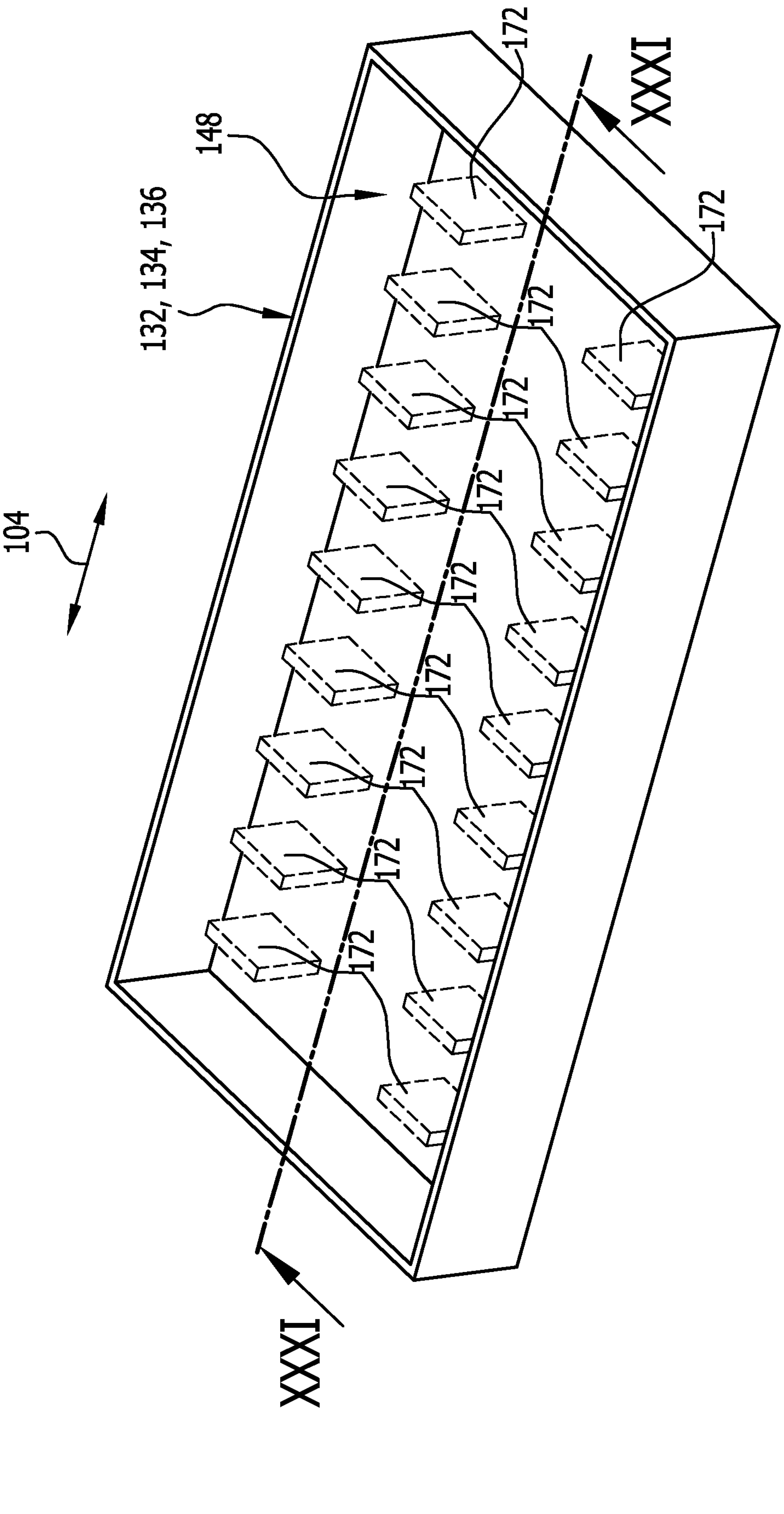
FIG. 30 is a schematic perspective representation of a receiving body of the battery module embodiment shown in FIG. 28.
Figure 31:
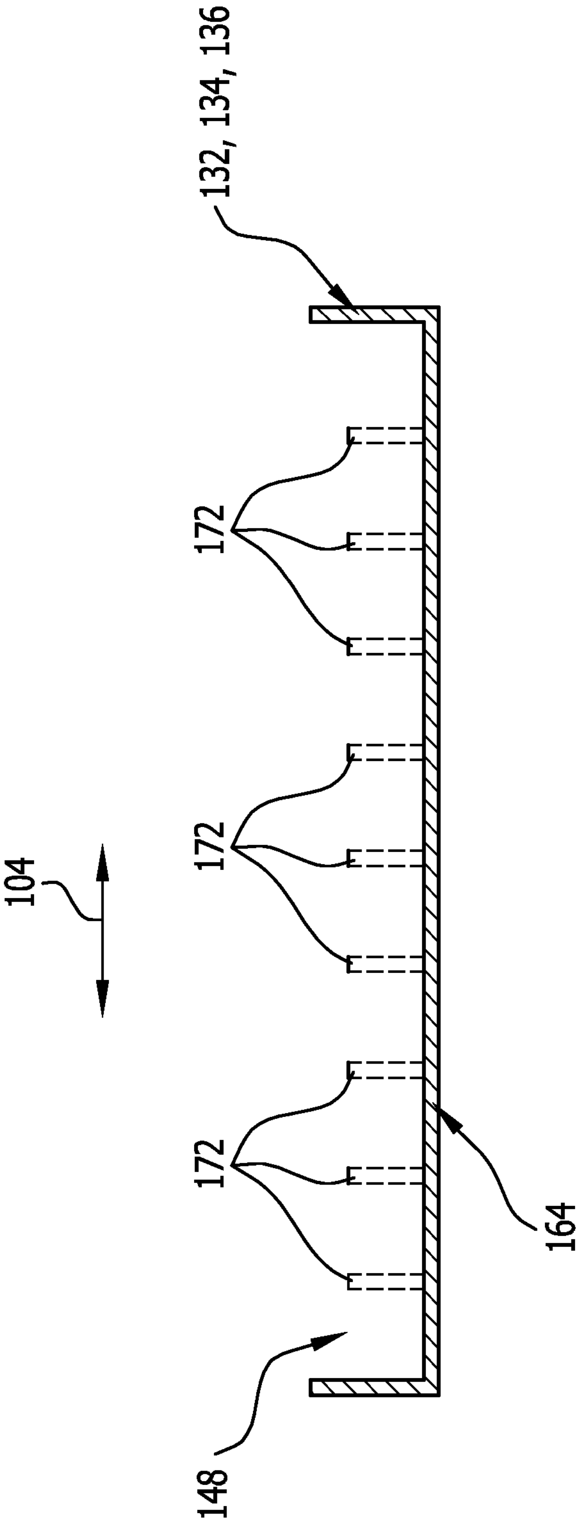
FIG. 31 is a schematic sectional representation of the receiving body of FIG. 30 along the line XXXI-XXXI in FIG. 30.

It can be favorable if a battery device 101 comprising a plurality of battery modules 100 in accordance with the embodiment shown in FIGS. 28 to 34 comprises a temperature control device 220 comprising a plurality of temperature control elements 222 (cf. FIG. 29).

The temperature control elements 222 of the temperature control device 200 comprise, in particular, a temperature control channel structure, which is not shown in the drawing, and through which a temperature control medium, in particular a temperature control liquid, can be conducted.

A temperature control channel structure of the temperature control elements 222 comprises, for example, one or more temperature control channels, which are arranged, in particular, in a meander shape.

The temperature control elements 222 of the temperature control device 200 are, for example, temperature control elements 222 produced by "roll bonding".

Preferably, a temperature control element 222 of the temperature control device 220 is arranged between each two adjacent battery modules 100 of the battery device 101.

A length 224 of a temperature control element 222 arranged between two adjacent battery modules 100 preferably corresponds to at least approximately 50% of a length 226 of the battery modules 100 in a direction parallel to the stacking direction 104, in particular at least approximately 75%, preferably at least approximately 95%.

It can also be favorable if a temperature control element 222 is arranged on a side of a respective battery module 100 facing away from the cell poles 178 of the galvanic cells 102 of the battery modules 100.

Heat can preferably be dissipated from the galvanic cells 102 of the battery modules 100 of the battery device 101 by means of the temperature control elements 222 of the temperature control device 200.

A cell base of the galvanic cells 102 can preferably be temperature-controlled, in particular cooled or heated, by means of temperature control elements 222, which are arranged on a side of the respective battery module 100 facing away from the cell poles 178 of the galvanic cells 102 of the battery modules 100.

Temperature control elements 222, which are arranged on a side of the respective battery module 100 facing away from the cell poles 178 of the galvanic cells 102 of the battery modules 100, are preferably in thermal contact with a cell base of the galvanic cells 102, for example by embedding the cell base of the galvanic cells 102 in the connecting material 146.

Preferably, the temperature control elements 222 of the temperature control device 200 arranged between two adjacent battery modules 100 of the battery device 101 are respectively arranged between the short secondary sides 118*a* of the galvanic cells 102 of the two adjacent battery modules 100.

Temperature control elements 100 arranged between two adjacent battery modules 100, in particular between the short secondary sides 118*a* of the galvanic cells 102 of the battery modules 100, are preferably in thermal contact with the short secondary sides 118*a* of the galvanic cells 100.

In all other respects, the embodiment of a battery module 100 shown in FIGS. 28 to 34 is identical in structure and function to the embodiment of a battery module 100 shown in FIGS. 1 to 15, so that reference is made to the above description thereof.

Figure 35:
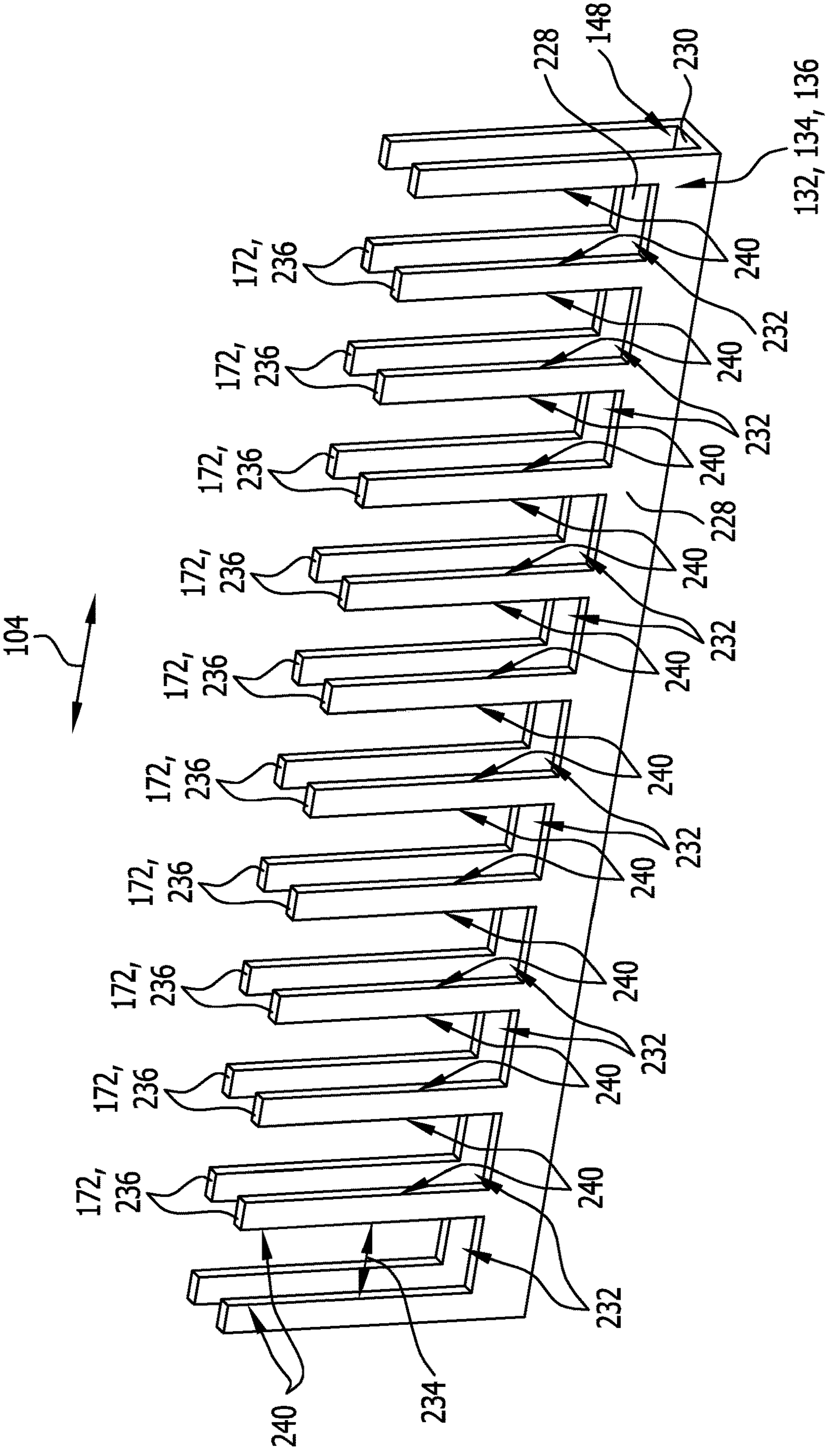
FIG. 35 is a schematic perspective representation of a receiving body of a further embodiment of a battery module.
Figure 36:
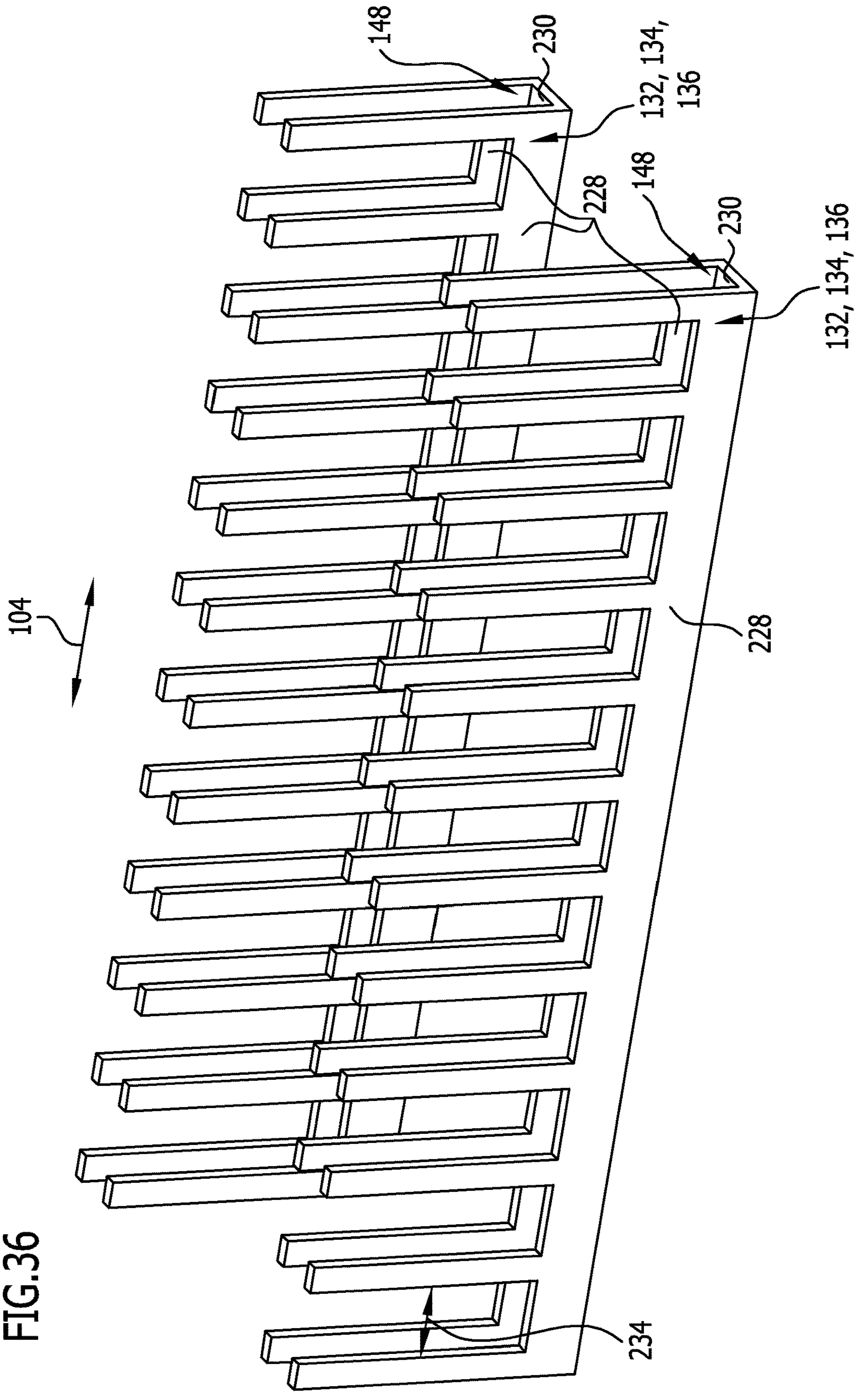
FIG. 36 is a schematic perspective representation of two receiving bodies, which are arranged parallel to one another, from FIG. 35.
Figure 37:
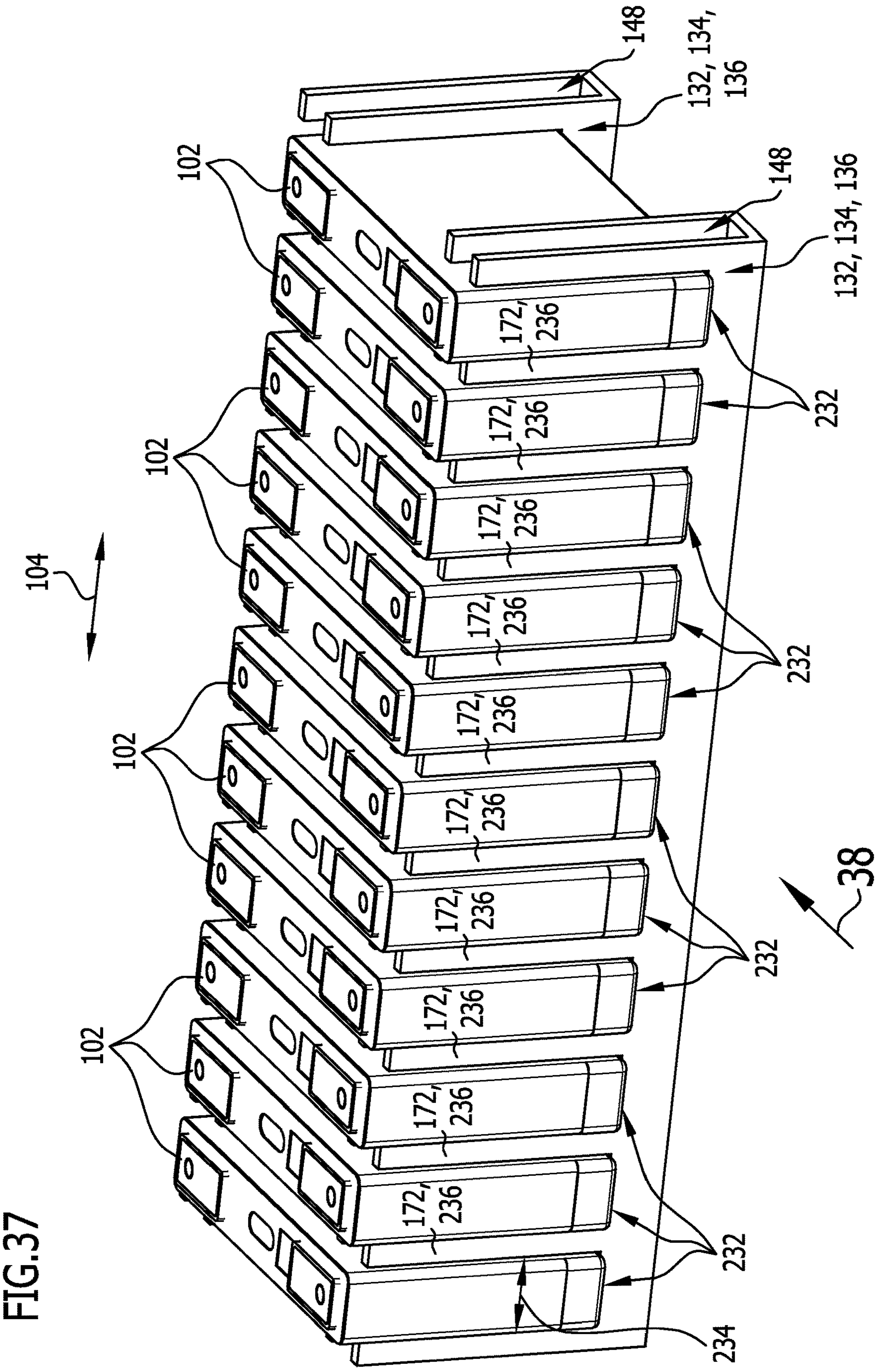
FIG. 37 is a schematic perspective representation of the receiving bodies shown in FIG. 35, wherein galvanic cells are arranged in receiving areas of side wall elements of the receiving bodies.
Figure 38:
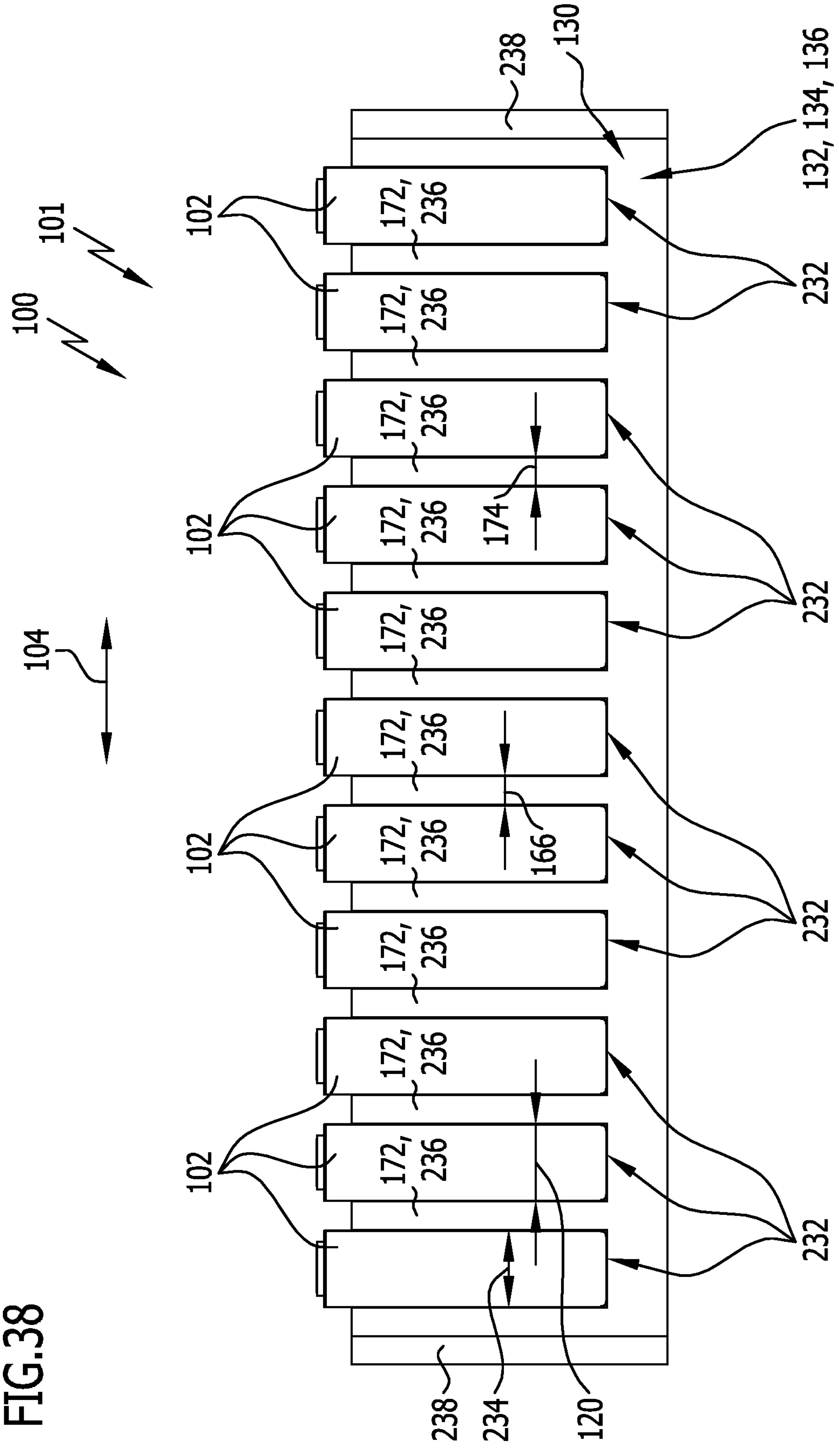
FIG. 38 is a schematic side view of the receiving bodies of FIG. 35 in the direction of arrow 38 in FIG. 37, wherein galvanic cells are arranged in receiving areas of side wall elements of the receiving bodies.

An embodiment of a battery module 100 shown in FIGS. 35 to 41 differs from the embodiment of a battery module 100 shown in FIGS. 28 to 34 substantially in that the battery module 100 comprises a plurality of connecting bodies 130, which are arranged in particular parallel to each other and/or parallel to the stacking direction 104 of the battery module 100 (cf. FIGS. 36 and 37).

Preferably, a respective receiving body 132 of the connecting bodies 130 includes two side wall elements 228 and a bottom wall element 230 (cf. FIG. 35).

The side wall elements 228, in particular, extend substantially perpendicularly away from the bottom wall element 230.

The side wall elements 228 of a respective receiving body 132 preferably each include a plurality of receiving areas 232, each of which receives a galvanic cell 102 of the battery module 100.

The receiving areas 232 of the side wall elements 228 of the receiving body 132 preferably have a width 234 in a direction parallel to the stacking direction 104 of the battery module 100, which is substantially equal to a width 120 of the galvanic cells 102 in the direction parallel to the stacking direction 104 of the battery module 100.

Preferably, a spacing area 236 is arranged between two receiving areas 232 of a side wall element 228.

In particular, a respective receiving area 232 of a side wall element 228 of the receiving body 132 is bounded by two respective spacing areas 236.

The spacing areas 236 of a respective side wall element 228 are preferably formed as rectangular projections and, in particular, each form a spacer element 172

It may be favorable if the receiving areas 232 are formed as rectangular recesses.

It can also be favorable if the side wall elements 228 of the receiving bodies 132 are designed symmetrically identical to a mirror plane of a respective receiving body 132.

Preferably, receiving areas 232 and/or spacing areas 236 of the two side wall elements 228 of a respective receiving body 132 are arranged to be substantially congruent.

The receiving body 132 preferably further comprises two closing elements 238, which are arranged or can be arranged perpendicular to the two side wall elements 228 and perpendicular to the bottom wall element 230.

A receptacle 148 of the receiving body 132 can preferably be closed by means of the closing elements 238.

Preferably, the two side wall elements 228, the two closing members 238, and the bottom wall element 230 of the receiving body 132 form and/or define a receptacle 148 of the receiving body 132.

It may be favorable if the side wall elements 228 of the receiving body 132 comprise one or more sealing members 240 for sealing between a respective side wall element 228 and a galvanic cell 102.

The sealing elements 240 are only schematically indicated in the FIGURES by means of an arrow.

Preferably, the sealing elements 240 of the side wall elements 228 are arranged in the area of the receiving areas 232 of the side wall elements 228.

In particular, the sealing elements 240 are arranged on edges of the side wall elements 228.

A seal in the area of the receiving areas 232 of the sidewall elements 228 in particular can be realized by means of the sealing elements 240.

In particular, the sealing elements 232 can prevent leakage of connecting material 146 from the receiving body 132 during production of the battery module 100, in particular when the connecting material 146 is cast into the receptacle 148 of the receiving body 132.

Preferably, sealing elements 240 arranged in the area of the receiving areas 232 of the side wall elements 228 are designed to be compressible.

It can be favorable, for example, if the sealing elements 240 comprise or are formed from a rubber material.

Preferably, the sealing elements 240 can be used to compensate for a height tolerance of the galvanic cells 102 of the battery module 100, in particular by partially compressing the sealing elements 240.

The receiving bodies 132, in particular the two side wall elements 228 and/or the bottom wall element 230 of the receiving body 132, preferably comprise a temperature control channel structure, which is not shown in the drawing, and through which a temperature control medium, in particular a temperature control liquid, can be conducted.

Figure 39:
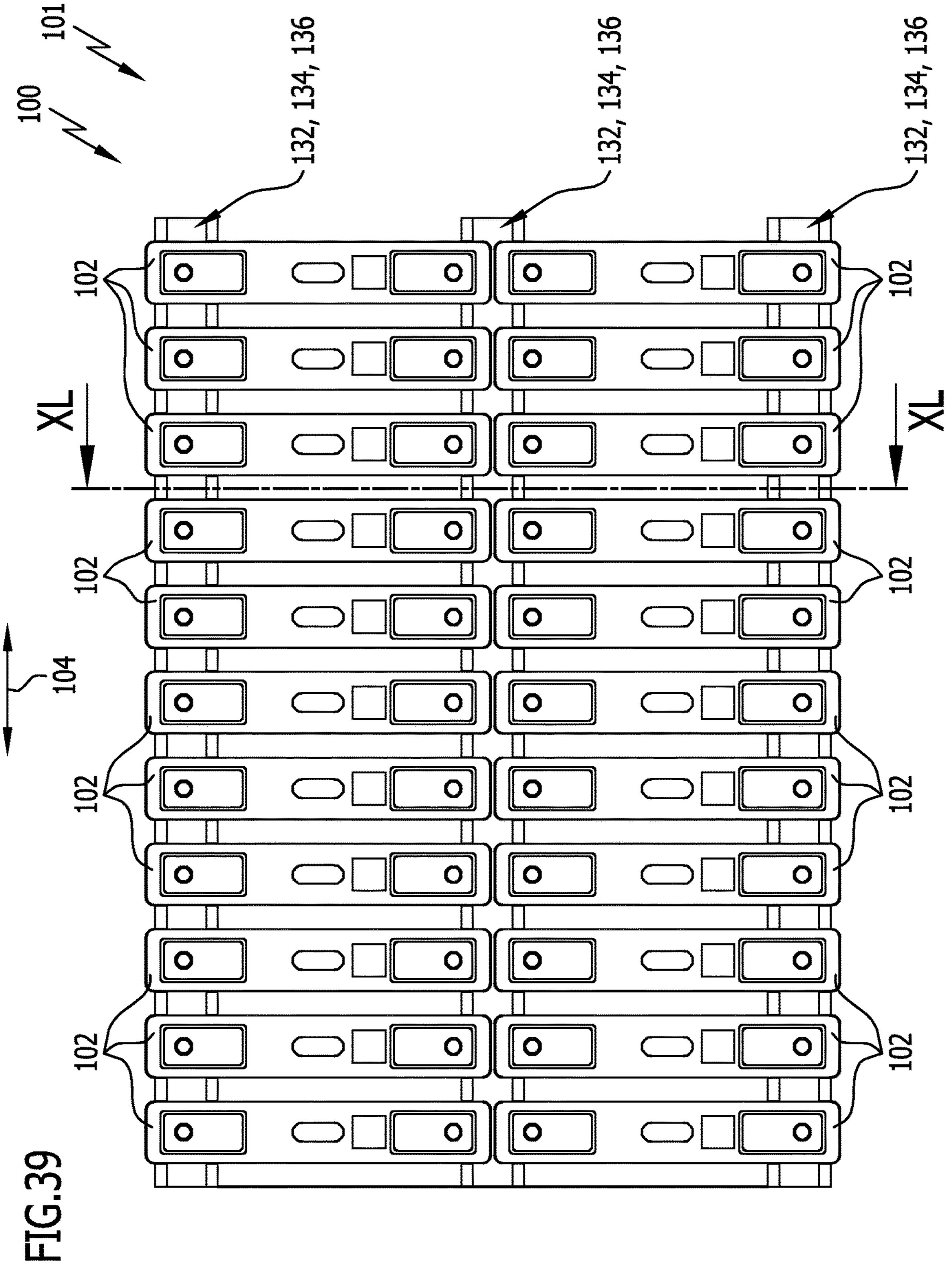
FIG. 39 is a schematic top view of a further embodiment of a battery module.
Figure 40:
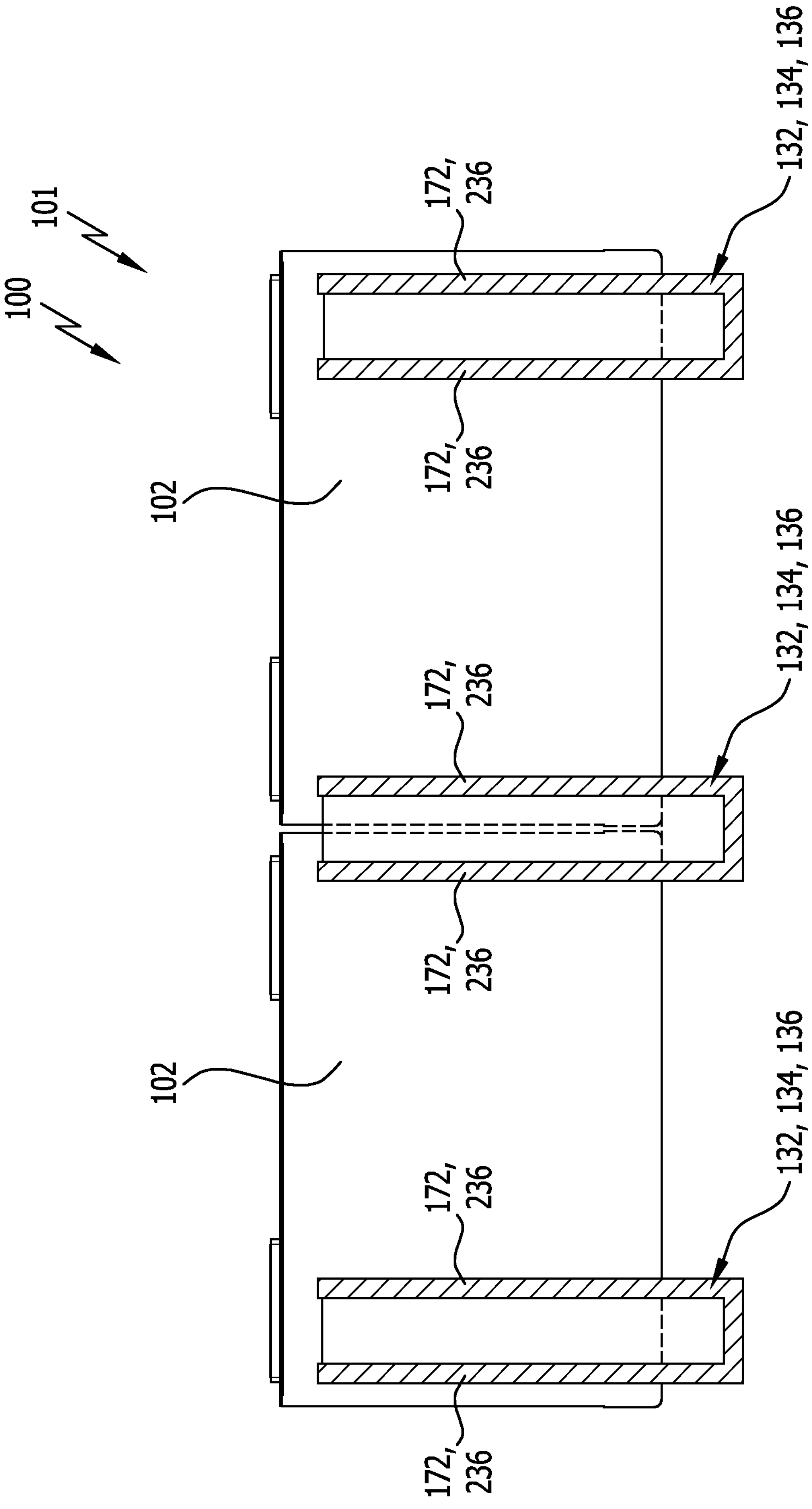
FIG. 40 is a schematic section through the battery module of FIG. 39 along the line XL-XL in FIG. 39.
Figure 41:
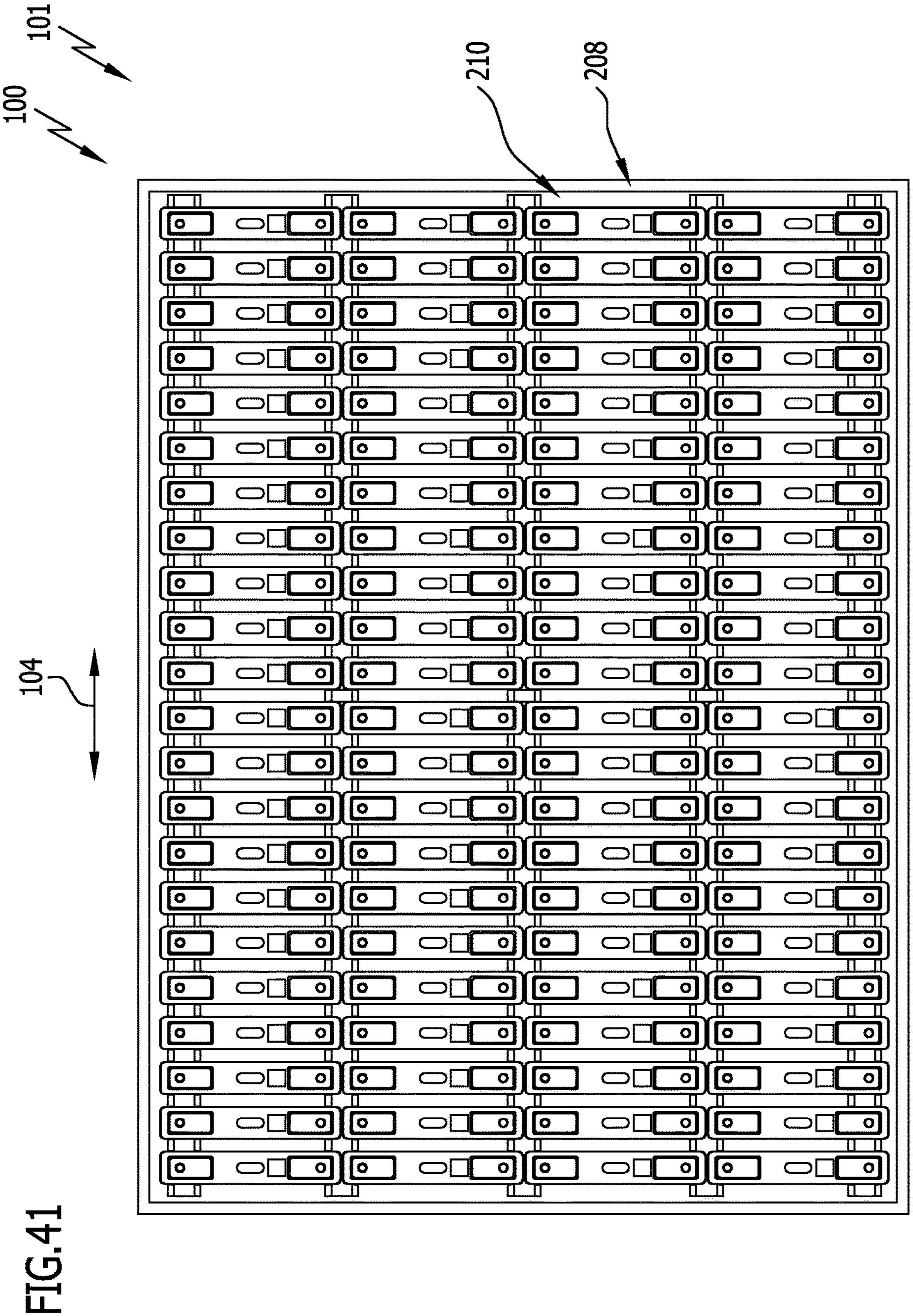
FIG. 41 is a schematic top view of a further embodiment of a battery device.

In the battery modules shown in FIGS. 39 to 41, it can be provided that adjacent battery modules 100 are connected to each other perpendicular to the stacking direction 104 of the battery modules 100 by means of a common connecting body 130.

In particular, the common connecting body 130 comprises a common receiving body 132 and/or a common connecting material body 144.

In particular, the galvanic cells 102 of a respective adjacent battery module 100 are each connected to the common connecting body 130.

Preferably, the galvanic cells 102 of a first battery module 100 are received in the receiving area 232 of a first side wall element 228 of the common receiving body 132, wherein the galvanic cells 102 of a second battery module 100 are received in the receiving area 232 of a second side wall element 228 of the common receiving body 132.

In all other respects, the embodiment of a battery module 100 shown in FIGS. 35 to 41 is identical in structure and function to the embodiment of a battery module 100 shown in FIGS. 28 to 34, so that reference is made to the above description thereof.

Figure 42:
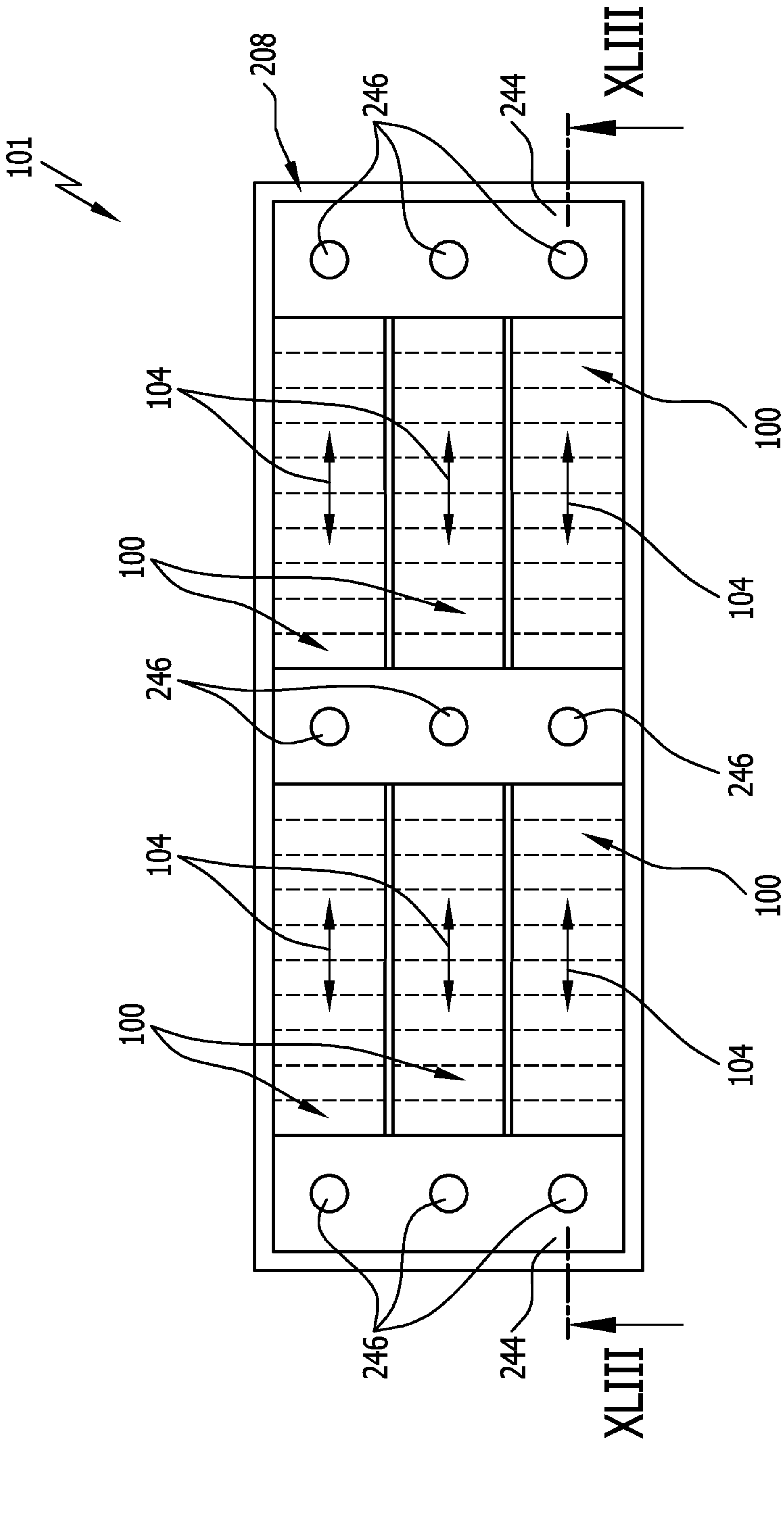
FIG. 42 is a schematic top view of a further embodiment of a battery device.
Figure 43:
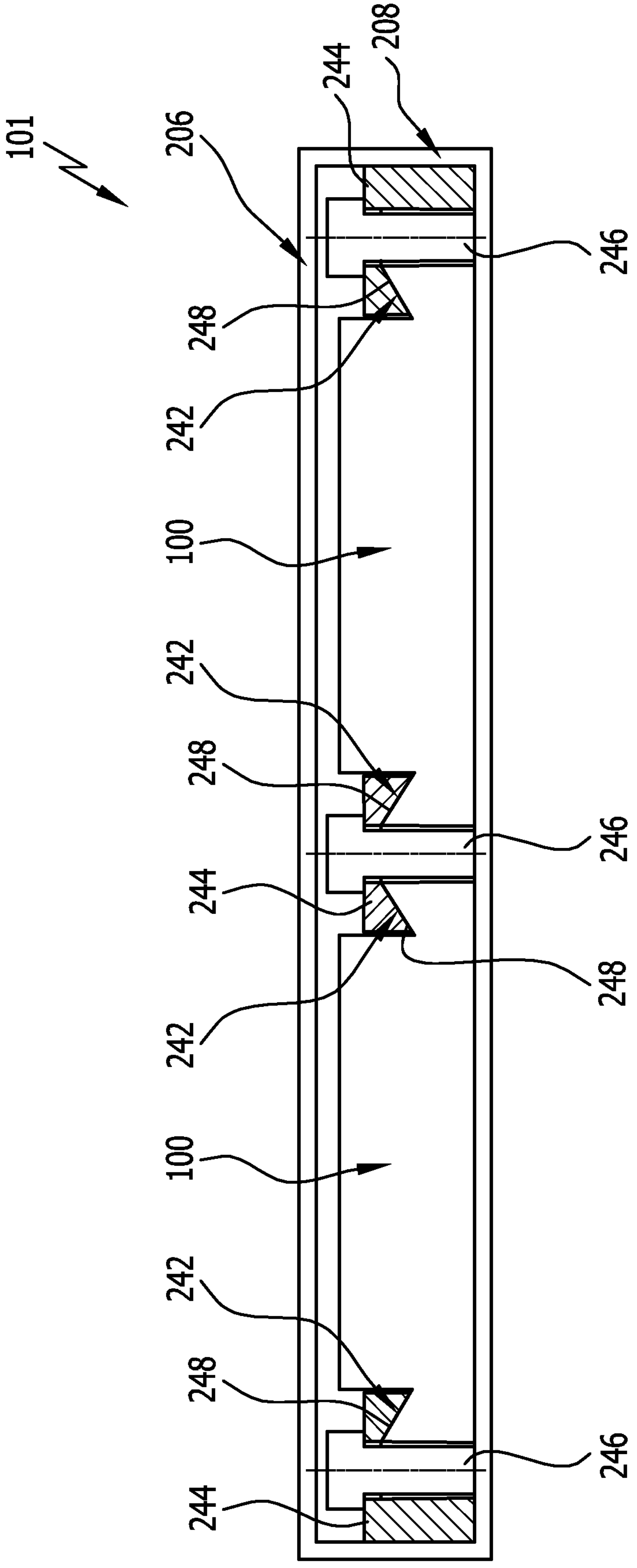
FIG. 43 is a schematic section through the battery device of FIG. 42 along line XLIII-XLIII in FIG. 42.
Figure 44:
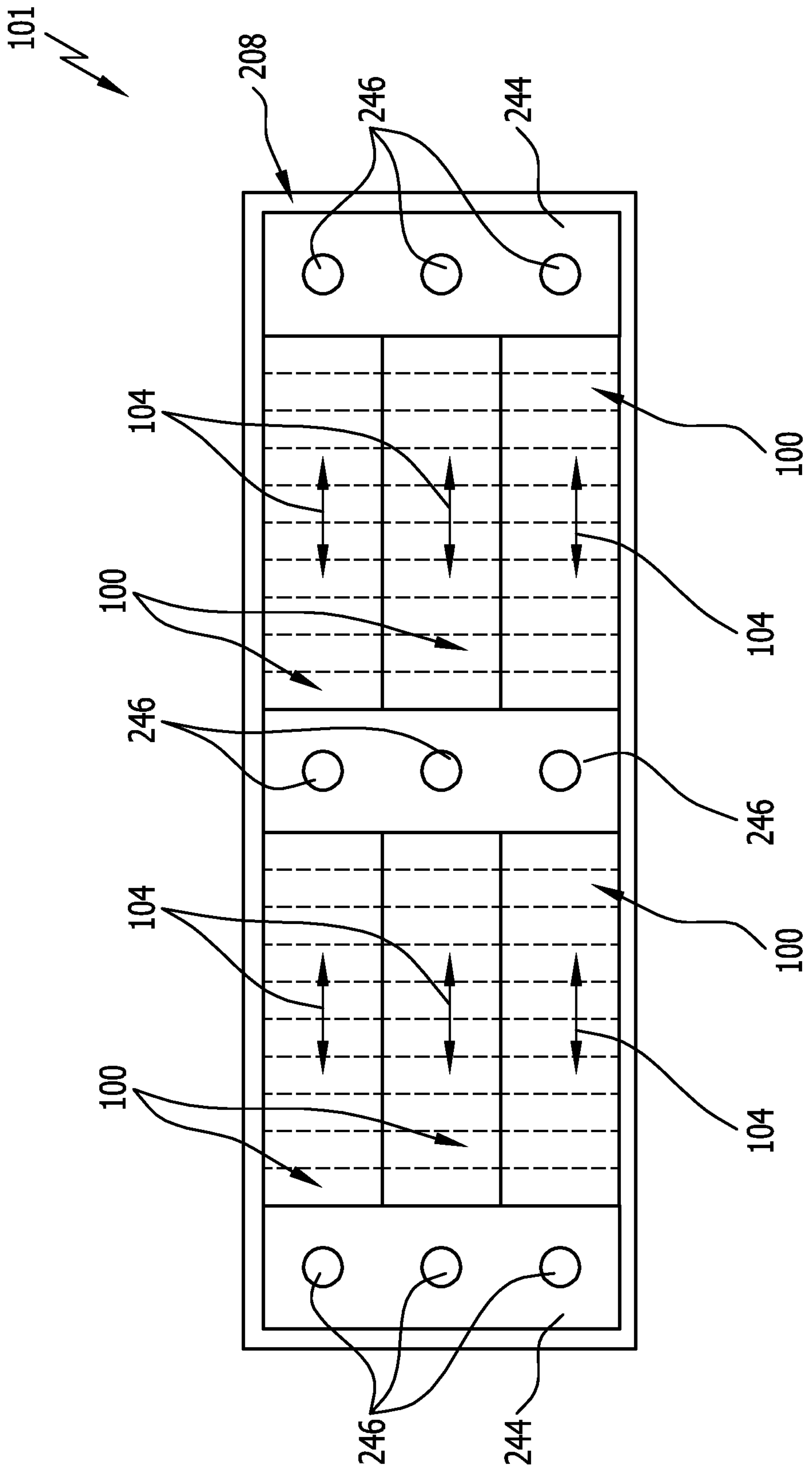
FIG. 44 is a representation of a further embodiment of a battery device corresponding to the representation in FIG. 42.

FIGS. 42 to 44 illustrate embodiments of battery devices 101 comprising a plurality of battery modules 100 in accordance with any of the embodiments illustrated in FIGS. 1 to 41.

A respective battery module 100 of the battery device 101 preferably comprises two clamping sections and/or tensioning sections 242.

The battery modules 100 can be preferably connected to the housing 208 of the battery device 101 by means of the clamping sections and/or tensioning sections 242, in particular can be fixed to the housing 208 in a clamping and/or tensioning manner.

The clamping sections and/or tensioning sections 242 are preferably formed as grooves, wherein a longitudinal direction of the grooves is in particular arranged substantially parallel to the stacking direction 104 of the battery module 100.

The clamping sections and/or tensioning sections 242 of a respective battery module 100 are arranged in particular parallel to each other.

It can be favorable, for example, if the two connecting bodies 130 of an embodiment of a battery module 100 illustrated in FIGS. 1 to 27, in particular a respective receiving body 132 of the two connecting bodies 130, each comprise two clamping sections and/or tensioning sections 242.

The clamping sections and/or tensioning sections 242 of a respective connecting body 130, in particular of a respective receiving body 132 of the connecting body 130, are arranged preferably at an edge region of the connecting body 130, in particular of the receiving body 132.

Preferably, the battery device comprises a plurality of clamping elements and/or tensioning elements 244 by means of which the battery modules can be connected to a housing 208 of the battery device 101.

The clamping elements and/or tensioning elements 244 can preferably be at least partially inserted into the clamping sections and/or tensioning sections 242 of the connecting bodies 130.

The clamping elements and/or tensioning elements 244 of the battery device 101 are preferably formed substantially complementary to the clamping sections and/or tensioning sections 242 of the battery modules 100.

The battery modules 100 of the battery device 101 can be fixed to the housing 208 of the battery device 101 by means of the clamping elements and/or tensioning elements 244, in particular in a clamping and/or tensioning manner.

It can be favorable if the clamping elements and/or tensioning elements 244 are clamping strips.

In particular, the clamping elements and/or tensioning elements 244 can be screwed to a housing base of the housing 208, in particular by passing a screw element 246 through the clamping elements and/or tensioning elements 244 and then screwing the screw element 246 into the housing base of the housing 208 of the battery device 101.

The clamping elements and/or tensioning elements 244 can be connected by means of one or more screw elements 246, in particular to the housing 208 and/or to a threaded section fixed to the housing 208, in particular by screwing.

Preferably, the clamping elements and/or tensioning elements 244 can be moved towards the housing 208 when connecting the latter to the housing 208 of the battery device 101, in particular towards a bottom wall of the housing 208.

Preferably, the clamping sections and/or tensioning sections 242 of the connecting bodies 130, in particular the receiving body 132 of the connecting bodies 130, and/or the clamping elements and/or tensioning elements 244 of the battery device 101 are designed in such a manner that the battery modules 100, when the clamping elements and/or tensioning elements 100 are displaced in a direction perpendicular to the stacking direction 104 of the battery module 100 and parallel to a short secondary side 118*a* of the galvanic cells 102, for example when the clamping elements and/or the tensioning elements 244 are screwed to the housing base of the housing 208 of the battery device 100, are clamped and/or tensioned in a direction running perpendicular to the stacking direction 104 and parallel to a long secondary side 118*b* of the galvanic cells 102.

The clamping sections and/or tensioning sections 242 of a respective battery module 100 and/or the clamping elements and/or tensioning elements 244 are designed in particular in such a way that the battery modules 100 are clamped and/or tensioned by screwing the clamping elements and/or tensioning elements 244 in a plane running perpendicular to a screwing direction of the screw elements 246.

In particular, it can be provided that the clamping sections and/or tensioning sections 242 of the battery modules 100 comprise an inclined surface 248 arranged at an angle with respect to the short secondary sides 118*a* of the galvanic cells 102.

In particular, the inclined surface 248 is arranged at an angle to a screwing direction of the screw elements 246.

In the embodiment of a battery device 101 shown in FIGS. 42 and 43, the battery modules 100 are arranged or can be arranged preferably at a distance from each other in a direction perpendicular to the stacking direction 104.

In the embodiment of a battery device 101 shown in FIG. 44, the battery modules 100 are preferably arranged or can be arranged abutting each other in a direction perpendicular to the stacking direction 104.

In particular, it is conceivable that the connecting bodies 130, in particular the connecting material bodies 144 of the connecting bodies 130, of adjacent battery modules 100 are connected to one another in a thermally conductive manner. Preferably, heat can be dissipated from the battery modules 100 through the connecting material 146 of the connecting material bodies 144.

In all battery modules 102 and battery devices 101 shown in the FIGURES, pouch cells, which are not shown in the FIGURES, can be used as galvanic cells 102 as an alternative to prismatic cells 104.

The Following are Particular Embodiments:

1. Battery module (100), comprising:
   - a plurality of galvanic cells (102), in particular a plurality of prismatic cells (106) or a plurality of pouch cells, which are arranged along a stacking direction;
   - one or more connecting bodies (130), wherein one or more connecting bodies (130) connect the galvanic cells (102) to each other in the stacking direction.
2. Battery module (100) according to embodiment 1, characterized in that the one or more connecting bodies (130) comprise in particular a one-piece connecting material body (144) made of a connecting material (146) and/or in particular a one-piece receiving body (132).
3. Battery module (100) according to embodiment 2, characterized in that the connecting material body (144) of a respective connecting body (130) is received in the receiving body (132) of the connecting body (130).
4. Battery module (100) according to any of the embodiments 2 or 3, characterized in that the galvanic cells (102) of the battery module (100), in particular cell housings (110) of the galvanic cells (102), the connecting material (146) of the connecting material body (144) and the receiving body (132) together form a composite component.
5. Battery module (100) according to any of the embodiments 2 to 4, characterized in that the connecting material (146) is a flowable and/or castable material.
6. Battery module (100) according to any of the embodiments 2 to 5, characterized in that the connecting material (146) is a two-component material.
7. Battery module (100) according to any of the embodiments 2 to 6, characterized in that the connecting material (146) has a density in the range of approximately 1.1 g/cm3 to approximately 2 g/cm3.
8. Battery module (100) according to any of the embodiments 2 to 7, characterized in that the connecting material (146) has a thermal conductivity in the range of approximately 0.8 W/m*K to approximately 2 W/m*K.
9. Battery module (100) according to any of the embodiments 2 to 8, characterized in that the connecting material (146) has a dielectric strength in the range of approximately 15 kV/mm to approximately 40 kV/mm, in particular in the range of approximately 20 kV/mm to approximately 36 kV/mm.
10. Battery module (100) according to any of the embodiments 2 to 9, characterized in that the connecting material (146) has a volume resistivity in the range of approximately 10^14 Ω/cm to approximately 10^15 Ω/cm.
11. Battery module (100) according to any of the embodiments 2 to 10, characterized in that the connecting material (146) has a coefficient of thermal expansion in the range of approximately 50 ppm/K to approximately 210 ppm/K below a glass transition temperature of the connecting material (146) and/or that the connecting material (146) has a coefficient of thermal expansion in the range of approximately 50 ppm/K to approximately 250 ppm/K above a glass transition temperature of the connecting material (146).
12. Battery module (100) according to any of the embodiments 2 to 11, characterized in that the connecting material (146) has a curing shrinkage in the range of approximately 0.5% to approximately 2%, for example approximately 1%.
13. Battery module (100) according to any of the embodiments 2 to 12, characterized in that the connecting material (146) of the connecting material body (144) has a tensile strength in the range of approximately 5 N/mm2 to approximately 80 N/mm2, in particular in the range of approximately 30 N/mm2 to approximately 60 N/mm2.
14. Battery module (100) according to any of the embodiments 2 to 13, characterized in that the connecting material (146) has a modulus of elasticity in the range of approximately 2000 N/mm2 to approximately 14000 N/mm2, in particular in the range of approximately 8000 N/mm2 to approximately 12000 N/mm2.
15. Battery module (100) according to any of the embodiments 2 to 14, characterized in that a respective connecting body (130), in particular a respective receiving body (132) of a connecting body (130), comprises a temperature control channel structure (198) through which a temperature control medium can be conducted.
16. Battery module (100) according to any of the embodiments 1 to 15, characterized in that the galvanic cells (102) are arranged spaced apart from one another in the stacking direction, wherein the galvanic cells (102) are in particular arranged substantially parallel to one another.
17. Battery module (100) according to any of the embodiments 1 to 16, characterized in that a space is arranged between adjacent galvanic cells (102) in each case.
18. Battery module (100) according to any of the embodiments 1 to 17, characterized in that a receiving body (132) of a respective connecting body (130) has in each case a plurality of spacer elements (172) which have a width of approximately 1 to 5 mm, in particular of approximately 2 mm to approximately 4 mm, for example of approximately 2 mm, parallel to the stacking direction of the battery module (100).

19. Battery module (100) according to any of the embodiments 1 to 18, characterized in that a respective connecting material body (144) of the one or more connecting bodies (130) is connected to the galvanic cells (102) of the battery module (100) in a materially bonding and/or form-fitting manner.
20. Battery module (100) according to any of the embodiments 1 to 19, characterized in that the galvanic cells (102) of the battery module (100) connect the one or more connecting bodies (130) of the battery module (100) to one another in a load-bearing manner.
21. Battery module (100) according to any of the embodiments 1 to 20, characterized in that the battery module (100) comprises two connecting bodies (130), wherein a connecting body (130) is arranged on a respective short secondary side of the galvanic cells (102) of the battery module (100).
22. Battery module (100) according to any of the embodiments 1 to 21, characterized in that a respective connecting body (130) in each case completely encloses a short secondary side (118*a*) of the galvanic cells (102) and/or in that a respective connecting body (130) partially encloses both long secondary sides (118*b*) of the galvanic cells (102).
23. Battery module (100) according to any of the embodiments 1 to 22, characterized in that a respective receiving body (132) of a connecting body (130) has a C-shaped cross-section.
24. Battery module (100) according to any of the embodiments 1 to 23, characterized in that the battery module (100) comprises one or more connecting elements (204) to secure a cover element (206) to the battery module (100) in a detachable and/or tool-free manner.
25. Battery module (100) according to embodiment 24, characterized in that one or more connecting elements (204) for securing the cover element (206) to the battery module (100) in a detachable and/or tool-free manner are designed as hook-and-loop fastener elements (212), in particular as hook-and-loop fastener strips.
26. Battery module (100) according to embodiment 24 or 25, characterized in that one or more connecting elements (204) for securing the cover element (206) to the battery module (100) in a detachable and/or tool-free manner are designed as magnetic elements, in particular as magnetic strips.
27. Battery module (100) according to any of the embodiments 24 to 26, characterized in that the one or more connecting elements (204) for securing a cover element (206) to the battery module (100) in a detachable and/or tool-free manner is arranged on an upper side of the connecting body (130), in particular of the receiving body (132), facing the cell poles of the galvanic cells (102) of the battery module (100).
28. Battery module (100) according to any of the embodiments 1 to 27, characterized in that a width of a connecting material body (144) in a direction perpendicular to the stacking direction of the battery module (100) and parallel to a long side (118) of the galvanic cells (102) corresponds approximately to a total of a wall thickness (138) of a cell housing wall of a cell housing (110) of a galvanic cell (102), a distance of a cell winding (112) of the galvanic cell (102) from the cell housing wall of the cell housing (110), and a width of a deflection region (122) of a cell winding of the galvanic cell (102).
29. Battery module (100) according to any of the embodiments 1 to 28, characterized in that two galvanic cells (102) adjacent in the stacking direction and/or two connecting bodies (130) of the battery module (100) in a direction running perpendicular to the stacking direction of the battery module (100) and/or parallel to a short secondary side (118) of the galvanic cells (102), in particular in a direction running parallel to the direction of gravity, each bound a ventilation duct (168).
30. Battery module (100) according to any of the embodiments 1 to 29, characterized in that the battery module (100) comprises a fan device (170) which is arranged and designed in such a manner that a flow of air directed into ventilation ducts (168) of the battery module (100) can be generated by means of the fan device (170).
31. Battery module (100) according to any of the embodiments 1 to 30, characterized in that a respective connecting body (130), in particular a respective receiving body (132), comprises one or more fastening elements (190), by means of which the battery module (100) can be fixed to a housing (208) of a battery device (101) and which are designed in particular in each case for the passage of a connecting element (204).
32. Battery module (100) according to any of the embodiments 1 to 31, characterized in that two connecting bodies (130) of the battery module (100) are connected or can be connected to one another in a force-fitting and/or form-fitting manner.
33. A battery module (100) according to any of the embodiments 1 to 32, characterized in that a respective receiving body (132) of a connecting body (130) comprises a fastening device (180) for fastening a cell contacting system of the battery module (100).
34. A battery module (100) according to any of the embodiments 1 to 33, characterized in that the battery module (100) comprises a plurality of cell connection elements (200) which are designed to be substantially flat and/or planar.
35. Battery module (100) according to any of the embodiments 1 to 34, characterized in that the battery module (100) comprises a plurality of cell connection elements (200), by means of which cell poles (178) of two galvanic cells (102) of the battery module (100) are connected or can be connected to one another, wherein a respective cell connection element (200) comprises a heat conduction section (202), by means of which heat can be dissipated from the respective cell connection element (200).
36. Battery module (100) according to embodiment 35, characterized in that the heat conduction section (202) of a respective cell connection element (200) is thermally coupled, in particular in a thermally conductive manner, to a connecting material body (144) of a connecting body (130).
37. Battery module (100) according to any of the embodiments 1 to 36, characterized in that a respective connecting body (130) of the battery module (100) comprises in each case one or more connecting sections (214), by means of which the connecting body (130) can be connected to a connecting body (130) of an adjacent battery module (100).

38. Battery module (100) according to any of the embodiments 1 to 37, characterized in that an electrical insulation film is arranged at least partially or only partially on a surface of the galvanic cells (102), in particular on a surface of the cell housings (110) of the galvanic cells (102).
39. Battery module (100) according to any of the embodiments 1 to 38, characterized in that one or more connecting bodies (130) are arranged on a long secondary side (118*b*) of the galvanic cells (102), in particular on a long secondary side (118*b*) of the galvanic cells (102) which faces away from the cell poles (178) of the galvanic cells (102).
40. Battery module (102) according to embodiment 39, characterized in that the battery module (100) comprises only a single connecting body (130), which is arranged on the long secondary side (118*b*) of the galvanic cells (102).
41. Battery module (100) according to embodiment 40, characterized in that in a receptacle of the receiving body (132) of the single connecting body (130) all long secondary sides (118*b*) of the galvanic cells (102) of the battery module (100) are completely arranged in each case, which face away from the cell poles (178) of the galvanic cells (102).
42. Battery module (100) according to any of the embodiments 40 or 41, characterized in that the receiving body (132) of the connecting body (130) comprises a temperature control channel structure (198) through which a temperature control medium, in particular a temperature control liquid, can be conducted, wherein a cell base of the galvanic cells (102) of the battery module (100), in particular, can be cooled with the temperature control channel structure (198).
43. Battery module (100) according to embodiment 39, characterized in that the battery module (100) comprises a plurality of connecting bodies (130), which are arranged in particular parallel to one another and/or parallel to a stacking direction of the battery module (100).
44. Battery module (100) according to embodiment 43, characterized in that a receiving body (132) of a respective connecting body (130) comprises two side wall elements (142) and a bottom wall element (140), wherein the side wall elements (142) of the receiving body (132) each comprise one or more receiving areas (232) in which a respective galvanic cell (102) of the battery module (100) is received.
45. Battery module (100) according to embodiment 44, characterized in that the side wall elements (142) of the receiving body (132) comprise one or more sealing elements (240) for sealing between a respective side wall element (142) and a galvanic cell (102).
46. Battery module (100) according to embodiment 45, characterized in that one or more sealing elements (240) are arranged at edges of the side wall elements (142).
47. Battery module (100) according to any of the embodiments 1 to 46, characterized in that the battery module (100) comprises one or more, for example two, clamping sections (242) and/or tensioning sections (242), wherein the battery module (100) can be connected by means of the clamping sections (242) and/or tensioning sections (242) preferably to a housing (208) of a battery device (101), in particular can be fixed to the housing (208) in a clamping and/or tensioning manner.
48. Battery module (100) according to embodiment 47, characterized in that the one or more connecting bodies (130) of the battery module (100), in particular a respective receiving body (130) of the one or more connecting bodies (130), each comprise one or more, for example two, clamping sections (242) and/or tensioning sections (242).
49. Battery module (100) according to embodiment 47 or 48, characterized in that the clamping sections (242) and/or tensioning sections (242) are formed as grooves, wherein a longitudinal direction of the grooves is arranged in particular substantially parallel to the stacking direction of the battery module (100).
50. Battery device (101), comprising:
one or more battery modules (100) according to any of the embodiments 1 to 49.
51. Battery device (101) according to embodiment 50, characterized in that the battery device (101) comprises a housing (208) which comprises a cover element (206), wherein the cover element (206) is fixed or can be fixed to the housing (208) indirectly via one or more battery modules (100), in particular by means of one or more connecting elements (204) for fixing the cover element (206) to the one or more battery modules (100) in a detachable and/or tool-free manner.
52. Battery device (101) according to embodiment 50 or 51, characterized in that the battery device (101) comprises a temperature control device (220) which comprises one or more temperature control elements (222), wherein one or more temperature control elements (222) of the temperature control device (220) are preferably arranged between two adjacent battery modules (100) of the battery device (101) and/or wherein one or more temperature control elements (222 are preferably arranged on a side of a respective battery module (100) facing away from the cell poles (178) of the galvanic cells (102)) of the one or more battery modules (100).
53. Battery device (101) according to any of the embodiments 50 to 52, characterized in that the battery device (101) comprises a plurality of undercut elements (218), wherein battery modules (100) adjacent in a stacking direction are each connected or can be connected to one another by means of one or more undercut elements (218).
54. Battery device (101) according to any of the embodiments 50 to 53, characterized in that the battery device (101) comprises a housing (208), wherein battery modules (100) of the battery device (101) are connected or can be connected to the housing (208) by means of one or more undercut elements (218).
55. Battery device (101) according to any of the embodiments 50 to 54, characterized in that the battery device (101) comprises a housing (208) and a plurality of clamping elements and/or tensioning elements by means of which one or more battery modules (100) can be connected to a housing (208) of the battery device (101).
56. Battery device (101) according to embodiment 55, characterized in that the clamping elements and/or tensioning elements can be screwed to a housing base of the housing (208), in particular by passing a screw element (246) through the clamping elements and/or tensioning elements and then screwing the screw element (246) into the housing base of the housing (208) of the battery device (101).

57. Battery device (101) according to embodiment 55 or 56, characterized in that clamping sections (242) and/or tensioning sections (242) of a respective connecting body (130) of the battery module (100) and/or clamping elements and/or tensioning elements of the battery device (101) are formed in such a manner that a respective battery module (100), when the clamping elements and/or tensioning elements are displaced in a direction perpendicular to the stacking direction of the battery module (100) and parallel to a short secondary side (118*a*) of the galvanic cells (102), for example when the clamping elements and/or the tensioning elements are screwed to a housing base of the housing (208) of the battery device (101), are clamped and/or tensioned in a direction running perpendicular to the stacking direction and parallel to a long secondary side (118*b*) of the galvanic cells (102).
58. Battery device (101) according to any of the embodiments 55 to 57, characterized in that the clamping elements and/or tensioning elements of the battery device (101) are designed substantially complementary to clamping sections (242) and/or tensioning sections (242) of the connecting body (130).
59. Battery device (101) according to any of the embodiments 55 to 58, characterized in that the clamping elements and/or tensioning elements are designed substantially complementary to clamping sections (242) and/or tensioning sections (242) of the connecting body (130).
60. Battery device (101) according to any of the embodiments 55 to 59, characterized in that the clamping elements and/or tensioning elements can be inserted at least partially into clamping sections (242) and/or tensioning sections (242) of the connecting body (130).
61. Battery device (101) according to any of the embodiments 55 to 60, characterized in that the clamping elements and/or tensioning elements of the battery device (101) are clamping strips or sliding blocks.
62. Battery device (101) according to embodiment 61, characterized in that a plurality of battery modules (100) can be simultaneously connected to the housing (208) of the battery device (101) by means of a clamping strip.
63. Battery device (101) according to embodiment 61 or 62, characterized in that individual battery modules (100) can each be connected to a housing (208) of a battery device (101) by means of one or more sliding blocks.
64. Battery device (101) according to any of the embodiments 55 to 63, characterized in that the clamping elements and/or tensioning elements can be connected to the housing (208) and/or to a threaded section fixed to the housing (208) by means of one or more screw elements (246), in particular by screwing.
65. Battery device (101) according to any of the embodiments 50 to 64, characterized in that adjacent battery modules (100) perpendicular to a stacking direction of the battery modules (100) are connected to each other by means of a common connecting body (130).
66. Method of producing a battery module (100), in particular a battery module (100) according to any of the embodiments 1 to 49, wherein the method comprises:
    providing a plurality of galvanic cells (102);
    providing a first casting mold (164), in particular a first receiving body (132), which comprises a receptacle (148);
    arranging the galvanic cells (102) along a stacking direction in the receptacle (148) of the first casting mold (164), in particular of the first receiving body (132);
    introducing a connecting material (146), in particular a flowable and/or castable connecting material, into the receptacle (148) of the first casting mold (164), in particular of the first receiving body (132).
67. Method according to embodiment 66, characterized in that the connecting material (146) cures and/or cross-links after the introduction thereof into the receptacle (148) of the first casting mold (164), in particular of the first receiving body (132).
68. Method according to embodiment 66 or 67, characterized in that the galvanic cells (102) are arranged in the receptacle (148) of the first casting mold (164) and/or the first receiving body (132) substantially parallel to each other and/or spaced apart from each other.
69. Method according to any of the embodiments 66 to 68, characterized in that the galvanic cells (102) are arranged in a plurality of receptacles (148) of a plurality of first casting molds (164), in particular a plurality of first receiving bodies (132), wherein the flowable and/or castable connecting material (146) is introduced into the plurality of receptacles (148) of the plurality of first casting molds (164), in particular the plurality of first receiving bodies (132).
70. Method according to any of the embodiments 66 to 69, characterized in that the galvanic cells (102) are cast on a first side of the galvanic cells (102) when the connecting material (146) is introduced into the receptacle (148) of the first casting mold (164), in particular of the first receiving body (132).
71. Method according to any of the embodiments 66 to 70, characterized in that the galvanic cells (102), after curing and/or cross-linking of the connecting material (146) in the receptacle (148) of the first casting mold (164), in particular of the first receiving body (132), are arranged in a receptacle (148) of a second casting mold (164), in particular of a second receiving body (132), and subsequently a connecting material (146), in particular a flowable and/or castable connecting material, is introduced into the receptacle (148) of the second casting mold (164), in particular of the second receiving body (132).
72. Method according to embodiment 71, characterized in that the connecting material (146) cures and/or cross-links after the introduction thereof into the receptacle (148) of the second casting mold (164), in particular of the second receiving body (132).
73. Method according to embodiment 71 or 72, characterized in that the galvanic cells (102) are cast on a second side of the galvanic cells (102) when the connecting material (146) is introduced into the receptacle (148) of the second casting mold (164), in particular of the second receiving body (132).
74. Method according to any of the embodiments 66 to 73, characterized in that the galvanic cells (102) are fixed on a second side while the connecting material (146) is introduced into the receptacle (148) of the first casting mold (164), in particular of the first receiving body (132).
75. Method according to any of the embodiments 66 to 74, characterized in that for casting the galvanic cells (102) on a first side and/or on a second side of the galvanic cells (102), first the connecting material (146) is introduced, in particular cast, into a receptacle (148) of a casting mold (164), in particular of a receiving body (132), wherein subsequently the galvanic cells (102) preferably are introduced into the still flowable and/or castable connecting material (146), in particular pressed into the still flowable and/or castable connecting material (146).

76. Method according to any of the embodiments 66 to 75, characterized in that the galvanic cells (102) are heated before introducing the connecting material (146) into a receptacle (148) of the first casting mold (164), in particular of the first receiving body (132), and/or before introducing the connecting material (146) into a receptacle (148) of a second casting mold (164), in particular of a second receiving body (132).

77. Method according to any of the embodiments 66 to 76, characterized in that the connecting material (146) is heated, in particular by supplying heat, before the introduction and/or after the introduction thereof into a receiving body (148) of the first casting mold (164), in particular of the first receptacle (132), and/or before the introduction and/or after the introduction thereof into a receptacle (148) of the second casting mold (164), in particular of a second receiving body (132).

The invention claimed is:

1. A battery module comprising the following:

a plurality of galvanic cells being arranged along a stacking direction;

one or more connecting bodies, wherein the one or more connecting bodies comprise at least one connecting body connecting the galvanic cells to one another in the stacking direction, wherein the at least one connecting body comprises a receiving body and a connecting material, wherein the plurality of galvanic cells are at least partially cast into the connecting material within the receiving body, wherein the battery module comprises one or more clamping sections and/or tensioning sections configured to connect the battery module to a housing of a battery device, wherein the one or more clamping sections and/or tensioning sections comprise at least one inclined surface configured to engage a complementary element to generate a clamping or tensioning force that connects the battery module to the housing of the battery device.

2. The battery module according to claim 1, wherein the one or more connecting bodies of the battery module each comprise one or more clamping sections and/or tensioning sections.

3. The battery module according to claim 1, wherein the one or more clamping sections and/or tensioning sections are formed as grooves, a longitudinal direction of the grooves being arranged perpendicular to the stacking direction of the battery module.

4. The battery module according to claim 1, wherein the one or more connecting bodies each comprise a one-piece connecting material body made of a connecting material and a one-piece receiving body, the connecting material body of a relevant connecting body being received in the receiving body of one of the one or more connecting bodies.

5. The battery device comprising at least one battery module according to claim 1.

6. The battery device according to claim 5, wherein the battery device comprises a housing and a plurality of clamping elements and/or tensioning elements by means of which one or more battery modules can be connected to a housing of the battery device.

7. The battery device according to claim 6, wherein the clamping elements and/or tensioning elements are screwable to a housing base of the housing, by a screw element provided through the clamping elements and/or tensioning elements and wherein the screw element extends into the housing base of the housing.

8. The battery device according to claim 6, wherein at least one clamping section and/or tensioning section of the one or more clamping sections and/or tensioning sections and/or at least one clamping element and/or tensioning element of the plurality of clamping elements and/or tensioning elements of the battery device are designed in such a way that the battery module, when the at least one clamping element and/or tensioning element is displaced in a direction perpendicular to the stacking direction of the battery module and parallel to a short secondary side of the galvanic cells, is clamped and/or tensioned in a direction perpendicular to the stacking direction and parallel to a long secondary side of the galvanic cells.

9. The battery device according to claim 6, wherein at least one of the plurality of clamping elements and/or tensioning elements of the battery device is designed to be complementary to at least one of the one or more clamping sections and/or tensioning sections.

10. The battery device according to claim 6, wherein the clamping elements and/or tensioning elements are designed to be complementary to clamping sections and/or tensioning sections of the at least one connecting body.

11. The battery device according to claim 6, wherein the plurality of clamping elements and/or tensioning elements are insertable at least partially into clamping sections and/or tensioning sections of the at least one connecting body.

12. The battery device according to claim 6, wherein the plurality of clamping elements and/or tensioning elements of the battery device are clamping strips or sliding blocks.

13. The battery device according to claim 12, wherein a plurality of battery modules are simultaneously connectable to the housing of the battery device by means of a clamping strip.

14. The battery device according to claim 12, wherein individual battery modules are connectable to the housing of a battery device by means of one or more sliding blocks.

15. The battery device according to claim 6, wherein the clamping elements and/or tensioning elements are connectable to the housing and/or to a threaded portion fixed to the housing by means of one or more screw elements.

16. A battery module according to claim 1, wherein the plurality of galvanic cells of the battery module are connected to one another by the at least one connecting body in a form-fitting manner.

17. A battery module comprising the following:

a plurality of galvanic cells which are arranged along a stacking direction;

one or more connecting bodies, wherein the one or more connecting bodies comprise at least one connecting body which is configured to directly connect the plurality of galvanic cells to each other in the stacking direction, wherein the at least one connecting body is a composite component comprising a one-piece receiving body and a one-piece connecting material body made of a connecting material, wherein the connecting material body is received in the receiving body, wherein the plurality of galvanic cells are at least partially cast into the connecting material of the connecting material body, wherein the battery module comprises one or more clamping sections and/or tensioning sections which are an integral part of the receiving body, wherein the battery module is connectable by means of the clamping sections and/or tensioning sections to a housing of a battery device and/or wherein the battery module is fixable by means of the clamping sections and/or tensioning sections to a housing of a battery device in a clamping and/or tensioning manner.

18. A connecting body for arranging a plurality of galvanic cells along a stacking direction and for connecting the plurality of galvanic cells arranged along the stacking direction, wherein the connecting body comprises a receiving body having a receptacle configured to have a connecting material cast therein, wherein the connecting body has a surface or side facing the galvanic cells, which surface or side has at least two openings, recesses, and/or projections which define at least two receiving spaces such that any one of two directly adjacent receiving spaces is capable of receiving at least a portion of one of the plurality of galvanic cells, wherein the receptacle extends to the two directly adjacent receiving spaces, wherein the two directly adjacent receiving spaces are at a defined distance from each other along the stacking direction, thereby defining a gap for at least two directly adjacent galvanic cells of the plurality of galvanic cells and restricting movement of the at least two directly adjacent galvanic cells along the stacking direction, and wherein the receiving body comprises one or more clamping sections and/or tensioning sections by means of which the connecting body is connectable or fixable to a housing of a battery device in a clamping and/or tensioning manner.

19. The connecting body according to claim 18, wherein the connecting body comprises one or more clamping sections and/or tensioning sections, wherein the connecting body is connectable by means of the clamping sections and/or tensioning sections to a housing of a battery device and/or wherein the connecting body is fixable by means of the clamping sections and/or tensioning sections to a housing of a battery device in a clamping and/or tensioning manner.

20. The connecting body according to claim 18, wherein the clamping sections and/or tensioning sections are formed as grooves, a longitudinal direction of the grooves being arranged substantially perpendicular to the stacking direction.

* * * * *